United States Patent
Kofman et al.

(10) Patent No.: US 11,301,644 B2
(45) Date of Patent: Apr. 12, 2022

(54) GENERATING AND EDITING MEDIA

(71) Applicant: Trint Limited, London (GB)

(72) Inventors: Jeff Kofman, London (GB); Simon Turvey, Herts (GB); John St Leger, London (GB); Alastair Jardine, London (GB)

(73) Assignee: Trint Limited, London (GB)

(*) Notice: Subject to any disclaimer, the term of this patent is extended or adjusted under 35 U.S.C. 154(b) by 322 days.

(21) Appl. No.: 16/701,551

(22) Filed: Dec. 3, 2019

(65) Prior Publication Data

US 2021/0165973 A1 Jun. 3, 2021

(51) Int. Cl.
| | |
|---|---|
| G06F 40/58 | (2020.01) |
| G06F 40/253 | (2020.01) |
| G06F 40/30 | (2020.01) |
| G06F 3/0484 | (2013.01) |
| G06F 3/16 | (2006.01) |
| G10L 15/22 | (2006.01) |
| G10L 15/26 | (2006.01) |
| G10L 21/14 | (2013.01) |

(52) U.S. Cl.
CPC .......... *G06F 40/58* (2020.01); *G06F 3/0484* (2013.01); *G06F 3/165* (2013.01); *G06F 40/253* (2020.01); *G06F 40/30* (2020.01); *G10L 15/22* (2013.01); *G10L 15/26* (2013.01); *G10L 21/14* (2013.01)

(58) Field of Classification Search
None
See application file for complete search history.

(56) References Cited

U.S. PATENT DOCUMENTS

| | | | | |
|---|---|---|---|---|
| 10,728,623 | B2* | 7/2020 | Ayala | H04N 21/4884 |
| 10,917,607 | B1* | 2/2021 | Cheung | H04N 9/8715 |
| 2008/0177786 | A1 | 7/2008 | Faisman | |
| 2010/0299131 | A1* | 11/2010 | Lanham | G10L 15/10 704/2 |
| 2010/0332214 | A1* | 12/2010 | Shpalter | G06F 40/51 704/2 |
| 2012/0245936 | A1 | 9/2012 | Treglia | |
| 2013/0080384 | A1* | 3/2013 | Briggs | G06F 16/433 707/610 |
| 2014/0039871 | A1* | 2/2014 | Crawford | G06F 40/103 704/2 |
| 2014/0201631 | A1* | 7/2014 | Pornprasitsakul | G11B 27/031 715/716 |
| 2017/0011740 | A1 | 1/2017 | Gauci | |
| 2019/0104259 | A1* | 4/2019 | Angquist | G11B 27/036 |
| 2020/0042601 | A1* | 2/2020 | Doggett | G06F 40/58 |
| 2020/0394271 | A1* | 12/2020 | Bihani | G06F 40/45 |
| 2021/0073479 | A1* | 3/2021 | Yamada | G06F 40/58 |

FOREIGN PATENT DOCUMENTS

WO 2016146978 A1 9/2016

OTHER PUBLICATIONS

European Patent Office, International Search Report and Written Opinion re: PCT/GB2020/053080 dated Mar. 2, 2021, 10 pages, Rijswijk, Netherlands.

* cited by examiner

*Primary Examiner* — Brian L Albertalli
(74) *Attorney, Agent, or Firm* — Marshall & Melhorn, LLC

(57) ABSTRACT

A translated media generating and editing system generates playback of audio data in alignment with translated text that has been automatically translated from either a prior translation or a transcription of the audio data.

32 Claims, 44 Drawing Sheets

520 ⟶

Jeff K: So has has it sunk in? Five medals in five games. An American first.

Kim R: It really hasn't sunk in yet.

530 ⟶

Jeff K: Alors, est-ce qu'il a sombré? Cinq médailles en cinq matchs. Une première Américaine.

Kim R: Il n'a pas encore vraiment sombré.

602A ⟶
{ "job": { "lang": "en-US", "Transcribed-lan": "en-US" "user_id": 38, "name": "ntVaOiv0S92Jash5UzMx1g.mp3",
  "duration": 1086, "created_at": "Fri Feb 27 12:12:30 2015", "id": 23113 }, "speakers": [   604A ⟶
  { "duration": "3.601",   "confidence": null,  "name" "M1",  "time" "6.067" },  — 605A-1
  { "duration": "2.250",   "confidence": null,  "name" "M2",  "time" "9.668" }, — 605A-2
  { "duration": "112.452", "confidence": null,  "name" "M1",  "time": "11.918" }, — 605A-3
  ..........], "words" [   606A ⟶
{"duration": "0.360", "confidence": "0.995",  "name": "So",      "time" "6.067" }, — 607A-1
{"duration": "0.330", "confidence": "0.700",  "name": "has",     "time" "7.737" }, — 607A-2
{"duration": "0.230", "confidence": "0.871",  "name" "has",      "time" "8.098" }, — 607A-3
{"duration": "0.110", "confidence": "0.995",  "name": "it",      "time": "8.328" },
{"duration": "0.330", "confidence": "0.995",  "name": "sunk",    "time": "8.877" },
{"duration": "0.320", "confidence": "0.995",  "name": "in",      "time": "9.207" },    607A-7
{"duration": "0.140", "confidence": null,     "name" " ",        "time": "9.527" },
{"duration": "0.480", "confidence": "0.995",  "name" "Five",     "time": "9.668" },
{"duration": "0.540", "confidence": "0.995",  "name" "medals",   "time" "10.148" }, — 607A-9
{"duration": "0.180", "confidence": "0.995",  "name" "in",       "time": "10.748" }, — 607A-10
{"duration" "0.440", "confidence": "0.995",   "name" "five",     "time" "10.928" },
{"duration": "0.490", "confidence": "0.995",  "name" "games",    "time": "11.367" },
{"duration": "0.060", "confidence": null,     "name" " ",        "time": "11.857" },
{"duration": "0.110", "confidence": "0.584",  "name" "An",       "time" "11.918" },
{"duration": "0.560", "confidence": "0.598",  "name" "Armenian", "time" "12.027" },
{"duration" "0.310", "confidence": "0.995",   "name" "first",    "time" "12.637" },
{"duration": "0.410", "confidence": null,     "name" " ",        "time" "12.947" },
{"duration" "0.490", "confidence": "0.995",   "name" "It",       "time" "13.357" },
{"duration" "0.290", "confidence": "0.995",   "name" "really",   "time": "13.848" },
{"duration" "0.440", "confidence": "0.995",   "name" "hasn't",   "time" "14.137"},
{"duration" "0.250", "confidence": "0.995",   "name" "sunk",     "time" "14.578" },
{"duration" "0.240", "confidence": "0.995",   "name" "in",       "time" "14.828" },
{"duration" "0.340", "confidence": "0.569",   "name" "yet",      "time": "15.068"},
........]
607A-23

FIG. 6A

602B
{ "job": { "lang": "en-US", "Transcribed-lan": "en-US" , "user_id": 38,  "name": "ntVaOiv0S92Jash5UzMx1g.mp3", "duration": 1086, "created_at": "Fri Feb 27 12:12:30 2015",  "id": 23113 }, — 604B
"speakers": [
 {"duration": "3.601", "confidence": null, "name": "M1", "time": "6.067" },
 {"duration": "2.250", "confidence": null, "name": "M2", "time": "9.668" },
 {"duration": "112.452", "confidence": null, "name": "M1", "time": "11.918" },
 ..........], — 606B
"words-fr: [
                                                                                               607B-1
                                                                                       607B-2
 {"duration": "3.601", "confidence": "0.860", "name-fr": "Alors l'a fait pénétrer po", "time": "2.027"},
 {"duration": "2.250", "confidence": "0.995", "name-fr": "Cinq médailles en cinq matchs.", "time": "6.067"},
 {"duration": "112.452", "confidence": "0.700", "name-fr": "Une première Arménienne. Il n'a pas encore vraiment sombré.", "time": "9.668"},
                                                                                              607B-3

702 — 228
{"_id":"ntVaOiv0S92Jash5UzMx1g","user":"5489b6abe4b0e66fc6491c85","state":5,"metadata":{"title":"kim r.mp3"},"export":{"url":"http://
export.trint.co.s3.amazonaws.com/27gm2hVLR-mkw8aa-Wb_9g/ntVaOiv0S92Jash5UzMx1g.mp3","ssl_url":"https://s3.amazonaws.com/
export.trint.co/27gm2hVLR-mkw8aa-Wb_9g/ntVaOiv0S92Jash5UzMx1g.mp3"},
"transcript": 704
{"speakers":
{"M1":{"name":"M1"},"M2":{"name":"M2"},"F1":{"name":"F1"},"M3":{"name":"M3"},"F3":{"name":"F3"},"F9":{"name":"F9"},"F2":{"name":"F2"},"M4"
:{"name":"M4"},"F4":{"name":"F4"},"M6":{"name":"M6"},"M5":{"name":"M5"},"F5":{"name":"F5"},"M7":{"name":"M7"},"M8":{"name":"M8"},"M9":{
"name":"M9"},"F6":{"name":"F6"},"M10":{"name":"M10"},"F7":{"name":"F7"},"M11":{"name":"M11"},"M12":{"name":"M12"},"F8":{"name":"F8"}}, 707E-3
706E
"words-en":[                              707E-1            707E-6 —— 707E-2
{"duration":360,"confidence":0.995,"name":"So","time":6067,"speaker":"M1","para":"p0", strike":"false", "highlight":"false", "comment": null},
{"duration":330,"confidence":0.700,"name":"has","time":7737,"speaker":"M1","para":"p0": "strike":"false", "highlight":"false", "comment": null},
{"duration":230,"confidence":0.871,"name":"has","time":8098 "speaker":"M1","para":"p0""strike":"false", "highlight":"false", "comment": null},
{"duration":110,"confidence":0.995,"name":"it","time":8328,"speaker":"M1","para":"p0""strike":"false", "highlight":"false", "comment": null},
{"duration":330,"confidence":0.995,"name":"sunk","time":8877,"speaker":"M1","para":"p0""strike":"false", "highlight":"false", "comment": null},
{"duration":320,"confidence":0.995,"name":"in.","time":9207,"speaker":"M1","para":"p0""strike":"false", "highlight":"false", "comment": null},
{"duration":480,"confidence":0.995,"name":"Five","time":9668,"speaker":"M2","para":"p1""strike":"false", "highlight":"false", "comment": null},
{"duration":540,"confidence":0.995,"name":"medals","time":10148,"speaker":"M2","para":"p1""strike":"false", "highlight":"false", "comment"
null},                                             707E-9   707E-8      707E-7
{"duration":180,"confidence":0.995,"name":"in","time":10748,"speaker":"M2","para":"p1""strike":"false", "highlight":"false", "comment": null},
{"duration":440,"confidence":0.995,"name":"five","time":10928,"speaker":"M2","para":"p1""strike":"false", "highlight":"false", "comment": null},
{"duration":490,"confidence":0.995,"name":"games.","time":11367,"speaker":"M2","para":"p1""strike":"false" "highlight":"false", "comment":
null},                                                                                  707E-11
{"duration":110,"confidence":0.584,"name":"An" "time":11918,"speaker":"M1","para":"p2""strike":"false", "highlight":"false", "comment": null},
{"duration":210,"confidence":0.584,"name":"Armenian","time":11918,"speaker":"M1","para":"p2""strike":"false" "highlight":"false", "comment":
null},                                              707E-13             707E-12
.....]

706F
"words-fr":[
{"duration":1680,"confidence":0.86,"name":"Alors l'a fait pénétrer po", "time":2027, "speaker":"M1", "para":"p0" "strike":"false", "highlight":"false", "comment": null},　← 707F-1
{"duration":1550,"confidence":0.995,"name":"Cinq médailles en cinq matchs.", "time":6067, "speaker":"M1","para":"p1", strike":"false", "highlight":"false", "comment": null},
{"duration":1000,"confidence":0.695,"name":"Une première Arménienne. Il n'a pas encore vraiment sombré...", "time":9668, "speaker":"M1","para":"p2", strike":"false", "highlight":"false", "comment": null},　← 707F-2
....]　← 707F-3

{"duration":560,"confidence":1,"name":"American","time":12027,"speaker":"M1","para":"p2""strike":"false", "highlight":"false", "comment": null},

― 707F-3

{"duration":1000,"confidence":1,"name":"Une première Américain .Il n'a pas encore vraiment sombré..." "time":9668," speaker":"M1", "para":"p2""strike":"false" "highlight":"false", "comment": null},

FIG. 18

C'est peut-être comme si j'avais dit que c'est vraiment ça, je said ce que vous ressentez lorsque vous allumez le sapin pour la première fois.
Mais tout mettent toutes les décorations sur votre obtenir chaque année.
Vous avez le même sentiment que vous ne pouvez pas attendre.
Eh bien, c'est ce qui se produit chaque fois que le soleil sort de la place où nous éclairons le sapin de Noël et c'est parfait.

3910

3904 go there's a not yeah yeah yeah it's might like I said that I thought that is that exciting really I you know the feeling you get when you light up the Christmas tree for the first time.
But every put all the decorations on your getting every year.
It's the same feeling you can't wait alighted.
Well that's what happens every time the sun comes out that square we light up the Christmas tree and it's perfect.
now the thing about this the these mirrors and and the towns where is the

3900 it's might like I said that I thought that is that exciting really I you know the feeling you get when you light up the Christmas tree for the first time.
But every put all the decorations on your get every year.
It's the same feeling you can't wait alighted.
Well that's what happens every time the sun comes out that square we light up the Christmas tree and it's perfect.

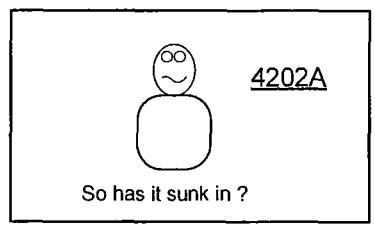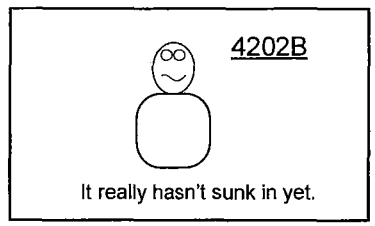
FIG. 42

GENERATING AND EDITING MEDIA

FIELD

This disclosure relates to a system and method for generating and editing media.

BACKGROUND

Speech-to-text (S2T) technology has been increasingly improved over the last decade, however the bulk of S2T technology is not directed towards certain users who work in areas that require extensive transcription and translation. For example, technological change has been slow to improve the typical translation and transcription processes within journalism.

At present, translation of language content output from a S2T process is a time-consuming, expensive and fragmented process. In some instances, content creators have dedicated translated language teams which monitor hours of press conferences and television broadcasts listening for key words, names or phrases. Translation of S2T output language content may also include the use of personnel with limited time, which may substantially delay and increase the cost of translation. Many of the resources required to complete the tasks related to generation of translated content are siloed.

In other instances, content creators simply do not have the financial resources to translate original works. For example, language translation may be completed by an external agency, with limited availability. Because of this, most news organizations simply don't bother translating their content. This hinders the potential dissemination of countless hours of news simply because translation is an unfriendly process; millions of people around the world miss out on global news and diverse content as a result, and newsrooms remain closed off from anyone who doesn't speak their primary language.

This also causes frustration for reporters and editors covering translated news as they struggle to understand what is being reported. These reporters and editors typically rely on costly translators, delaying their ability to turn around their stories efficiently.

BRIEF DESCRIPTION OF THE DRAWINGS

For a more complete understanding of this disclosure, reference is now made to the following description taken in conjunction with the accompanying drawings listed below, wherein:

FIG. 5 illustrates a manual transcription and translation of two example lines of an interview;

FIG. 6A illustrates content of a first portion of a transcript file of the interview of FIG. 5 as generated by the speech to text system of the media generating and editing system of FIG. 1, in accordance with aspects of the present application, the first portion including an English words array with word-level timing;

FIG. 6B illustrates content of a second portion of the transcript file of the interview of FIG. 5 as generated by the speech to text system of the media generating and editing system of FIG. 1, in accordance with aspects of the present application, the second portion including a French words array with sentence-level timing;

FIG. 7A illustrates edit data as content of the transcript file of FIG. 6A as modified by the translated media editing system of FIG. 1, in accordance with aspects of the present application;

FIG. 7B illustrates edit data as content of the transcript file of FIG. 6B as modified by the translated media editing system of FIG. 1, in accordance with aspects of the present application;

FIG. 18 illustrates a word object of the edit data of FIG. 7A, changed responsive to a word correction, in accordance with aspects of the present application;

FIG. 39 illustrates a translation UI in accordance with aspects of the present application;

FIG. 42 illustrates frames of video exported using the translation UI of FIG. 41 in accordance with aspects of the present application.

Figure 1:
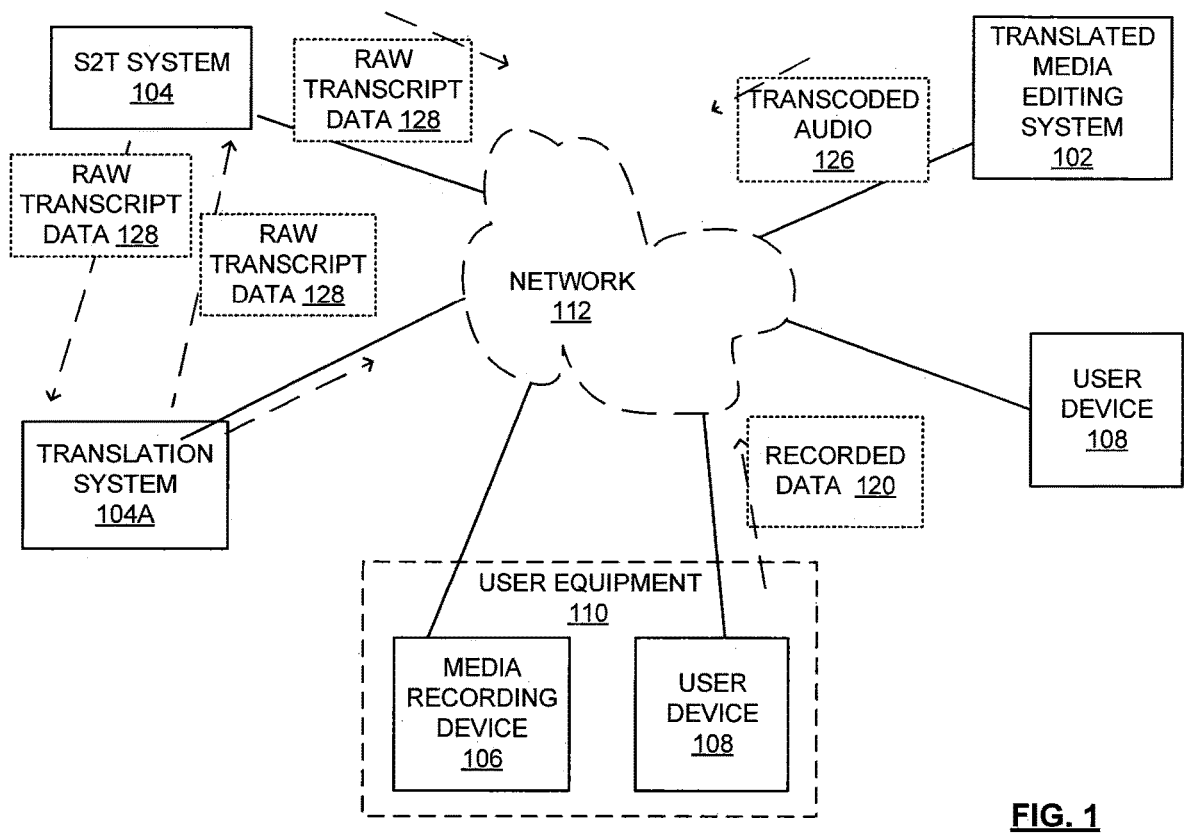
FIG. 1 illustrates, in a schematic diagram, a media generating and editing system that includes a speech to text system, a translated media editing system, a media recording device and a user device in an example of an environment to which example embodiments of the media generating and editing system can be applied in accordance with aspects of the present application.

Like reference numerals are used throughout the Figures to denote similar elements and features. While aspects of the present disclosure will be described in conjunction with the illustrated embodiments, it will be understood that it is not intended to limit the present disclosure to such embodiments.

DESCRIPTION OF EXAMPLE EMBODIMENTS

The present disclosure describes a translated media generating and editing system that, in various example embodiments, can take a recorded audio or A/V file and provide a user, such as a journalist, with an automatically transcribed transcript and a further translated transcribed transcript. Conveniently, the translated transcribed transcript may be presented in a language of the user's choosing. Furthermore, in at least some applications, the translated transcribed transcript is one or more of searchable, verifiable, editable and exportable. Example embodiments employ a system that incorporates speech-to-text automated solutions in combination with translation services to provide a fast and intuitive workflow that streamlines the complex way reporters and editors have traditionally worked.

In some example embodiments, the system provides a cloud-based platform for uploading audio and video (A/V) files and returns, in minutes, with a transcribed language text and a translated language text in accordance with a user's selection. The transcribed language text and the translated language text is precisely aligned with the original AN, making translated context easily searchable, verifiable and available in a timely manner. In example embodiments, word-level timings are used to provide an interactive transcript, transcribed or translated language, or both, in which the system highlights words as they are spoken and, conversely, the user can click on highlighted words to play an exact part in the A/V file. In various example embodiments, the media generating and editing system provides a platform that can provide users with one or more of precise timings, speaker identification, audio waveform and a simple text-aligned drag-and-drop edit and export system that allows for quick, accurate and efficient turnaround of content.

A possible environment in which example embodiments of a translated media generating and editing system can operate is illustrated in FIG. 1, which shows a distributed system in which a translated media editing system 102, a speech-to-text (S2T) conversion system 104, a media recording device 106 and multiple user devices 108 communicate with a communications network 112. The speech-to-text conversion system 104 may include translation capabilities (not shown), which enable the speech-to-text conversion system 104 to convert transcripts from one language to another language. In environments, the translated media generating and editing system may comprise a translation system 104A, which converts transcripts from one language to another language. The communications network 112 may include one or more wired communications networks or wireless communications networks or a combination of wired and wireless communications networks. The communications network 112 may include, among other things, one or more of the Internet, intranets operated by organizations or individuals, wired and wireless local area networks, wide area wireless networks such as cellular networks, cable networks, pico networks and public switched networks.

Figure 3:
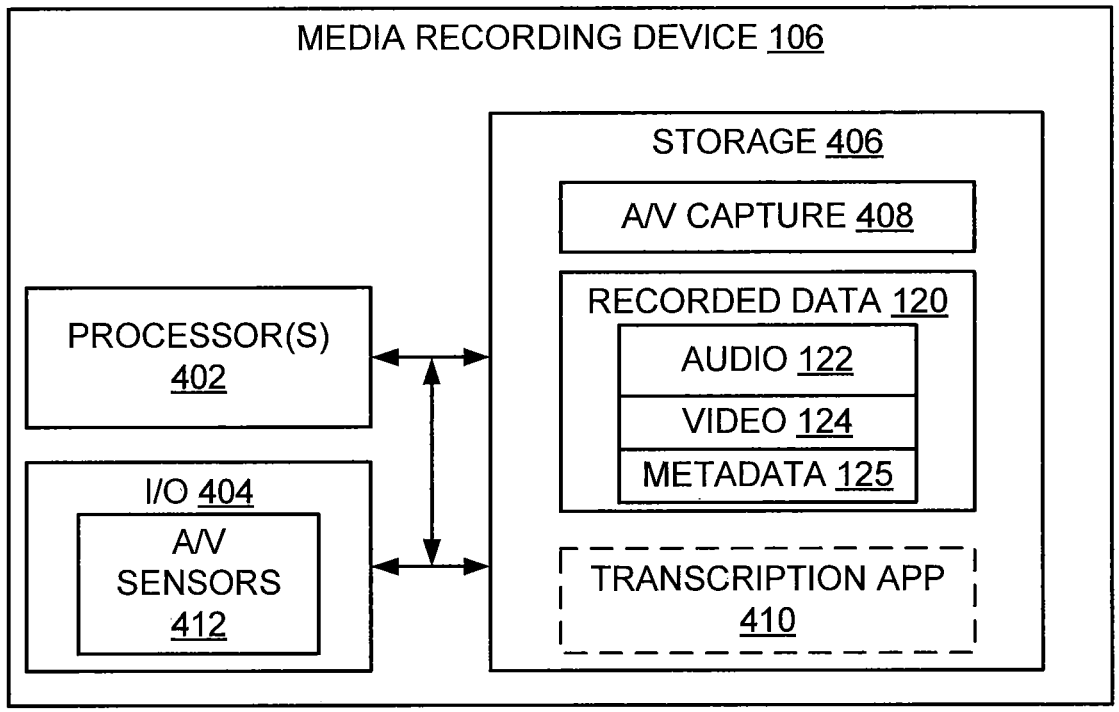
FIG. 3 illustrates, in a schematic diagram, the media recording device of FIG. 1 in accordance with aspects of the present application.

FIG. 3 illustrates a representative example of the media recording device 106. In the illustrated example, the media recording device 106 includes one or more digital processors 402, non-transitory digital storage 406 and input/output (I/O) devices 404. The digital storage 406, which may, for example, include one or more different types of electronic storage, stores data captured through input/output (I/O) devices 404 as well as instructions that configure the processor 402 to operate to perform the functions described herein. The I/O devices 404 include user input interfaces such as touch screens and buttons, user output interfaces such as display screens and speakers, communications interfaces for exchanging messages and data with network 112, and one or both of audio and video sensors 412 such as microphones and image capturing cameras. In the example media recording device 106, an NV capture application 408 provides instructions that configure the media recording device 106 to use the A/V sensors 412 to record and store a recorded data file 120 that includes an audio component 122 and, in some embodiments, a video component 124. The recorded data file 120 may also include metadata 125, which, for example, may include date stamp information and title information, among other things. In some example embodiments, the recorded data file 120 will be an audio file such as, but not limited to, an .mp3 file or a .wav file, or other digital audio file. In some example embodiments, the recorded data file 120 will be an A/V file (such as, but not limited to, a .mov, .avi or .MP4 file) that includes both the audio component 122 and the video component 124.

The media recording device 106 is enabled to transmit one or more files containing the recorded data file 120 through the network 112 to the translated media editing system 102. Such enablement can be effected in a number of different ways: in one example embodiment, the media recording device 106 includes one or more messaging applications that enable the recorded data file 120 to be sent as an attachment to an electronic message sent to an address associated with translated media editing system 102 such as an email message or a text message; in another example embodiment, the media recording device 106 includes a browser application that allows the media recording device 106 to access an upload web page maintained by the translated media editing system 102, thereby enabling the recorded data file 120 to be uploaded; in another example embodiment, a dedicated client transcription application 410 resides on the media recording device 106 to enable the recorded data file 120 to be uploaded to be translated by the translated media editing system 102.

In some example embodiments, the media recording device 106 is a dedicated A/V recording device. In some example embodiments, the media recording device 106 is implemented on a multi-purpose device, such as a smart phone, a tablet, a smart watch, a laptop computer or another computer device. In some embodiments, the media recording device 106 and one of the user devices 108 are combined and implemented on a single user equipment device 110 (see FIG. 1).

Figure 2:
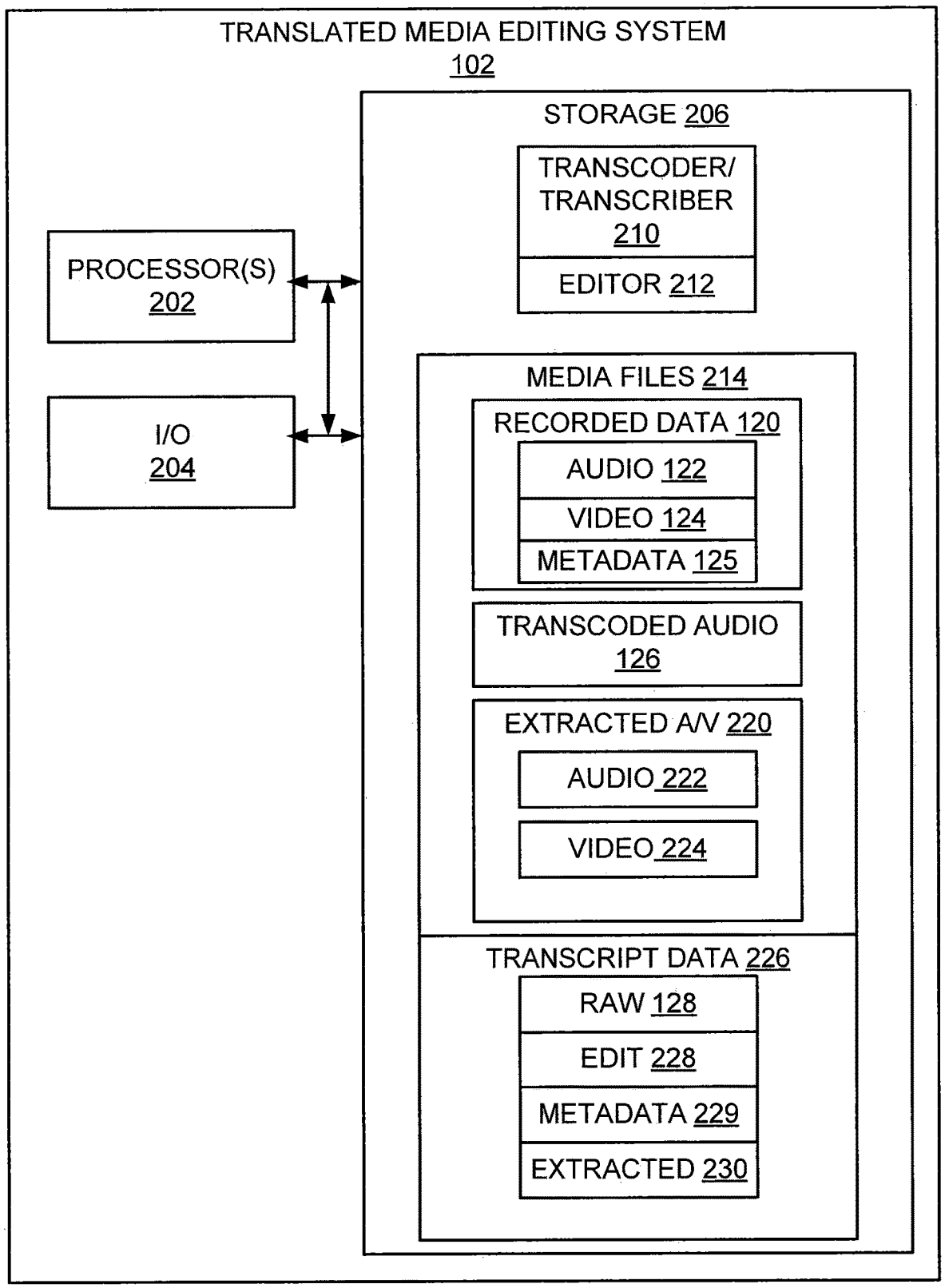
FIG. 2 illustrates, in a schematic diagram, the translated media editing system of FIG. 1 in accordance with aspects of the present application.

FIG. 2 illustrates a representative example of the translated media editing system 102 according to example embodiments. In the illustrated example, the translated media editing system 102 is implemented on one or more server systems and includes one or more digital processors 202, a non-transitory digital storage 206 and multiple input/output (I/O) devices 204. The digital storage 206, which may, for example, include one or more different types of electronic storage elements, hard-drives and database systems, stores instructions that configure the processor 202 to operate to perform the functions described herein. As will be explained in greater detail below, computer instructions stored in the storage 206 may, in various embodiments, include a transcoder/transcriber module 210 and an editor module 212. The storage 206 can also store data received through the I/O devices 204 as well as data obtained or generated by the processor 202 operating under instructions from the transcoder/transcriber module 210 and the editor module 212. The I/O devices 204 may include communications interfaces for exchanging messages and data with network 112. In example embodiments, the data stored on the storage 206 includes media files 214 that can include, among other things, the recorded data file 120 received from the media recording device 106. In some example embodiments, the data stored on the storage 206 includes media files 214 that were prepared or obtained from third party recording devices and not generated by the translated media editing system 102. The media files 214 that may also include extracted audio and/or video (NV) data 220. The extracted A/V data 220 may include an extracted audio component 222 and/or an extracted video component 224. In example embodiments, the storage 206 also stores transcript data 226, which includes files that contain speech converted text, translated text and other information that has been derived from the audio component 122 of the recorded data file 120, or derived from the text stored within transcript data 226. The transcript data 226 may include a raw transcript file 128, some edit data 228, some metadata 229 and some extracted data 230.

In at least some example embodiments, the translated media editing system 102 is configured, by the transcoder/transcriber module 210, to obtain transcript data 226 from the audio component 122 of the recorded data file 120. In this regard, in one example embodiment, the translated media editing system 102 is configured to transcode the audio component 122 of the recorded data file 120 into a format that is optimized for S2T conversion. By way of example, the audio component 122, as received from the media recording device 106, may be in a format or have a bit rate or other attributes that require adjustment to optimize transcription. By way of example, in one embodiment, the transcoder/transcriber module 210 is configured to transcode the audio component 122 from its existing format/bit rate into an MP3 file with a constant 128 kB bit rate and provide output in the form of a transcoded audio file 126. In some example embodiments, transcoding is done locally at the translated media editing system 102. However, in some embodiments, the audio component 122 is provided to a transcoding service via the communications network 112 and the resulting transcoded audio file 126 is received by the translated media editing system 102. In some example embodiments, transcoding of the audio component 122 may be omitted such that the transcoded audio file 126 and the audio component 122 are the same file.

In at least some example embodiments, the translated media editing system 102 is configured, by the transcoder/transcriber module 210, to obtain the translated transcript data 226 from an existing transcript among the transcript data 226, the existing transcript being derived from the recorded data file 120. In this regard, in one example embodiment, the translated media editing system 102 is configured to transcode the transcript data 226 of the recorded data file 120 into a format that is optimized for translation. The transcript data 226 may include an English language transcript, which may be in a format or have other attributes that require adjustment to optimize translation. By way of example, in one embodiment, the transcoder/transcriber module 210 is configured to transcode the transcript data 226 from its existing format into a txt file. In some example embodiments, transcoding is done locally at the translated media editing system 102. However, in some embodiments, the existing data stored among the transcript data 226 is provided to a transcoding service via the communications network 112 and the resulting transcoded transcript data 226 is received by the translated media editing system 102. In some example embodiments, the transcoded version of the existing transcript among the transcript data 226 may be retained such that the transcoded transcript is the only file retained among the transcript data 226. In some example embodiments, the transcript data 226 retains both a transcoded transcript and an original transcript among the transcript data 226.

In example embodiments, the translated media editing system 102 sends the transcoded audio file 126 over the communications network 112 to the S2T conversion system 104, which performs speech-to-text conversion on the transcoded audio file 126 and returns the corresponding raw transcript file 128 to the translated media editing system 102. The raw transcript file 128 is subsequently stored among the transcript data 226. In another example embodiment, once the translated media editing system 102 receives the raw transcript file 128, which is in the language of the audio component 122, the translated media editing system 102 sends the raw transcript file 128 to the translation system 104A, which translates the raw transcript file 128 into another language and returns an updated raw transcript file 128, which now contains the data pertaining to two separate language transcriptions. The translated media editing system 102 may be configured to store all transcripts, whether translated or transcribed, into one raw transcript file 128. In other embodiments, the translated media editing system 102 is configured to store each separate language transcript file in a separate file and only send the transcript desired to be translated to the translation system 104A. In some example embodiments, the translated media editing system 102 sends transcripts, which are, themselves, translated from the transcript in the language transcribed to the transcoded audio file 126, to the translation system 104A for further translation into another language. For example, the audio component 122 may be in English, a transcribed transcript may be generated in English and a version of the English transcribed transcript may be translated into French, to arrive at a French transcript. Subsequently, the translated media editing system 102 may send the French transcript to the translation system 104A to be translated into German. Alternately, the translated media editing system 102 may be configured to send only the English transcribed transcript to the translation system 104A and, subsequently, display the two translated languages requested for review by the user.

In an example embodiment, the translated media editing system 102 sends the transcoded audio file 126 over the network 112 to the S2T conversion system 104, which performs speech to text conversion on the transcoded audio file 126 and generates the corresponding raw transcript file 128. The S2T conversion system 104 also translates the raw transcript file 128 into a desired language, since the S2T conversion system 104 has the capabilities of the translation system 104A. Although the raw transcript file 128 can be stored in any one of a number of different formats, in an example embodiment, the raw transcript file 128 is a JavaScript Object Notation ("JSON") file, which is a language-independent, open data format that uses human-readable text to express data objects consisting of attribute-value pairs.

Figure 4:
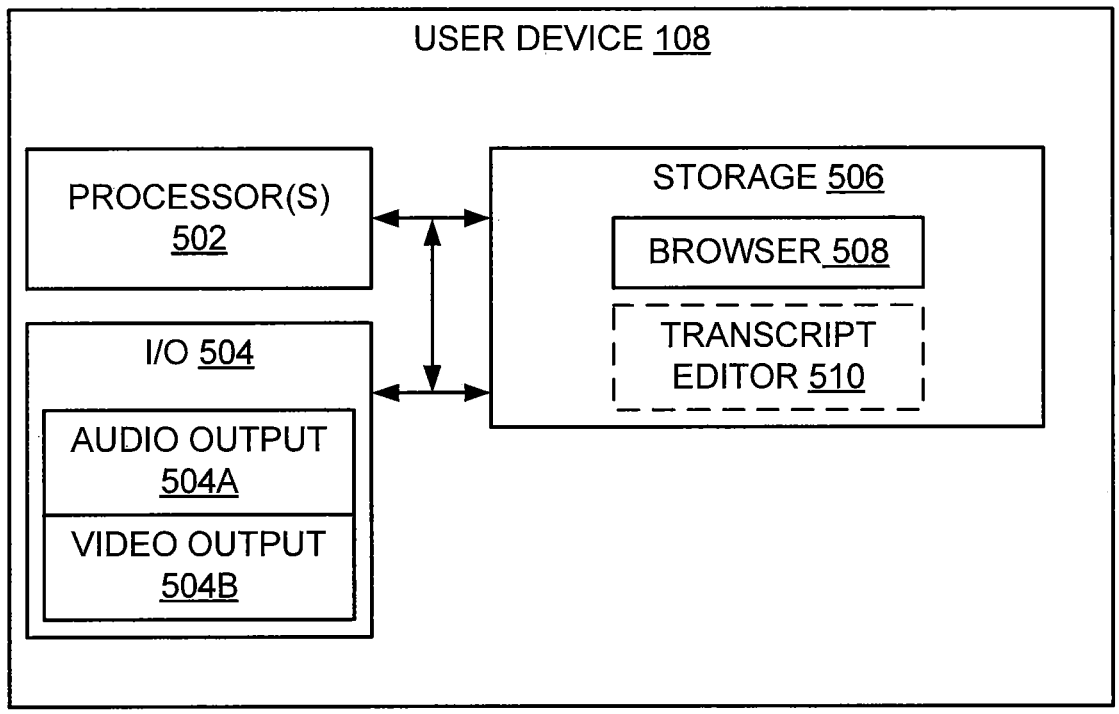
FIG. 4 illustrates, in a schematic diagram, the user device of FIG. 1 in accordance with aspects of the present application.

In example embodiments, the editor module 212 configures the translated media editing system 102 to allow user editing of the raw transcript file 128, including all language translations stored therein. In at least one example embodiment, the editor module 212 configures the translated media editing system 102 to function as a server-hosted editing application that is accessible to the remote client user devices 108 through the network 112. In this regard, FIG. 4 illustrates a representative example of the user device 108. In the illustrated example the user device 108 includes one or more digital processors 502, a non-transitory digital storage 506 and a plurality of input/output (I/O) devices 504 such as an audio output device (e.g., a speaker) 504A and a video output device (e.g., a display screen) 504B. The digital storage 506, which may, for example, include one or more different types of electronic storage, stores data captured through the I/O devices 504 as well as instructions that configure the processor 502 to operate to perform the functions described herein. The I/O devices 504 include user input interfaces such as touch screens and buttons, user output interfaces such as display screens and speakers, communications interfaces for exchanging messages and data with the network 112. In an example embodiment, the user device 108 includes a browser application 508 that allows the user device 108 to access the transcript editing functions of the translated media editing system 102 through the network 112 as a client device.

In some example embodiments, the user device 108 is implemented on a multi-purpose device such as a smart phone, a tablet, a smart watch, a laptop computer, a desktop computer or other computer device. As noted above, in some embodiments, the media recording device 106 and the user device 108 are combined and implemented on the single user equipment device 110.

The above description provides an example of a possible operating environment in which aspects of a media generating and editing system can operate. Such an overview having been provided, an example of a possible workflow for the media generating and editing system will now be provided with reference to the system components of FIGS. 1-4 and user experience examples as presented in the remaining Figures.

In an example embodiment, the workflow begins with a user (an interviewer in the present example) making a digital audio recording of an interview with an interviewee using the NV capture application 408 of the media recording device 106. However, the audio does not necessarily have to be generated by a known source, any audio file may be used by the translated media editing system 102. In order to provide context for describing the present example, FIG. 5 illustrates content for a manual transcription 520, in English, of an initial two lines of the interview. In the transcription 520, the male interviewer is labeled as "Jeff K" and the female interviewee is labeled as "Kim R." FIG. 5 also illustrates a manual translation 530, into French, of the first two lines of the interview. As can be seen in the English transcription 520, "Jeff K" makes a 15 word statement that includes a question, which is followed by a six word answer made by "Kim R." Similarly, the French translation 530 shows that the first line in French contains 13 words. The first line is followed by a second line, a six word answer. In the example embodiment, the interview continues for 18 minutes. At the conclusion of the interview, the recorded data file 120 with the audio component 122 (in the presently described example, an MP3 file) is stored in the storage 406 of the media recording device 106 for uploading to the translated media editing system 102. In one example embodiment, the interviewer causes the media recording device 106 to send the recorded data file 120 (which may for example be an MP3 file) to the translated media editing system 102 as an attachment to an email or other message. In some example embodiments, the processor 402 of the media recording device 106 executes a browser application, which the interviewer can access to use an upload interface hosted at the translated media editing system 102 to upload the recorded data file 120. In some examples, the processor 402 of the media recording device 106 may execute the resident client transcription application 410 that has been provided by the operators of the translated media editing system 102 and that provides an interface specifically for uploading the recorded data file 120 to the translated media editing system 102. Furthermore, although the above examples contemplate uploading of the recorded data file 120 to the translated media editing system subsequent to the completion of a recording session, in some example embodiments, the recorded data could be uploaded in batches throughout the interview process, or may be streamed, in real time during recording, to the translated media editing system 102. In still other example embodiments, the recorded data file 120 may be acquired from third parties, or accessed through any communication means, for example, a media recording of a press conference which is being streamed live, which provides an audio file of the conference as it streams.

In some embodiments, wherein the processor 402 of the media recording device 106 is adapted to execute the client transcription application 410, the client transcription application 410 may include a user interface that allows the metadata 125 to be refined or augmented with, for example, names of interview participants, interview location (which may include one or both of user entered data and Global Positioning System, "GPS," location information), interview title, time and date information, language and accent information, and local environmental data such as precipitation, temperature, wind conditions as measured by the recording device or retrieved from on-line weather sources.

In some example embodiments, the recorded data file 120 is transferred from the media recording device 106 to the user device 108 using the network 112 or a physical medium, such as a USB memory stick. Upload to the translated media editing system 102 may then be carried out between the user device 108 and the translated media editing system 102.

As described above, once the recorded data file 120 is uploaded to the translated media editing system 102, the audio component 122 may be transcoded, in at least some example embodiments, into a format that is optimized for S2T conversion. The resulting transcoded audio file 126 may then be provided, by the translated media editing system 102, to the S2T conversion system 104. As described above, the S2T conversion system 104 may have the capabilities to translate the transcoded audio file 126 into a transcribed language and a translated language, thereby generating the corresponding transcript data 226. The S2T conversion system 104 may then return the raw transcript file 128, which includes an additional translated transcript, to the translated media editing system 102. In the presently described embodiment, the additional translated transcript is a JSON file. As previously discussed, in the alternative, the S2T conversion system 104 or the translated media editing system 102 may seek out the translation system 104A, provide, to the translation system 104A, the desired language transcript that is to be translated from the raw transcript file 128. In return, the translation system 104A provides the raw transcript file 128 with an additional translated transcript. The raw transcript file 128 are ultimately communicated to the translated media editing system 102, whether directly from the translation system 104A or via the S2T conversion system 104. The data structure may be configured to store various language transcripts in the raw transcript file 128. In the instance illustrated in FIG. 6A, a first portion 128A of the raw transcript file 128 includes a file header metadata array 602A that includes a job identifier, file name, total transcript duration (in seconds) and a creation date stamp. Additionally, the raw transcript file first portion 128A includes a "speakers" array 604A and an English "words" array 606A.

The file header metadata array 602A may also include separate entries denoting the language of the transcript, "lang," the language of the transcribed language (which may act as a reference transcript) "transcribed-lan", a value indicating the respective language for each category, in this case "en-US." Data representing the audio file ID, language of the transcribed language, and the transcript language does not have be stored in the header of a transcript, and may be stored in any means such that the translated media editing system 102 is able to discern all three values from a single file source. In other example embodiments, representations of the three variables (the audio file ID, language of the transcribed language, and a transcript language), with respect to a transcript, are stored in a central repository, such as the metadata 125 of the translated media editing system 102, such that the translated media editing system 102 is able to discern the above information with reference to a central repository and link the information with all transcript data 226. In another example embodiment, the translated media editing system 102 is implemented using a data structure that allows the translated media editing system 102 to determine the values for the audio file ID, language of the transcribed language, and a transcript language based on a system storage organization. In one example embodiment, audio file IDs are assigned to audio files sequentially and the transcribed language of the audio and the transcript language may be represented by an integer in a file system or with a supplemented value. For example, the translated media editing system 102 may be able to determine that file no 0001-01-02 is a transcript of audio file 0001, the transcribed language (and therefore authoritative transcript) is English (01), and the transcript language is French (02).

The speakers array 604A includes a plurality of speaker objects: a first speaker object 605A-1; a second speaker object 605A-2; and a third speaker object 605A-3 (individually or collectively 605A). Each speaker object 605A includes a plurality of attribute:value pairs. In the illustrated example, the S2T conversion system 104 generates a new object in the speakers array 604A for each instance in which the S2T conversion system 104 detects a speaker transition and each speaker object 605A includes attribute:value pairs that define: (1) the speaker—"name"; (2) the time into the recording that the speaker started speaking—"time"; and (3) the duration that the speaker speaks until transition to a different speaker "duration." The speaker objects 605A of FIG. 6A also includes a speaker "confidence" attribute, which is not active (value="null") in the illustrated speakers array 604A. The speaker confidence attribute can be used to illustrate a degree of confidence that the S2T conversion system 104 has in the accuracy of the "name" attribute. The values assigned to the "name" attribute in speaker objects 605A of the speakers array 604A can, for example, be M1, M2, . . . Mn or F1, F2, . . . Fn to identify a male speaker 1, male speaker 2, male speaker n, female speaker 1, female speaker 2, female speaker n, etc. Accordingly, the speakers array 604A in FIG. 6A indicates that male speaker 1 speaks at 6.067 seconds into the interview for a duration of 3.601 seconds (see the first speaker object 605A-1), followed by male speaker 2 at 9.668 seconds into the interview for a duration of 2.250 seconds (see the second speaker object 605A-2), returning again to male speaker 1 at 11.918 seconds for a duration of 112.452 seconds (see the third speaker object 605A-3).

It will be noted for future reference, from the manual transcript 520 of FIG. 5, that the speaker data in the speakers array 604A is incorrect, as the interview includes only two speakers, a male speaker and a female speaker.

The English words array 606A includes a plurality of word objects, including: a "So" word object 607A-1; a first "has" word object 607A-2; a second "has" word object 607A-3; a "." word object 607A-7; and a "yet" word object 607A-23. Collectively or individually, the word objects may be associated with reference numeral 607A. Each word object 607A includes a plurality of attribute:value pairs associated with a specific transcribed word. In the illustrated example, the S2T conversion system 104 generates a new object in the English words array 606A for each instance where the S2T conversion system 104 detects a new word or punctuation character and each word object 607A includes attribute:value pairs that define: (1) the detected word or punctuation symbol—"name"; (2) time into the audio file that the word commences—"time", in seconds; (3) duration of the audio associated with the word—"duration" in seconds; and a confidence level, on a scale of 0-1, that the word has been correctly transcribed—"confidence." For example, the word object 607A-2 specifies that the word "has" is spoken commencing at 7:737 seconds into the interview recording, has a duration of 0.330 seconds and the S2T conversion system 104 has a 70% confidence that "has" is the correct word. The word object 607A-7 provides an example of a word object 607A representing a punctuation mark.

As discussed previously, the translated media editing system 102 may have sent instructions to the S2T conversion system 104 to send the raw transcript file 128 to the translation system 104A once the transcoded audio is converted to the raw transcript file 128 by the S2T conversion system 104. In such an embodiment, the data structure may store the file header metadata array 602A, the speakers array 604A and the English words array 606A in FIG. 6A as one file and label the one file to represent the language of the transcript text words. In another example embodiment, the S2T conversion system 104 may transcribe and translate the raw transcript file 128 and generate a single file to store in the data structure containing the transcribed and translated language text words, in a manner described above. Alternatively, the S2T conversion system 104 may transcribe and translate the raw transcript file 128 and generate two separate files to store the transcribed and translated language text respectively, in the manner described below.

Referring to FIG. 6B, in one example embodiment, the transcribed and translated language text words are stored in two separate files in the data structure. FIG. 6B is an example embodiment of translated language text word file of FIG. 6A. In the instance illustrated in FIG. 6B, a second portion 128B of the raw transcript file 128 includes an alternative file header metadata array 602B that includes a job identifier, file name, total transcript duration (in seconds) and a creation date stamp. Additionally, the second portion 128B of the raw transcript file 128 includes an alternative speakers array 604B and a French words array 606B. The alternative file header metadata array 602B of FIG. 6B may store similar data to the file header metadata array 602A of FIG. 6A, or the alternative file header metadata array 602B of FIG. 6B may simply store enough data to allow the system to link the file to the transcribed language transcript. Similarly, an alternative speakers array 604B in FIG. 6B may include information pertaining to the speakers as described in relation to the speakers array 604A of FIG. 6A, or no data at all. In the event that the alternative file header metadata array 602B and the alternative speakers array 604B are not present in the translated language file, the translated media editing system 102 may be implemented so that the translated media editing system 102 automatically recognizes that any values missing from the translated data structure are intended to be identical to the transcribed language information. The translated media editing system 102 may be implemented such that any data aside from the translated language text words are not stored in the translated language file and all non-text transcribed language data is automatically presumed to be the data to be utilized in all instances related to the audio component 122 of the recorded data file 120. In other example embodiments, the translated language file may store any data related to the audio component 122 required for the translated language file to be displayed in the translated media editing system 102 without reference to the transcribed language file.

The French words array 606B is created by the translation system 104A to store a translated French text word or punctuation symbol in the "name" attribute, as was done with the "name" attribute for English text in FIG. 6A. In contrast to the English words array 606A of FIG. 6A, the French words array 606B includes a plurality of French sentence objects 607B-1, 607B-2A, 607B-3 (collectively or individually 607B) and each French sentence object 607B includes a plurality of attribute:value pairs. In FIG. 6B, collections of the translated text words are stored together in the French sentence objects 607B that are based on a paragraph number (not illustrated) associated with each of the English text words and the timing data of the individual words in FIG. 6A is combined into sentence-level timing.

In FIG. 6A, the attribute value "confidence" denotes a confidence level that the word has been correctly transcribed. The attribute value "confidence" is provided by the S2T conversion system 104, as part of the raw transcript file first portion 128A. In FIG. 6B, the attribute value "confidence" denotes a collective confidence value that the original words on which sentence translation is based have been correctly transcribed and is represented by a value between 0-1. As will be seen in FIG. 7B, the confidence value may be limited to a sentence, paragraph or other non-word level and, as such, all word entries within a level will have the same confidence value.

In some example embodiments, the confidence of transcription value may be provided on a per word level depending on the capabilities of the translation system 104A. In these instances, the translated media editing system 102 stores the unique confidence value in association with the corresponding translated language text words. In other example embodiments, the translated media editing system 102 assigns a value to the translated language transcript confidence level on the basis of the confidence of the transcription of the transcribed language text.

In yet other example embodiments, the translated media editing system 102 may use an algorithm to assign a series of confidence values to translated language text on a per word basis, derived from sentence level confidence of transcription values, such that the individual translated language text words have unique values of confidence. The translated media editing system 102 may assign these confidence of transcription values notwithstanding the word length basis confidence of transcription values provided by the translation system 104A or confidence values provided by the S2T conversion system 104. For example, while the average confidence value on a per-sentence level remains consistent with the information provided by the translation system 104A, the translated media editing system 102 may assign a per word confidence value to translated language text words by using an averaging function based on number of words in a sentence. In another example embodiment, the translated media editing system 102 may assign per word confidence values to translated language text words using a normalized distribution function or other approximation method. The above example is intended to be non-limiting and a person skilled in the art will appreciate that various means of assigning a confidence value to translated text words, which incorporate the use the confidence of transcription values and averaging on a per-word basis or other unit.

Returning to FIG. 6B, the French words array 606B show translated language text attributes on per paragraph basis. The translated media editing system 102 may generate paragraph level attributes, including timing data, by dividing the transcribed language transcript into word units, including more than one word, as opposed single words, and sending the word units to the translation system 104A. The translation system 104A would return translated language text words to the translated media editing system 102 and the translated media editing system 102 is able to correlate the aggregate attributes of the words that comprise the word units of the transcribed language text words into the returned translated language text words, including aggregate timing data. The translated media editing system 102 is able to control the amount and relative location of transcribed language text words from a transcribed language transcript sent to the translation system 104A. The translated media editing system 102 is able to determine the size of the word units to be sent to the translation service and to add the returned translated language text words to a translated language text file in the correct position in the transcript based on the text words sent to the translation system 104A.

In one example embodiment, the translated media editing system 102 determines word unit sizes, proportions the transcribed transcript into sequential word units, and sends the word units sequentially to the translation system 104A. The translated media editing system 102 then builds a translated language transcript by sequentially adding the returned translated word units into a translated language transcript file. For example, in one embodiment, the translated media editing system 102 sends sentence level transcribed text words to the translation system 104A, allowing the translated media editing system 102 to establish the transcribed language text words sentence to the corresponding translated language text words sentence received. In some embodiments, the translated media editing system 102 sends transcribed language text words on a per word basis to the translation system 104A.

In another example embodiment, the translated media editing system 102 determines word unit sizes based on the confidence level associated with the transcribed language word transcription, and data relating the word units' position in the transcript to one another. Translated media editing system 102 sends the transcribed word units with a confidence level above a certain threshold to the translation system 104A for translation first, and then the remaining word units, stitching the word units back into their original positioning to generate a translated language transcript. In other example embodiments, the translated media editing system 102 identifies multiple tranches of confidence levels and sends the word units in accordance with the tranches of confidence levels for translation.

The translated media editing system 102 may also utilize the translation system 104A, which provides timing data on a word level correlating the transcribed language text words to the translated language text words. For example, the translated media editing system 102 may send a transcribed language transcript with timing data to the translation system 104A, which returns a transcript, which has timing data related and/or correlated to the timing data sent by the translated media editing system 102.

In some example embodiments, the translation system 104A returns, to the translated media editing system 102, translated language text words with word-level timing data, regardless of the length of transcribed language text words sent to the translation system 104A. In other example embodiments, the translation system 104A returns, to the translated media editing system 102, translated language text words with sentence-level timing data, regardless of the length of transcribed language text words sent to the translation system 104A.

In any instance where the translated media editing system 102 is not provided word-level timing data for the translated language transcript by the translation system 104A, the translated media editing system 102 may use the timing data provided by the translation system 104A and convert the timing data into word-level timing data through techniques as discussed above with respect to confidence values. Such techniques may include averaging the provided timing data over every word captured by the timing data, averaging by character length, using a normal distribution, etc. It is contemplated that word-level timing data could be generated using approximate utterance lengths determined via statistical means. It is also contemplated that word-level timing data could be modified post-generation via a user interface.

In some example embodiments, where more accurate, word specific timing data is required, for example, where the a particular sentence length or word unit length is long, the translated media editing system 102 may (1) parse the transcribed language text words sent to the translation system 104A into smaller word units, and (2) utilize the smaller word-level timing data in combination with the averaging techniques described above to generate further timing data.

In one example embodiment, the translated media editing system 102 is provided with translated language text words by the translation system 104A. The translated language text words further comprise a confidence of transcription parameter in addition to sentence level, paragraph level or other timing data that is not word level based. The translated media editing system 102 may create word-level timing data based on the confidence of transcription through a variety of means. In one example embodiment, the translated media editing system 102 receives confidence of transcription data and timing data on a sentence level from sentences sent to a translation system such as the translation system 104A, and generates word-level timing data by (1) identifying the sentence(s) that have the highest confidence of transcription value, of a value higher than a certain threshold, and (2) generating word-level timing data through techniques such as averaging, assigning timing data based on word character length, etc., using the sentence-level timing data for the high confidence sentences, and (3) generating, either as a separate set of data or overriding the previous entry of, word-level timing data, as described above, for the whole transcript, wherein the timing data includes at least some reference to the word-level timing data of the high confidence sentences. Storing timing data in this manner allows the translated media editing system 102 to generate translated language files with full timing data correlated to the audio without the need to refer to the transcribed transcript. Storing data in this manner may also require less bandwidth given that the system will be able to exclude sentences, paragraphs or other word unit for retranslation which already have a confidence value above a threshold.

In certain embodiments, the translated media editing system 102 may use the above described technique but, instead of selecting based on confidence of transcription, the translated media editing system 102 may make timing level data dependent on high threshold values of confidence of transcription.

In yet another example embodiment, the translated media editing system 102 may generate new word timing level data by sending word units corresponding to a selected time to the translation system 104A and, subsequently, using averaging techniques to determine word-level timing data. For example, the translated media editing system 102 may send incremental data to the translation system 104A. The incremental data corresponds to word units that comprise three seconds of duration. The translated media editing system 102 may, subsequently, generate word-level timing data in the translated language transcript by assigning a duration to each word determined by dividing three seconds with the amount of translated language text words returned by the translation system 104A.

In another example embodiment, where only paragraph level or less specific timing is available, the translated media editing system 102 can generate the sentence level values by matching the punctuation marks in the transcribed language transcript to the punctuation marks in the translated language transcript. For example, the translated media editing system 102 can determine that the first paragraph in FIGS. 6A and 6B contains three period "." values and one question mark'value "?". Accordingly, the translated media editing system 102 can determine sentence-level timing for the translated language transcript by assigning the words between the punctuation marks to sequentially appropriate sentence values in the translated language transcript.

The translated media editing system 102 is able to request or allow a user to select a language into which to translate the recorded data file 120. For example, the user may be prompted, upon entering the system, to indicate which translated language is desired. In another embodiment, the translated media editing system 102 may contain a button or some other form of user input to allow the user to select the desired translated language into which to have the recorded data file 120 translated. Once the user provides a selection of the desired translated language, the translated media editing system 102 sends an indication of the selection, along with the transcoded audio file 126, to the S2T conversion system 104 or, in some instances, sends an indication of the selection and the raw transcript file 128 (if previously generated) to the translation system 104A. In certain embodiments, the translated media editing system 102 queries either the S2T conversion system 104 or the translation system 104A prior to receiving user input to determine which translation services are available and only presents the user with the ability to select available translation languages.

In example embodiments, the raw transcript file 128 provided by the translation system 104A may not be in an optimized format for use by the editor module 212 of the translated media editing system 102. Referring now to FIG. 6B, which data is presumed to be in one file along with the data in FIG. 6A, for example, in the raw transcript file 128, the speaker information and transcribed word information are spread out over three arrays: the alternative file header metadata array 602B; the alternative speakers array 604B; and the French words array 606B. These three arrays may not permit the most efficient processing in a cloud-based client-server editing environment. Accordingly, in an example embodiment, the translated media editing system 102 may be configured, by one of the transcoder/transcriber module 210 or the editor module 212, to convert the raw transcript file 128 into the edit data 228 that is optimized for editing. In this regard, FIG. 7A illustrates a transcript excerpt of the transcribed and translated language of FIG. 6A as converted, by the translated media editing system 102, into the transcribed and translated language edit data 228, which, in the example embodiment, is also a JSON file.

In the transcribed and translated language edit data, stored in the edit data 228 and shown in FIG. 7A, header information 702 includes, among other things, a file identifier (ntVaOiv0S92Jash5UzMx1g.mp3) that identifies the transcoded audio file 126 from which the transcript has been derived, as well as title metadata (kim r.mp3) and other file and user identification information. The translated media editing system 102 in this example is configured to recognize that there are two transcripts present, as there are two "words" arrays: an English words array 706E; and a French words array 706F. In other embodiments, the transcribed language will be stored in an array not specifying a language, which will indicate that it is the transcribed text. In the illustrated embodiment, as part of the optimization process, the information found in the speakers array 604A of the raw transcript file 128 (see FIG. 6A) is incorporated, by correlating the timing information in the speakers array 604A and the English words array 606A, with the English words array 706E and the French words array 706F of the edit data 228. The speakers array 604A is replaced, in edit data 228, with an object 704 that provides a table that allows speaker names to be associated with speaker variables. This table will be discussed in greater detail below.

The English words array 706E includes: a "So" word object 707E-1; a first "has" word object 707E-2; a second "has" word object 707E-3; an "in." word object 707E-6; a "Five" word object 707E-7; a "medals" word object 707E-8; an "in" word object 707E-9; an "An" word object 707E-12; and an "Armenian" word object 707E-13. Collectively or individually, the English word objects may be associated with reference numeral 707E. The French words array 706F includes: a first French sentence object 707F-1; a second French sentence object 707F-2; and a third French sentence object 707F-3. Collectively or individually, the French sentence objects may be associated with reference numeral 707F.

As can be seen in FIG. 7A, the English words array 706E and the French words array 706F, in the edit data 228, include a number of attribute:value pairings for each of the English word objects 707E and the French sentence objects 707F than the number of attribute:value pairings in the respective English word objects 607A and respective French sentence objects 607B of FIGS. 6A and 6B thereby allowing for enhanced editing features. In particular, although many different types of attributes are possible, in the illustrated example, the following pairings are provided in the object for each transcribed word:

"duration": (milliseconds)
"confidence": (0-1)
"name": (string representing the transcribed word)
"time": (milliseconds)
"speaker": (string and id)
"para": (string p1-pn)
"strike": (true/false)
"highlight": (true/false)
"comment": (string)

In at least some example embodiments, an additional pairing "parcomment":(string) is also included for each word object.

As can be seen from comparing the data of FIGS. 7A and 7B to the data of FIGS. 6A and 6B, as part of the optimization process carried out by translated media editing system 102, punctuation marks are not accorded a separate object entry in the "words" array 706E but, rather, are included as part of the immediately preceding word object. By way of example, the raw transcript file 128 includes the "in" word object 607A-6 and the "." word object 607A-7. In the edit data 228, the period has been incorporated into the word object for "in", such that the word objects 607A-6 and 607A-7 have been replaced with the single "in." word object 707E-6.

It will further be noted that the second-based timing in the raw transcript file 128 has been replaced with millisecond-based timing in the edit data 228 in order to minimize processing of decimal level numbers.

In one example embodiment, not shown, as part of the generating word-level timing data, the information found in the French words array 606B of the raw transcript file 128, and the corresponding "duration" attribute, is manipulated to generate new timing data. In FIG. 7B, the French words array 706F is generated by the translated media editing system 102 sending the transcribed text to the translation system 104A. The translation system 104A returns translated text words on a paragraph level. This may be the case in order to generate more accurate translation, as word level translations are considered to be not as accurate as paragraph level translation in that the translation system 104A may benefit from sentence context. The translated media editing system 102 then takes the duration value associated with the duration attribute, determines a paragraph level by checking for new lines, spaces or other punctuation and adds all word level duration values into a paragraph level duration value. For example, the English word objects 707E shown in FIG. 7A have a combined duration of 3920, whereas the duration of the first French sentence object 707F-1 in the French words array 706F is 4320. The translated media editing system 102 may also determine per word timing data for the translated text, not shown, by dividing the duration value by the number of translated text words, generating word-level timing on a per paragraph basis.

In another embodiment, as part of the optimization process, the information found in the alternative speakers array 604B of the second portion 128B of the raw transcript file 128 is incorporated, by correlating the timing information in the alternative speakers array 604B and the French words array 606B, into the French words" array 706F of the edit data 228. The alternative speakers array 604B is replaced, in the edit data 228, with a speakers object 704 that provides a table that allows speaker names to be associated with speaker variables, which will be discussed in greater detail below.

In the same fashion to the English words array 706E in FIG. 7A, the French words array 706F in the edit data 228 includes a number of attribute:value pairings that is greater than the number of attribute:value pairings in the French words array 606B of FIG. 6B, thereby allowing for enhanced editing features. The attribute "confidence" with values between 0-1 is based on the confidence of transcription, as discussed above in relation to FIG. 6A.

The English word objects 707E of the edit data 228 in FIG. 7A include a paragraph attribute ("para") associating each word/paragraph object in the English words array 706E and the French words array 706F with a paragraph in the transcribed text. In the illustrated embodiments, a new incremented "para" value is set whenever the timing data from speakers array 604A indicates a speaker transition; for example, the "So" word object 707E-1 has a "para" value of "p0" and a "speaker" value of "M1", as illustrated at the second speaker object 605A-2 of the first portion 128A of the raw transcript file 128, at "time": 9.668s, the "speaker" value transitions to "M2" and, accordingly, in the "Five" word object 707E-7 in the edit data 228, it is notable that the "para" value has been incremented to "p1" and the "speaker" value has been set at "M2"; as illustrated at the third speaker object 605A-3 of the first portion 128A of the raw transcript file 128, at "time":11.918 s, the "speaker" value has transitioned back to "M1" and, accordingly, in the "An" word object 707E-12 in the edit data 228, the "para" value has been incremented to "p2" and the "speaker" value has been set at "M1".

The attributes "strike", "highlight", "comment" and "parcomment" are provided to support editing functions as described in the following. The attribute:value parings associated with each transcribed word, as set out in the preceding, are merely examples of one possible embodiment; in various alternative embodiments, more or fewer attribute:value pairings can be provided.

In example embodiments, the translated media editing system 102 is configured, by the editor module 212, to allow the remote user device 108 to use the browser application 508 to access and modify the edit data 228 through the network 112. The user experience of a person using the user device 108 to access the translated media editing system 102 will now be described.

Figure 8:
FIG. 8 illustrates a log-in user interface (UI) screen in accordance with aspects of the present application.
Figure 9:
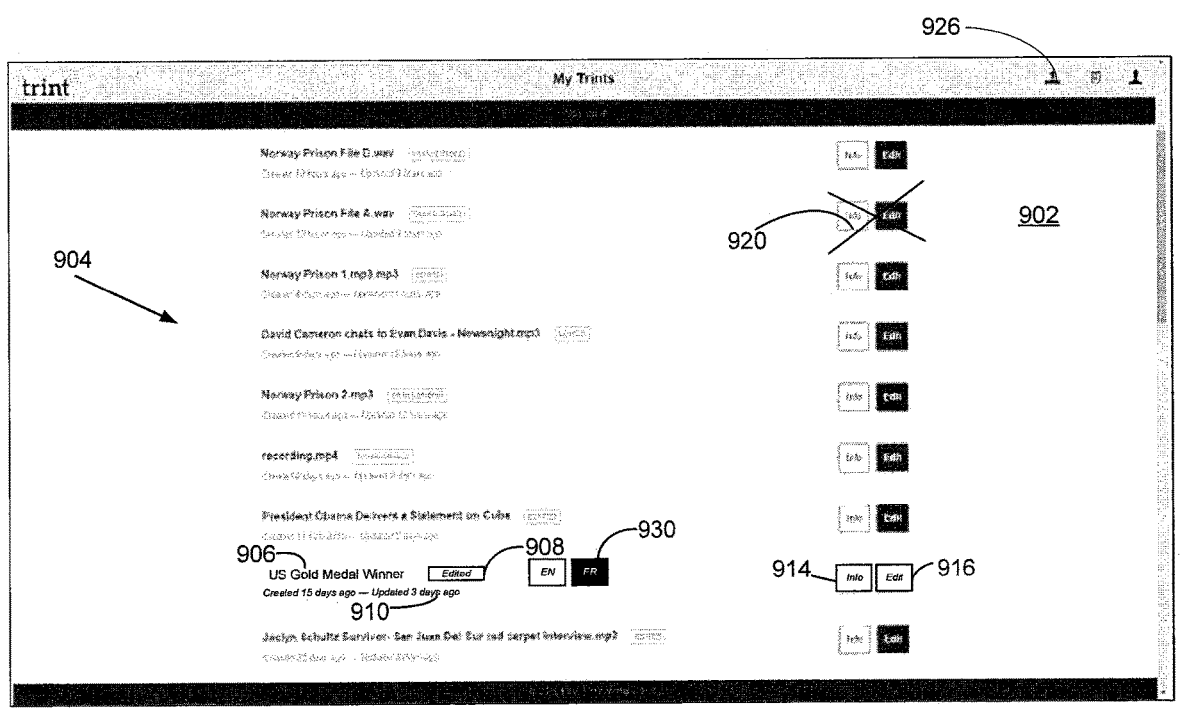
FIG. 9 illustrates a UI screen that lists transcribed and translated data files, with each file associated with an "Info" button in accordance with aspects of the present application.
Figure 10:
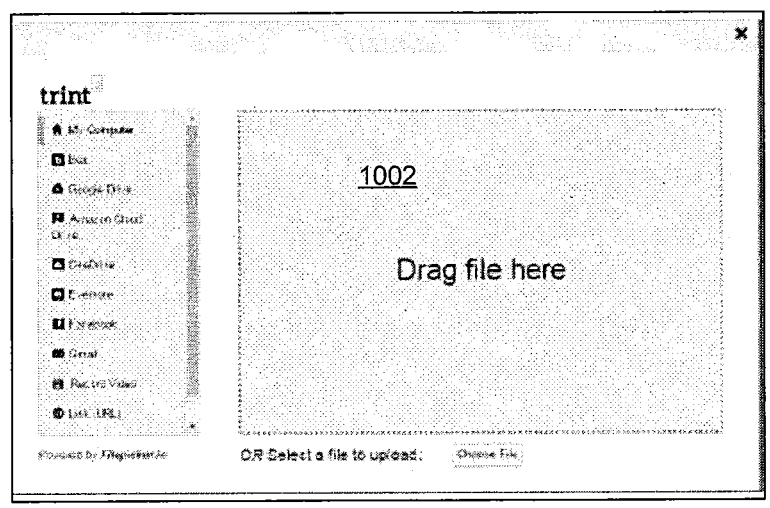
FIG. 10 illustrates a UI upload screen in accordance with aspects of the present application.

FIG. 8 illustrates a secure log-on page 802 for the translated media editing system 102, as presented by the browser application 508 on the display screen 504B of the user device 108. As seen in FIG. 9, in an example embodiment, after a registered user logs on, the user is then presented with a user interface (UI) screen 902 that presents a list 904 of files, containing the transcribed edit data 228, that are associated with the user and that the user is authorized to access. The UI screen 902 of FIG. 9 includes an upload button 926 that allows the user to upload the recorded data file 120 to the translated media editing system 102 for editing. In this regard, FIG. 10 displays an example of an upload dialog box 1002 that is displayed on the user display screen 504B responsive to user selection of the upload button 926. As can be seen from FIG. 10, the upload dialog box 1002 presents a number of options for drag-and-drop upload selection of the recorded data file 120. Once the recorded data file 120 has been uploaded to the translated media editing system 102, the recorded data file 120 may be processed in the manner described in the preceding and the recorded data file 120 may be added to the list 904 that is displayed in the UI screen 902 of FIG. 9.

As shown in FIG. 9, a plurality of files, containing the edit data 228, appear on the UI screen 902 of FIG. 9 in the list 904. The files are identified by a title field 906 (for example "US Gold Medal Winner", which corresponds to the interview data illustrated in FIGS. 5, 6A, 6B and 7), and include the following associated status fields: (1) a creation/edit date field 910, which indicates when the file of the edit data 228 was first created and last edited in the translated media editing system 102 (for example, the creation/edit date field 910 may display "Created 15 days ago—Updated 3 days ago); and (2) a Transcription/Edit field 908, which indicates if the file of edit data 228 is newly transcribed or has been previously edited by a user (for example, the Transcription/Edit field 908 may display "Transcribed" to indicate a file for which the translated media editing system 102 has produced a new version of the edit data 228 but which has not yet been edited by the user and the Transcription/Edit field 908 may display "Edited" to indicate a file that has been previously edited by a user). A language field 930 may display a selected language transcript in relation to the data displayed in the transcription/edit field 908 and the creation/edit date field 910. An "info" button 914 and an "edit" button 916 may also be associated with the title field 906 for the file of the edit data 228. In alternative embodiments, the language field 930 may be a drop down menu populated by available transcripts as opposed to buttons. In example embodiments, the information that is used to display the elements of the list 904 is created by the translated media editing system 102 and stored as the metadata 229 in the storage 206. The metadata 229 may be updated, by the translated media editing system 102, whenever a new file of edit data 228 is added to the storage 206 or an existing file is edited. The edit data 228 functions as an index to the information stored as the transcript data 226 by the translated media editing system 102. In some example embodiments, the metadata 229 is stored in a separate storage location than the files that make up the edit data 228.

Figure 11:
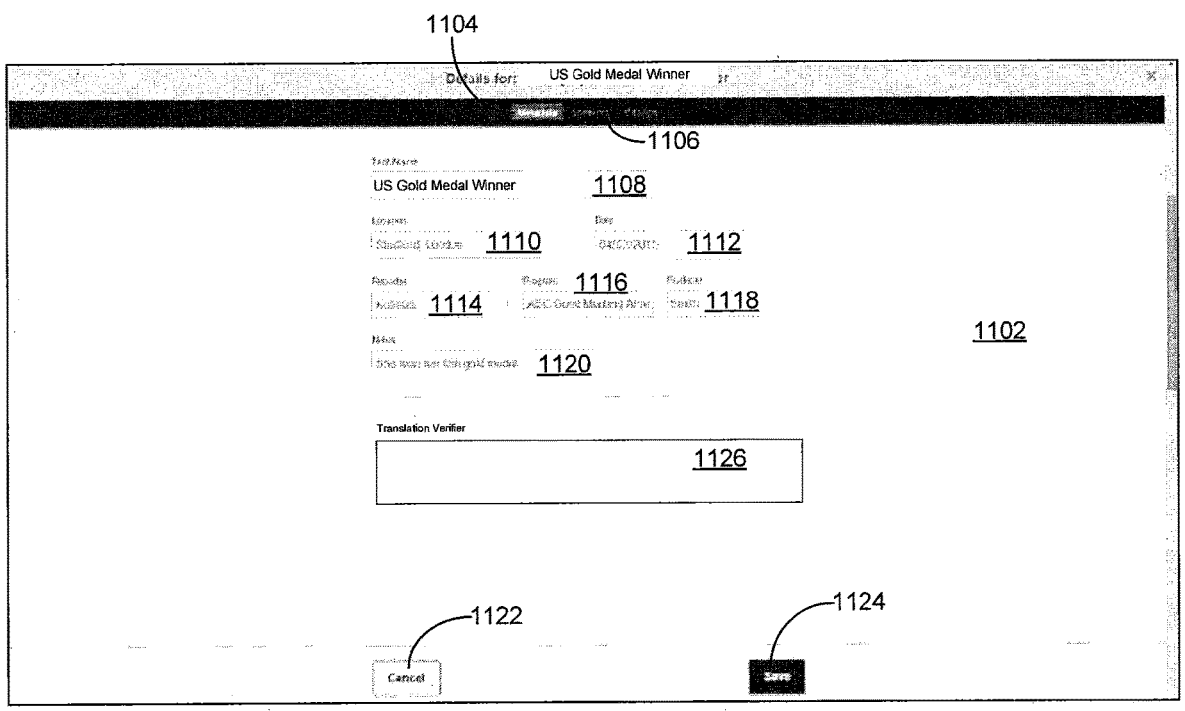
FIG. 11 illustrates a UI screen that is displayed, in accordance with aspects of the present application, for a list item in FIG. 9 when an associated "Info" button is selected, the UI screen includes a "Speakers" button.

As seen in FIG. 9, the "Info" button 914 and the "Edit" button 916 are also displayed in association with each item in the list 904. The "Info" button 914 allows the user to view and edit selected portions of the metadata 229 associated with the associated file of edit data 228. In this regard, FIG. 11 shows a UI screen 1102 that is displayed for a list item when the associated "Info" button 914 is selected. The top of the screen include user selectable buttons, including a "Metadata" button 1104 and a "Speakers" button 1106, each of which allowing different elements of the metadata 229 to be viewed and edited. In FIG. 11, the "Metadata" button 1104 has been selected, and the following user-editable fields are presented: (1) a Transcript Name field 1108 (for example "US Gold Medal Winner"); (2) a Location field 1110 (location of the interview, for example "Stratford, London"); (3) a Date field 1112 (date of the interview, for example "04/02/2015"); (4) a Reporter field 1114 (the name of the reporter conducting the interview, for example "Kofman") (5) a Program field 1116 (the name of the program that the interview will be aired on, for example "ABC Good Morning America") (6) a Producer field 1118 (the name of the producer, for example "Smith"), (7) a Notes field 1120 (misc. information about the interview, for example, "She won her fifth gold medal"), and (8) a Translation Verifier field 1126 (information regarding the individual/contractor response for verifying a translation, if any). The UI screen 1102 of FIG. 11 also includes a "save" button 1124 that allows the user to save any changes made to the metadata fields and return to the UI screen 902 of FIG. 9 and a "cancel" button 1122 that allows a user to return to UI screen 902 of FIG. 9 without any save function. The translated media editing system 102 is configured to update the metadata 229 responsive to selection of the "save" button 1124.

Figure 12:
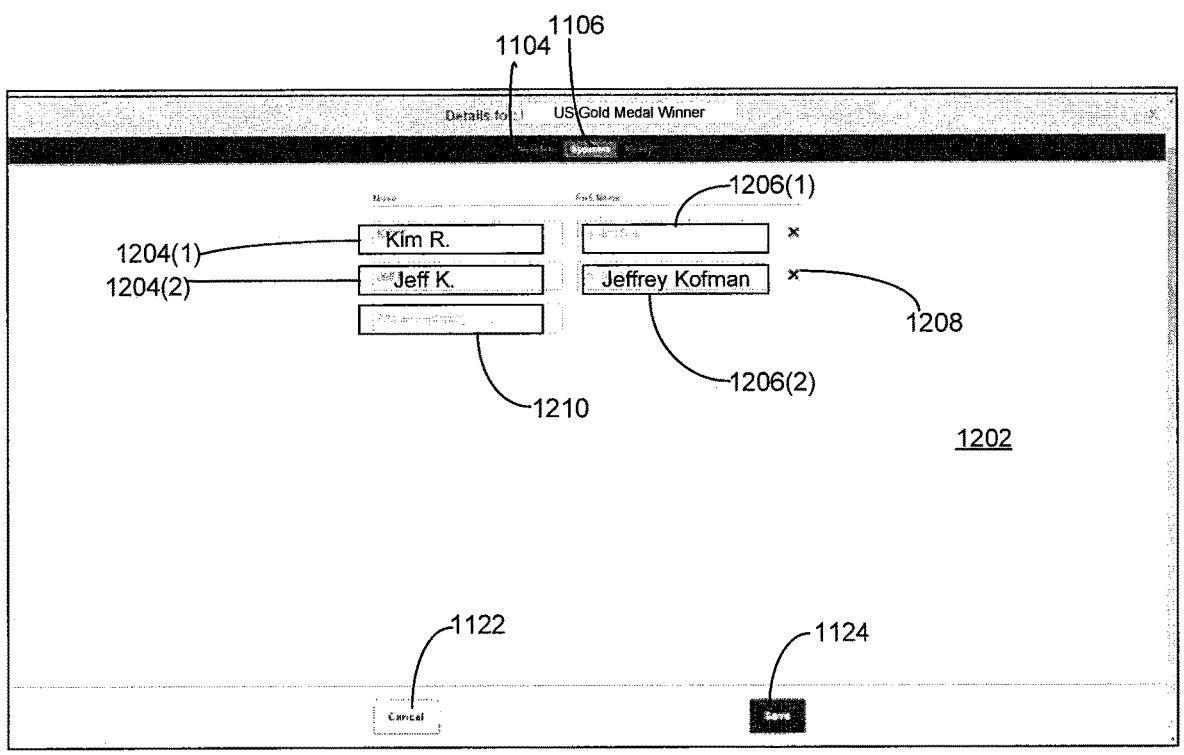
FIG. 12 illustrates a metadata UI screen that is displayed, in accordance with aspects of the present application, when the "Speakers" button of FIG. 11 is selected.

FIG. 12 illustrates a metadata UI screen 1202 that is displayed when the "Speakers" button 1106 is selected. The metadata UI screen 1202 of FIG. 12 includes two user-editable "name" fields 1204(1), 1204(2) and two user-editable "full name" fields 1206(1), 1206(2). The two user-editable "name" fields 1204(1), 1204(2) can be used to specify shortened forms of the full names, specified in the two user-editable "full name" fields 1206(1), 1206(2), of the individuals that participated in the interview. For example, "Jeff K." in the second name field 1204(2) is associated with "Jeffrey Kofman" in the associated full name field 1206(2). A delete button 1208 is provided to remove a speaker's shortened and full name and an "Add" field 1210 is provided to allow for addition of further speakers. The metadata UI screen 1202 of FIG. 12 also includes a "cancel" button 1122 and a "save" button 1124 that have the functionality described hereinbefore.

Turning again to the UI screen 902 of FIG. 9, selection of the "edit" button 916 associated with a reference to a file associated with an interview in the list 904 may result in the transcribed text from the interview (and in particular from the file of the edit data 228) being displayed, on the display screen 504B, with certain editing and audio playback functions. In alternative embodiments, selection of the "edit" button 916 associated with an interview entry may result in a further prompt, not shown, asking the user whether the user would like to edit existing transcripts or whether the user would like to translate a transcript into a translated language. Where the user selects a translated transcript, a new edit UI screen may be displayed.

Figure 13A:
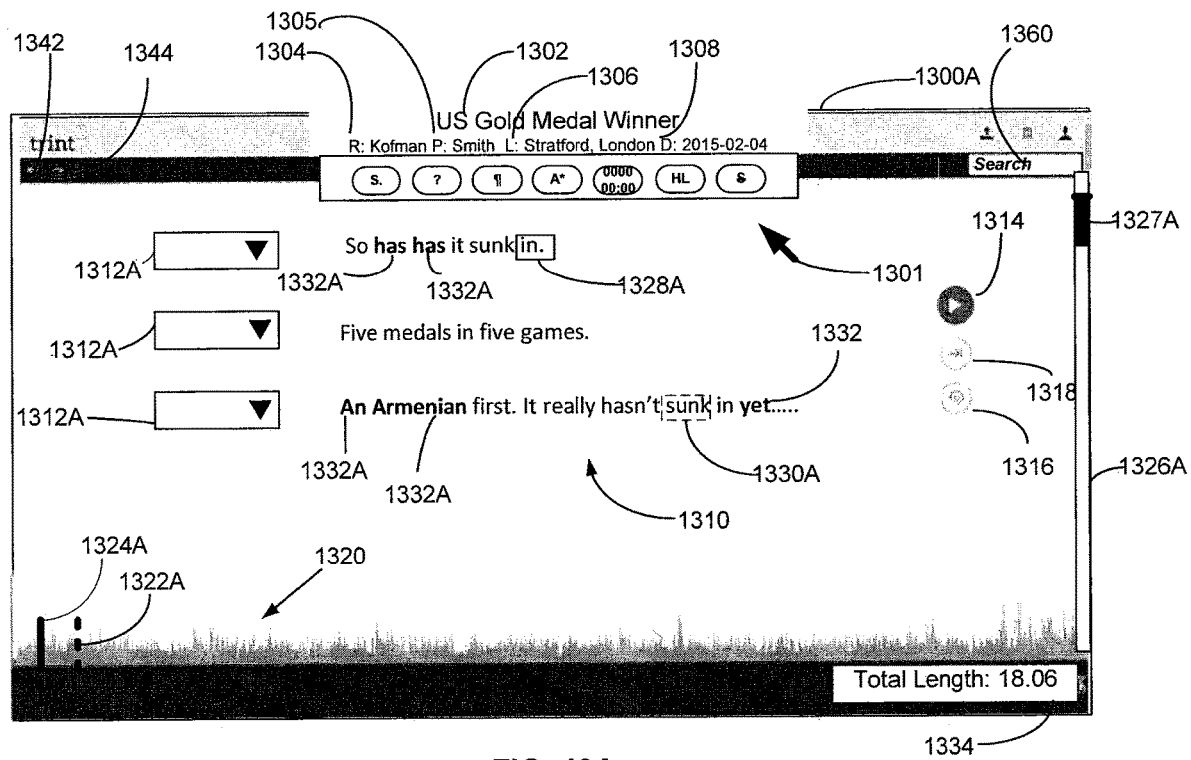
FIG. 13A illustrates a transcribed language UI part of an edit UI screen, in accordance with aspects of the present application, the transcribed language UI including a quick edit button.
Figure 13B:
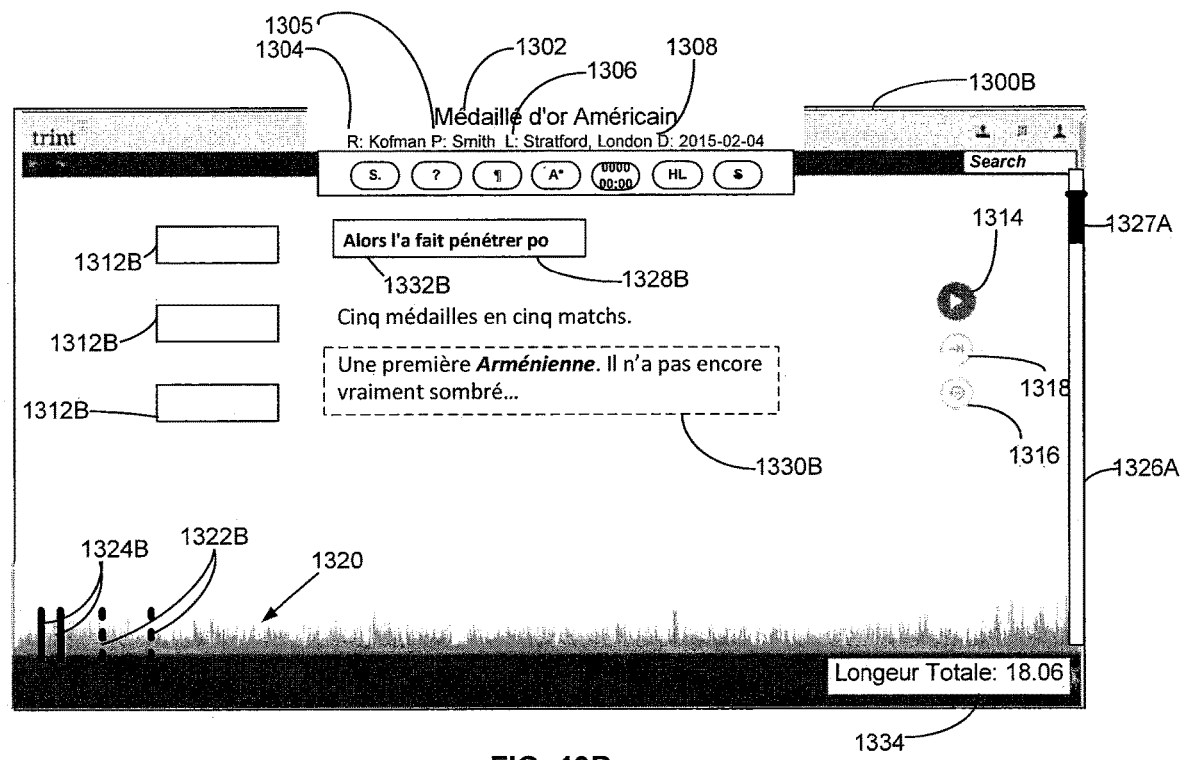
FIG. 13B illustrates a translated language UI part of the edit UI screen, in accordance with aspects of the present application, the translated language UI including a quick edit button.

In this regard, FIGS. 13A and 13B illustrate component parts of an edit UI screen, which features both a transcribed language UI 1300A (see FIG. 13A) and a translated language UI 1300B (see FIG. 13B). In an example embodiment, only one language text is able to be edited notwithstanding how many text languages are displayed. In another example embodiment, both the transcribed language UI 1300A and the translated language UI 1300B display translated languages different from the transcribed language. As was discussed in further detail above, in response to changes in the transcribed language text words, in one example embodiment, the translated media editing system 102 sends the changed transcribed language text words to the translation system 104A to be translated and the returned translated text words are displayed in the correct relative position in the translated language UI 1300B. In one embodiment, the translated media editing system 102 sends the changed transcribed language text words and any additional information it determines to be required to provide an effective translation, which may include a determined amount of preceding words or sentences, to the translation system 104A to be translated. The transcribed language UI 1300A shows text corresponding to the transcript data shown in FIG. 7A. When generating the component parts of the UI screen of FIGS. 13A and 13B, the translated media editing system 102 combines information from the metadata 229 and the file of edit data 228 to create HTML code necessary for the content of the component parts of the UI screen of FIGS. 13A and 13B. In example embodiments, the component parts of the UI screen of FIGS. 13A and 13B are used to display transcribed and translated text words in synchronization with playback, through the audio output device 504A of the user device 504, of the audio component 122 of the recorded data file 120 from which the displayed text was derived. Accordingly, the translated media editing system 102 relies on the timing data (word start time and word duration) in each English word object 707E (see FIG. 7A) of the transcribed language edit data 228 to coordinate the presentation of the recorded data file 120 over the audio output device 504A with the transcribed text words displayed on the transcribed language UI 1300A, as well as the generated timing data for each sentence object 707F (see FIG. 7B) in the translated transcript. In the illustrated embodiment, the translated media editing system 102 also coordinates the display of the translated language text words with timing data available for the translated language text words where the timing data for the translated text words is determined on a sentence based level. In example embodiments, wherein the audio component 122 has been modified to provide the transcoded audio file 126, the transcoded audio file 126 may be the actual audio data provided to the user device 108.

The transcribed language UI 1300A includes a region near the top that displays information fields populated with data derived from the metadata 229, including: (1) a Transcript Name field 1302 ("US Gold Medal Winner"); (2) a Reporter field 1304 ("R: Kofman"); (3) a Producer field 1305 ("P: Smith"); (4) a Location field 1306 ("L: Stratford, London"); and (5) a Date 1308 field ("D:2015-02-04). The transcribed text words from the edit data 228 are displayed in a scrolling display region 1310 of the transcribed language UI 1300A. More particularly, the transcribed text words are broken into physical paragraphs based on the "paragraph:value" attribute pairing data associated with each English word object 707E in the edit data 228. In one example embodiment, the translated language UI 1300B may be configured to repeat the information in the region near the top of the transcribed language UI 1300A. Notably, however, the region may display translated language text words rather than the transcribed language text words, where appropriate. The transcribed language UI 1300A also includes an on-screen navigation marker 1301.

As noted above, in the edit data 228, the "paragraph: value" attribute pairings have been determined based on perceived speaker transitions. In order to allow each speaker to be identified, each text paragraph is preceded by a speaker ID box 1312A, which are initially blank in the illustrated embodiment. As can be seen in the example illustrated in FIG. 7, the words in the phrase "So has it sunk in." are all associated with speaker M1 and para P0 and, accordingly, are presented together as a separate paragraph in the transcribed language UI 1300A. Similarly, the words in the phrase "Five medals in five games." are all associated with speaker M2 and para P1 and, accordingly, are presented together as a separate paragraph in the transcribed language UI 1300A. As further illustrated by FIG. 7A, responsive to the translated media editing system 102 sending the transcribed text for translation, the translated language text words were returned and the translated media editing system 102 generated timing data on the basis of paragraph-level timing.

It should be noted that, in FIG. 13B and in contrast to the speaker ID boxes 1312A of the transcribed language UI 1300A of FIG. 13A, a plurality of translated language speaker ID boxes 1312B are shown without a drop down menu, as the translated language display/editor in some embodiments may not be provided with the ability to alter such information. Moreover, the translated media editing system 102 may be configured to avoid displaying any non-text translated or transcribed word data in two separate languages or on the transcribed language UI 1300A and the translated language UI 1300B, to avoid visual clutter.

In example embodiments, the translated media editing system 102 works with the user device 108 to enable word-aligned audio-linked-to-text editable transcribed language transcripts. The transcribed language UI 1300A displays a number of on-screen indicators or markers to facilitate this functionality, including a primary audio tracking indicator 1330A that highlights the transcribed language displayed word that correlates to the audio being played back at that instant. In the illustrated example, the transcribed language UI 1300A provides a "play/pause button" 1314 for activating audio playback of the audio data associated with displayed words. When in pause mode, activating the "play/pause button" 1314 will cause audio playback to start at a time in audio file that corresponds to the timing data associated with the onscreen transcribed language text word highlighted by the primary audio tracking indicator 1330A. In one example embodiment, when in pause mode, activating the "play/pause button" 1314 will cause a sentence of those translated language text words that correspond to the timing data associated with the onscreen transcribed language text word to be highlighted by a secondary audio tracking indicator 1330B. For example, in FIG. 13B, the timing data associating the French translated language text words to the English transcribed language text words is based on a sentence level translation. As a result, where the translated media editing system 102 has not generated smaller word unit timing data, the secondary audio tracking indicator 1330B highlights the corresponding whole translated language sentence. During audio playback, the primary audio tracking indicator 1330A advances word by word, where possible, throughout the displayed text to provide synchronized feedback to a user of how each recorded spoken word has been transcribed to its transcribed language and translated language text equivalent. Activating the "play/pause button" 1314 during audio playback causes audio playback and movement of the primary audio tracking indicator 1330A and the secondary audio tracking indicator 1330B to pause. In some embodiments, the audio tracking indicators 1330A, 1330B move at different speeds. Where, for example, the primary audio tracking indicator 1330A may move on a word to word basis, the secondary audio tracking indicator 1330B may move on a sentence to sentence basis.

In an example mechanism, audio playback (and the corresponding movement of the audio tracking indicators 1330A, 1330B) can be activated in response to user selection of a word. For example, a simple point and click input can be used to start audio playback by placing the on-screen navigation marker 1301 on a desired starting word and providing a single click input. In a touch screen environment, a word can be selected by touch. In a speech controlled device, a word can be selected by speaking it. Once a word is selected, the audio tracking indicators 1330A, 1330B jump to the selected word in both the transcribed and translated transcript and audio playback commences from the corresponding audio location. In example embodiments, as the audio tracking indicators 1330A, 1330B progress, a primary audio start indicator 1328A highlights the corresponding transcript word that was selected to start the audio playback, so that the user can easily see what segment of transcribed and translated text they have listened to. Thus, in the example of FIG. 13A, the primary audio start indicator 1328A indicates that audio playback commenced with selection of the word "in" and has progressed to the word "sunk" that is highlighted by the primary audio tracking indicator 1330A. With respect to the translated language UI 1300B, in the illustrated embodiment where there is only sentence-level timing data available, a secondary audio start indicator 1328B indicates that audio playback commenced with selection of the first sentence and has progressed to the third sentence that is highlighted by the secondary audio tracking indicator 1330B.

In the displayed embodiment, the transcribed language UI 1300A includes a "replay" button 1316, which, when selected, causes audio playback and the corresponding location of the audio tracking indicators 1330A, 1330B to be pushed back a predetermined duration (and corresponding number of words), for example 5 seconds, and started from that point.

In some example embodiments, where the transcribed language UI 1300 includes the "replay" button 1316, which, when selected, causes audio playback, and the translated transcript is selected, but the translated transcript only has word-level timing data available, the user may prompt the user for an indication of where in the paragraph the user believes the words are (for example, near the middle). In some example embodiments, the system provides a sliding bar, with an audio excerpt corresponding to the selected text providing the beginning and end of the selected text, wherein the user is able to slide the sliding bar to a position that the user desires in the audio and the corresponding location of audio tracking indicators 1330A, 1330B to be pushed back a predetermined duration (and corresponding number of words), for example 5 seconds, and started from that point.

In the illustrated embodiment, an audio waveform 1320 is presented on the transcribed language UI 1300A along with a "total length" indicator 1334 that indicates the entire length of the interview that is being reviewed (18:06 in the present example). The audio waveform 1320 graphically represents the varying volume levels throughout the entirety of the interview duration. In at least some embodiments, a primary audio start marker 1324A is displayed on the audio waveform 1320 to indicate the relative location of the primary audio start indicator 1328A within the total duration of the interview and a primary audio tracking marker 1322A is similarly displayed on the audio waveform 1320 to indicate the relative location of the primary audio tracking indicator 1330A. In the displayed example, a primary sidebar 1326A is also provided that includes a primary progress marker 1327A representing the relative location (indicated by vertical location of the primary progress marker 1327A) and a quantity of the displayed words (indicated by the vertical height of the primary progress marker 1327A) relative to the length of the entire transcript. While the primary audio start marker 1324A and the primary audio tracking marker 1322A are positioned based on timing data associated with the highlighted words, the primary progress marker 1327A is positioned based on location and quantity of the currently on-screen displayed words relative to the total number words in the transcribed file being viewed/edited.

Conveniently, simultaneous editing of two languages is possible, according to manipulation of the transcribed language UI 1300A and of the translated language UI 1300B. The audio waveform 1320 may be repeated on the translated language UI screen 1300B, along with the "total length" indicator 1334. Secondary audio start markers 1324B, in the translated language UI 1300B may be used to indicate the relative location of the secondary audio start indicator 13288 within the total duration of the interview. Secondary audio start markers 1324B may indicate a relative locations of ends of a range of time, defined by the timing data associated with the translated language text. In the illustrated embodiment, sentence-level timing data has been implemented by the translated media editing system 102, as discussed hereinbefore and the secondary audio start indicator 1328B indicates the whole translated sentence in French, whereas, in contrast, the transcribed language UI 1300A has the primary audio start indicator 1328A that may move between words in correlation with the audio. Similarly, the secondary audio tracking markers 1322B are shown displaying a range of time on the audio waveform 1320 to indicate the available sentence-level timing data associated with the translated language text with respect to the relative location of the secondary audio tracking indicator 1330. The translated language UI 1300B may have a secondary sidebar 1326B with a secondary progress marker 1327B similar to the primary sidebar 1326A and the primary progress marker 1327A of the transcribed language UI 1300A.

In other example embodiments, only one of the transcribed language UI 1300A and the translated language UI 1300B contains the replay button 1316, the audio start marker 1324A, the audio tracking marker 1322, etc., among the features mentioned hereinbefore. In some example embodiments, the translated media editing system 102 has the capability to create synthetic audio from text words and selecting the replay button 1316 while selecting translated text words will generate and play back corresponding generated synthetic audio. In some embodiments, the transcribed language UI 1300A and the translated language UI 1300B may be configured such that one or both have varying degrees of the functionality outlined herein.

In other embodiments, the overall user interface contains multiple translated language. UI's, such that two or more translated language UIs, with structure following the structure of the translated language UI 1300B of FIG. 13B, may be displayed simultaneously, with varying degrees of functionality. In other example embodiments, the user interface may only display translated language UIs, for example where a translated transcript is being translated to another translated language. In further example embodiments, the translated language UI 13008 may not display any information related to the audio file.

In example embodiments, the primary audio start indicator 1328A and the secondary audio start indicator 1328B and the primary audio tracking indicator 1330A and the secondary audio tracking indicator 1330B may take a number of different visual forms. By way of example, they could each comprise highlighting the subject word with a specific color (e.g., yellow highlight for the primary audio tracking indicator 1330A and blue highlight for the primary audio start indicator 1328A).

In example embodiments, another on-screen indicator may be enhancements provided on the transcribed language UI 1300A and the translated language UI 1300B in the form of confidence indication enhancements. In particular, each word that has an associated confidence level that is below a predetermined threshold is enhanced, marked or otherwise highlighted so that low-confidence words can quickly be visually distinguished from the remaining displayed words that have confidence levels that are above the threshold. In one example embodiment, low confidence words are shown in red text and high confidence words are shown in black text. In FIG. 13A, low-confidence words 1332A are enhanced using a bold font and the confidence threshold has been set at 0.975 (97.5%). This results in bold highlighting of the following words: "has" (p0, 69.67% confidence); "has" (p0, 77.37% confidence); "An" (p2, 58.4% confidence); "Armenian" (p2, 59.8% confidence) and "yet" (p2, 56.9% confidence). In at least some example embodiments, the confidence threshold is user configurable. In the translated language UI 1300B, another example embodiment is shown where the confidence relates to a confidence of transcription. In the translated language UI 1300B, low confidence sentences are enhanced via a bold font. An example low-confidence sentence is illustrated associated with reference number 1328B. As discussed above, in some example embodiments, the translated language UI 1300B may be able to display a confidence indicator on a per word basis (not shown), where the translated media editing system 102 has determined a confidence value.

In example embodiments, the translated media editing system 102 includes a speed editing tool that is triggered by a quick edit button 1318. As discussed previously, editing tools or features of the user interface may be available only in one of the transcribed language UI 1300A, the translated language UI 1300B, or both, or configurable by the user. In particular, selection of the quick edit button 1318 in the transcribed language UI 1300A causes a primary edit box 1329A (see FIG. 14A) to be positioned at the next "low confidence" word in the transcript following the primary audio start indicator 1328A. Furthermore, audio playback may be automatically triggered for a duration that commences a predetermined time or number of words prior to the indicated low confidence word and ends a predetermined time or number of words after the indicated low confidence word. Responsive to a transcribed language text word having been selected by the user for editing using the quick edit button 1318, the corresponding translated language text words (which may be a sentence, depending on the timing data available), may be blocked from being edited.

Figure 14A:
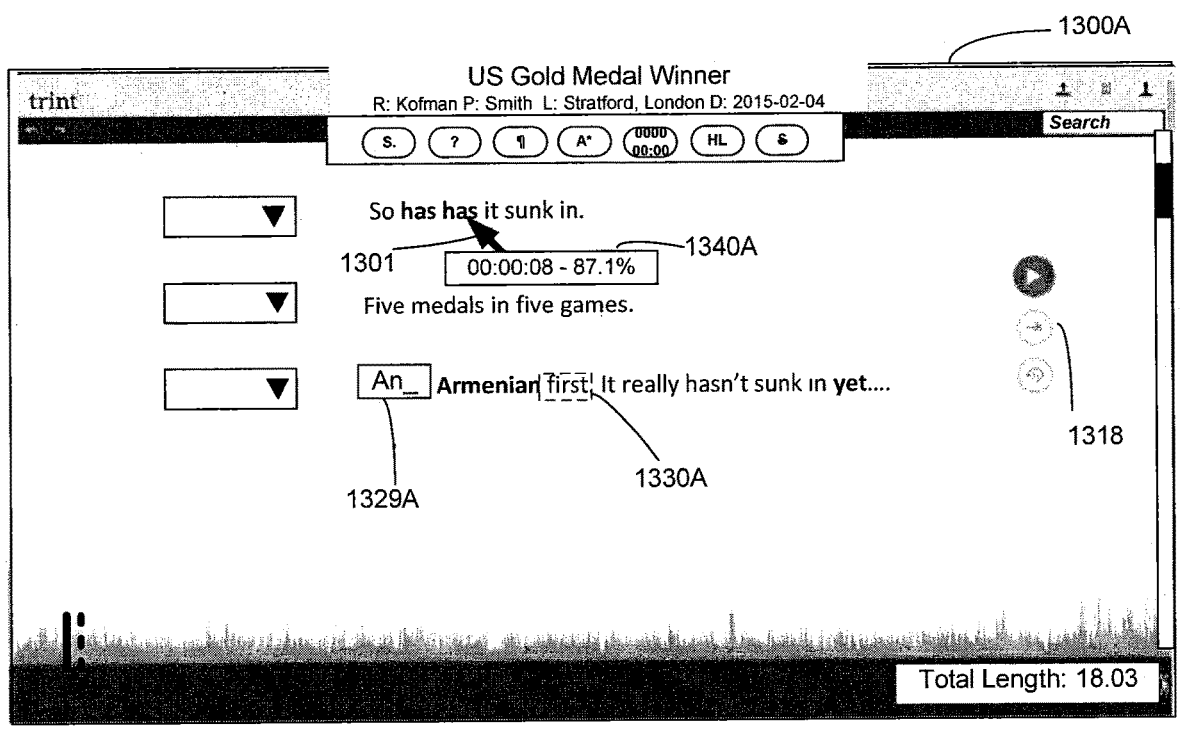
FIG. 14A illustrates the transcribed language UI of FIG. 13A, changed in response to the quick edit button having been selected, in accordance with aspects of the present application.
Figure 14B:
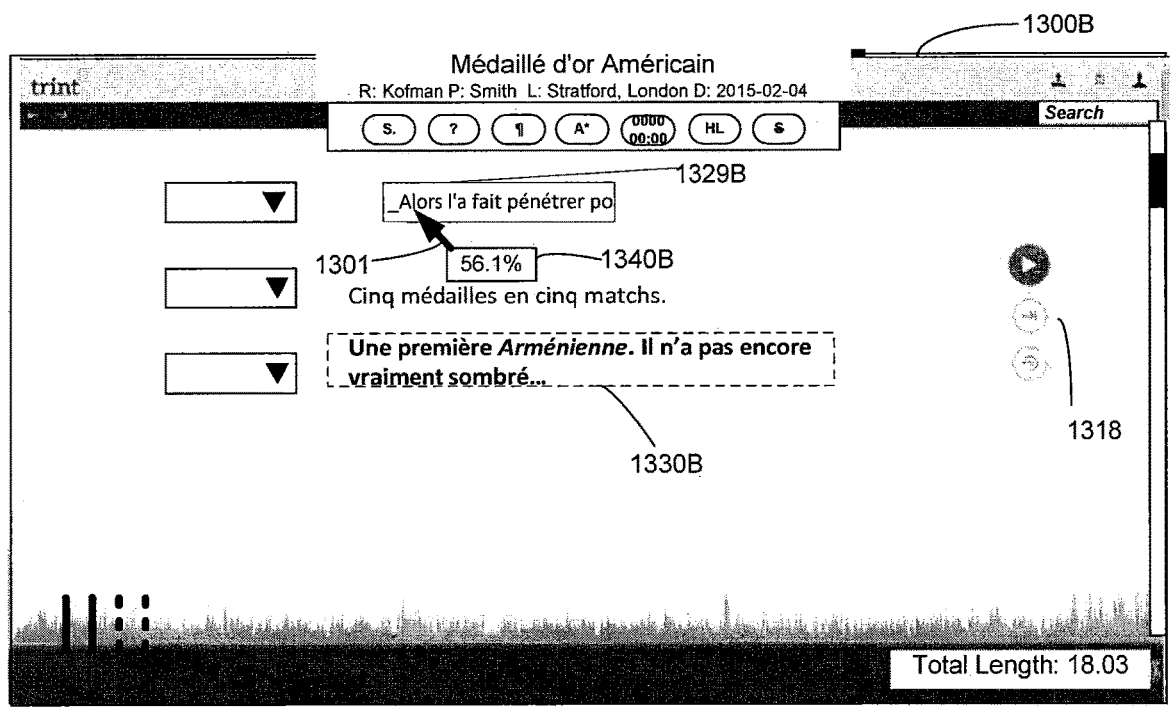
FIG. 14B illustrates the translated language UI of FIG. 13B, changed in response to the quick edit button having been selected, in accordance with aspects of the present application.

In this regard, FIG. 14A provides a representation of an appearance of the transcribed language UI 1300A and FIG. 14B provides a representation of an appearance of the translated language UI 1300B. The transcribed language UI 1300A and the translated language UI 1300B function in the same manner, responsive to the quick edit button 1318 having been selected when the primary audio start indicator 1328A is in the location shown in FIG. 13A. In particular, in the event that the editing functionality was activated with respect to the transcribed language UI 1300A, the primary edit box 1329A is automatically positioned at the next low confidence word, which, in the illustrated example in transcribed language UI 1300A, is "An". Furthermore, the primary edit box 1329A includes an edit cursor positioned next to the text within the primary edit box 1329A. As an example, in one embodiment, the user device 108 plays back the audio that corresponds to five words, including the two words prior to the indicated word, the indicated word and the two words after the highlighted word. In the illustrated embodiment, the user device 108 plays back the audio that corresponds to "five games. An Armenian first", while the primary audio tracking indicator 1330A highlights the words as the words are played.

In the event that the editing functionality was activated with respect to the translated language UI 1300B of FIG. 13B, a secondary edit box 1329B may automatically be positioned at the next low confidence timing entry, which, in the example illustrated in the translated language UI 1300B of FIG. 14B, is "Alors l'a fait pénétrer po". Furthermore, the secondary edit box 1329B includes an edit cursor positioned next to the text within the secondary edit box 1329B.

In the translated language UI 1300B of FIG. 14B, because sentence-level timing data may be utilized, the system may replay the full sentence. In the event that there is word-level timing data available, the system may be configured to play five words, as shown the transcribed language UI 1300A example discussed in the preceding.

As a result of the audio and visual feedback, a device user is provided with contextual information designed to aid the device user in deciding quickly and efficiently if the low confidence word in the primary edit box 1329A is correct. In the translated language UI 1300B, the device user is similarly provided with a context level that is timing data level consistent, in order to allow the user to appreciate the full context of the audio and to edit the translated language transcript in a context meaningful manner. If a word or sentence is incorrect, the cursor in the primary edit box 1329A allows the user to immediately correct the word/sentence, after which the change is displayed on the transcribed language UI 1300A and communicated back to the translated media editing system 102 so that the corresponding word/sentence in the edit data 228 can be updated to its corrected state. As discussed previously, when changes are made to transcribed language text, only portions of the transcribed language text may be sent to the translation system 104A to update the translated language text. Alternatively, if the user decides that the word is, in fact, correct, selecting the quick edit button 1318 causes the primary edit box 1329A to jump to the next low-confidence entry and the above process is repeated. In one example embodiment, once a low-confidence word has been viewed in primary edit box 1329A, the confidence value for the entry will be upgraded to 100%, regardless of whether the entry has been edited or not, and the entry will be displayed as a normal entry without low-confidence indications. The secondary edit box 1329B may function similarly in the translated language UI 1300B, however the secondary edit box 1329B may move between words/sentences that have a confidence of transcription value below a certain threshold, wherein the aforementioned words/sentences are indicated by confidence indication. The upgraded confidence value will be communicated to the system translated media editing system 102 to update the corresponding edit data 228.

In example embodiments, when a string of two or more low-conference entries are immediately adjacent to each other, the entire string of adjacent words will be placed in the primary edit box 1329A to allow editing of all of the entries in the string, since multiple low-confidence entries in a given string may be indicative of a transcription error that spans multiple entries. By way of example, the two low-confidence entries in the first line of the transcribed language UI 1300A of FIG. 14A, "has has" are included in the single primary edit box 1329A for editing.

Accordingly, in example embodiments, the quick edit button 1318 provides a mechanism by which a user can easily tab directly to the next occurrence, in either the translated language 1300B or the transcribed language UI 1300A, of a low-confidence word/sentence. The user may then listen to the audio context of the word/sentence; determine if the word/sentence needs to be corrected and, if so, simply edit the word/sentence using the automatically positioned cursor; and then tab on to the next low-confidence word/sentence using the quick edit button 1318.

In some example embodiments, the transcribed language UI 1300A may be configured to display the timing and confidence information associated with a specific word temporarily in response to the occurrence of a predetermined user interaction with the specific word. For example, the predetermined user interaction may involve the navigation pointer 1301 being caused to hover over the specific word for a predetermined duration (for example, 1 second). In this regard, FIG. 14A illustrates a primary information box 1340A and FIG. 14B illustrates a secondary information box 1340B. These boxes 1340A, 1340B are presented responsive to the navigation pointer 1301 having been placed over a word. In one scenario in the transcribed language UI 1300A, the navigation pointer 1301 has been placed over the second occurrence of the word "has" in the first paragraph, resulting in the display of the primary information box 1340A near the subject word. The primary information box 1340A contains a time stamp, indicating the time associated with the word (8 seconds into the interview), and a confidence level associated with the word (87.1%). In the translated language UI 1300B of FIG. 14B, the navigation pointer 1301 has been placed over the phrase "Alors l'a fait pénétrer po", resulting in the display of the secondary information box 1340B near the navigation pointer 1301. The secondary information box 1340B contains an indication of a confidence of transcription (56.1%) for the subject phrase.

As noted above, the quick edit button 1318 can be used to jump to the next low-confidence word and place the word into the primary edit box 1329A for editing. In an example embodiment, individual words/sentences can be selected for editing by a predetermined user input action—for example, the navigation pointer 1301 can be used to select a word/sentence, following which the selected word/sentence may be presented in the primary edit box 1329A for editing. It will be noted that different user navigation input actions have different results A single click on a word may highlight the word with the primary audio start indicator 1328A and cause the primary audio tracking indicator 1330 to appear as audio playback commences from that word. A double click on a word may open the primary edit box 1329A for editing the word. Different user input actions may be used to trigger activities in alternative embodiments or configurations—for example, single click and double click actions can be replaced with single tap and double tap actions in a touch screen environment.

Figure 15A:
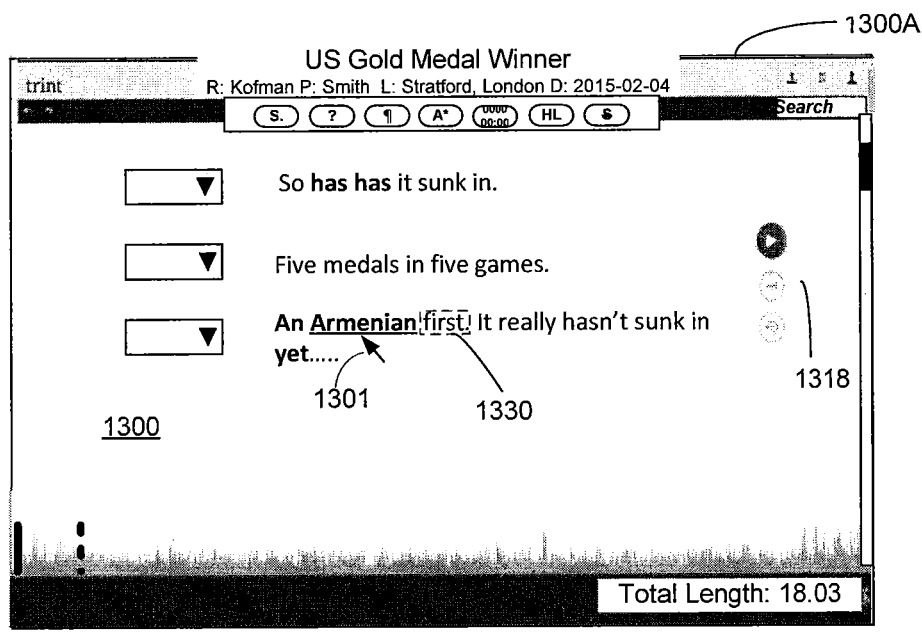
FIG. 15A illustrates the transcribed language UI of FIG. 13A, changed in response to a user placing a navigation pointer on a specific word, in accordance with aspects of the present application.
Figure 15B:
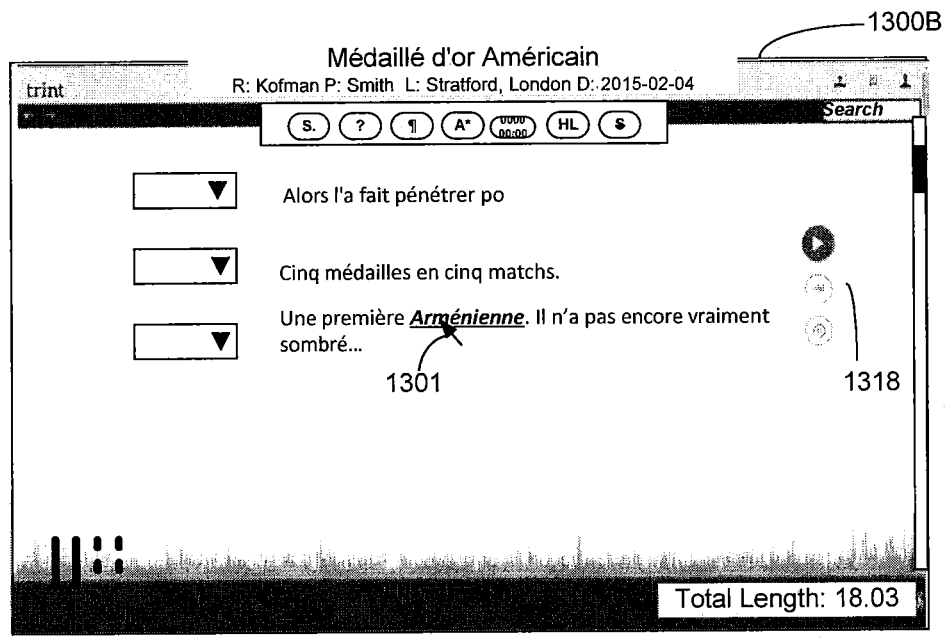
FIG. 15B illustrates the translated language UI of FIG. 13B, changed in response to a user placing a navigation pointer on a specific word, in accordance with aspects of the present application.
Figure 16A:
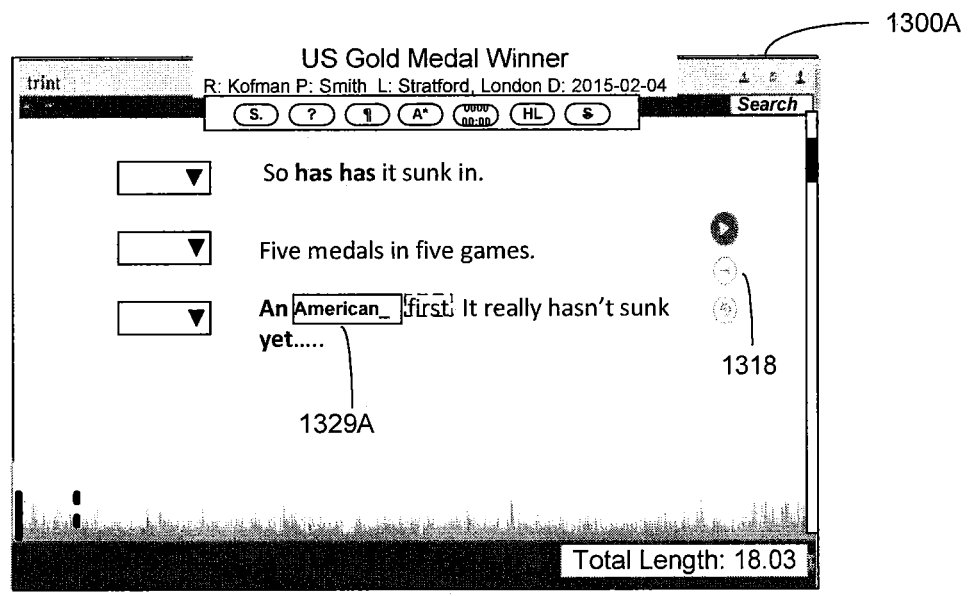
FIG. 16A illustrates the transcribed language UI of FIG. 13A, changed in response to a user double clicking a focused word, in accordance with aspects of the present application.
Figure 16B:
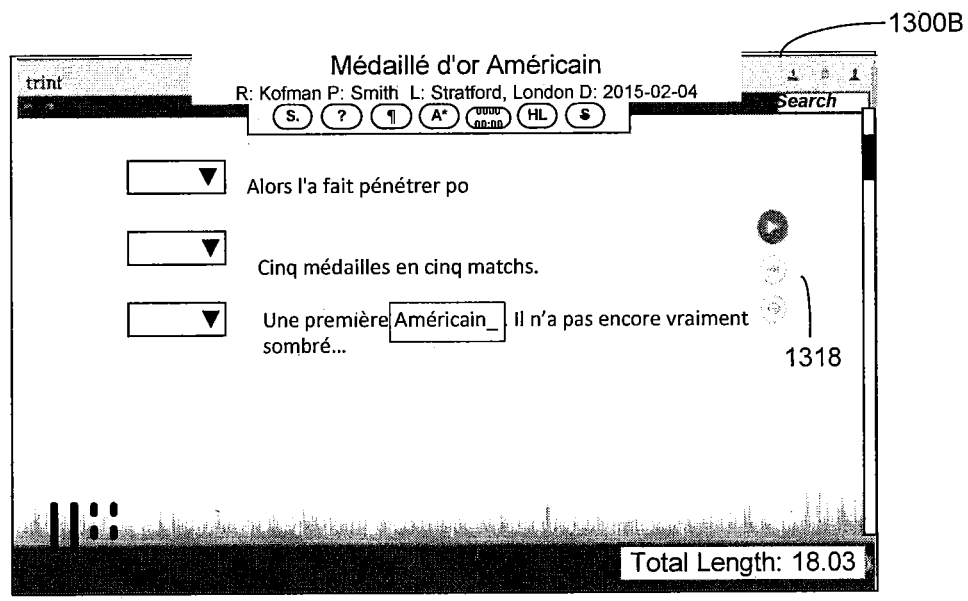
FIG. 16B illustrates the translated language UI of FIG. 13B, changed in response to a user double clicking a focused word, in accordance with aspects of the present application.

With reference to FIGS. 15A, 15B, 16A, 16B, 17A, 17B and 18, an example of a word edit sequence will now be described. In the illustrated example, during audio playback of "An Armenian first", the user determines that the transcribed word "Armenian" is, in fact, a mis-transcription of the spoken word "American". In FIG. 15A, when the user places the navigation pointer 1301 on the word "Armenian," the user device 108 causes an underline or other focus indicator to appear under the word, so that the user can confirm that the word is being focused. In the illustrated embodiment, where the user is instead editing via the translated language UI 1300B (see FIG. 15B), when the user places the navigation pointer 1301 on the word "Arménienne," the user device 108 similarly causes an underline or other focus indicator to appear under the word, if word-level timing data is available. If word level data is not available, the translated language UI 1300B causes the text words corresponding to the highlighted data to be displayed.

Figure 17A:
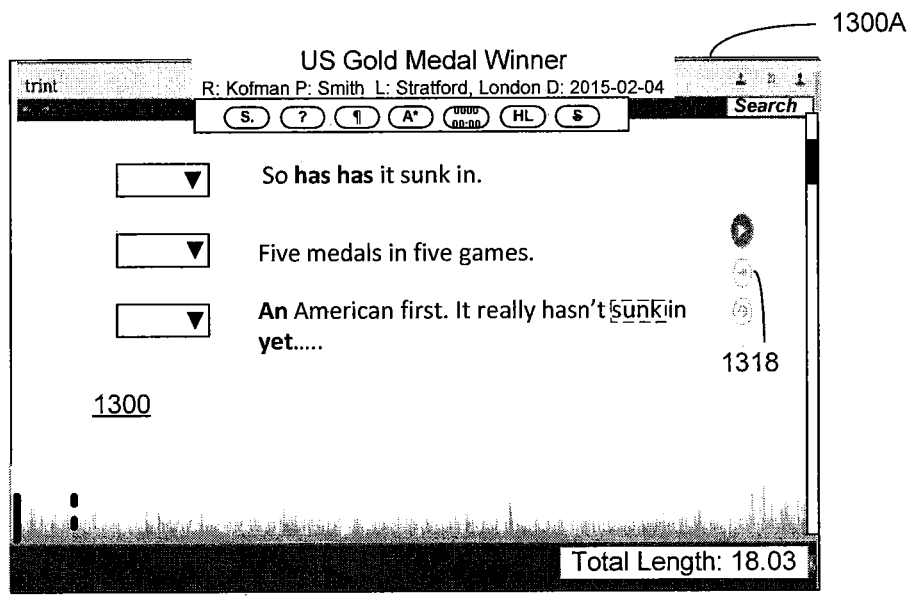
FIG. 17A illustrates the transcribed language UI of FIG. 13A, changed in response to a word correction, in accordance with aspects of the present application.
Figure 17B:
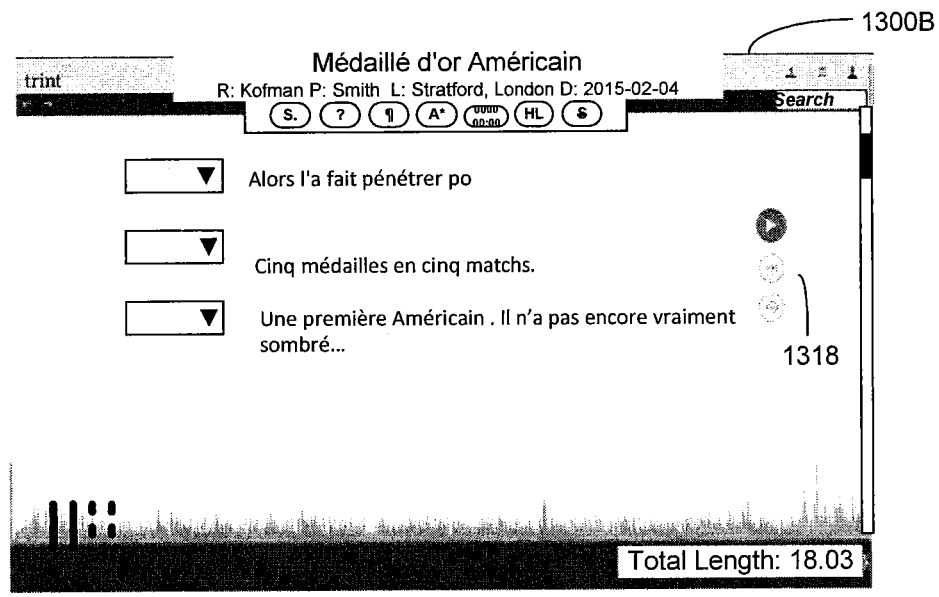
FIG. 17B illustrates the translated language UI of FIG. 13B, changed in response to a word correction, in accordance with aspects of the present application.

Double clicking on the focused word causes the focused word to be placed in the primary edit box 1329A, as shown in the transcribed language UI 1300A of FIG. 15A. Double clicking on the focused word causes the focused word to be placed in the secondary edit box 1329B, as shown in the translated language UI 1300B of FIG. 15B. In the primary edit box 1329A, the user can use standard edit keys and text keys to correct the word "Armenian" to the word "American," as shown in the transcribed language UI 1300A of FIG. 16A. In the secondary edit box 1329B, the user can use standard edit keys and text keys to correct the word "Arménienne" to the word "Américain" as shown in the translated language UI 1300B of FIG. 16B. Once the user has made the correction, the user can save the change and exit the primary edit box 1329A and/or the secondary edit box 1329B (which as previously discussed, may be displayed on both the transcribed language UI 1300A and the translated language UI 1300B, or only displayed in one instance) by performing one or more predetermined user actions. Such predetermined user actions may include, for example, pressing an enter key or tab key, or using the quick edit button 1318 to advance to the next low-confidence word, or using the navigation pointer 1301 to select another word on which to start playback. In an example embodiment, when the user presses the "enter" or "tab" key after making the correction, the change is saved, the primary edit box 1329A is closed, the corrected word is displayed inline and audio playback commences at the corrected word and continues. In this regard, FIG. 17A illustrates transcribed language UI 1300A after user correction of the word "Armenian" to "American". Similarly, FIG. 17B illustrates translated language UI 1300B after user correction of the word "Arménienne" to the word "Américain". As can be seen in FIG. 17A, correction of the word automatically causes its associated confidence level to be set at 100% and, accordingly, the words "American" and "Américain" are no longer displayed with a low-confidence indicator (e.g., these words are no longer shown in bold lettering, but in normal typeface). In embodiments where word-level timing data is not available for the translated transcript, for example, where there is only sentence-level timing, the entire sentence may be assumed to have been edited and the entire sentence may be assigned a confidence level of 1.

The user device 108 may be configured to provide any change information back to the translated media editing system 102 so that the edit data 228 stored at translated media editing system 102 can be updated accordingly. In some example embodiments, groups of changes are periodically sent as a change stack to the translated media editing system 102 for edit data 228 updating purposes.

In the present example, the edit change results in updates to selected attribute:value pairings in the "Armenian" word object 707E-13 of the edit data 228 (see FIG. 7A). In particular, the pairing "name":"Armenian" is changed to "name":"American" and the pairing "confidence":0.598 is changed to "confidence":1. Similarly, attribute:value pairings for the paragraph that includes "Une premiére Arméni-enne." in the third French sentence object 707F-3 (see FIG. 7B) is changed to "Une premiére Américain." and the pairing "confidence":0.561 is changed to "confidence":1 in the edit data 228. The updated English word object 707E-13U and the updated French sentence object 707F-3U, as saved by the translated media editing system 102, are shown in FIG. 18 with the changes shown in bold for purposes of illustration.

Figure 19A:
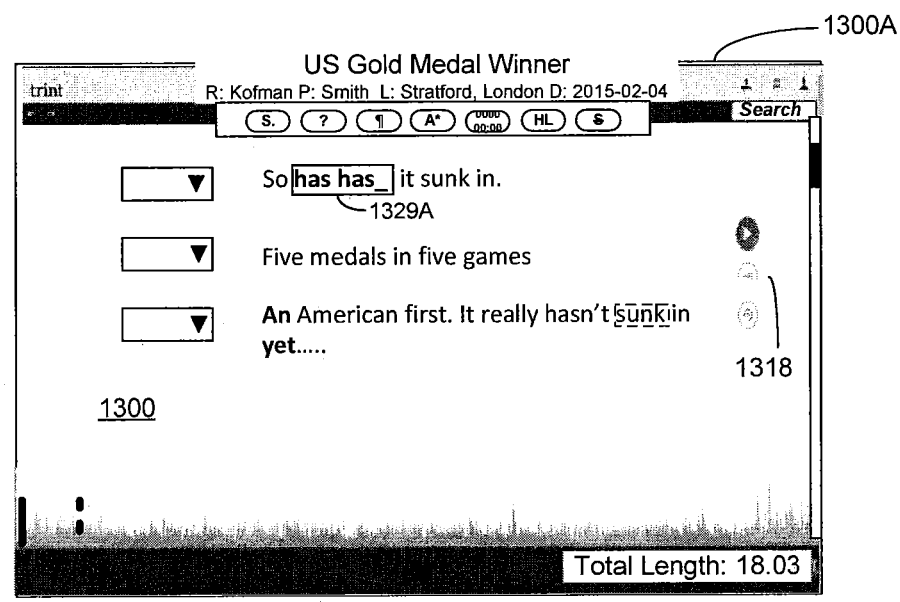
FIG. 19A illustrates the transcribed language UI of FIG. 13A, changed to enclose a pair of words in an edit box, in accordance with aspects of the present application.
Figure 19B:
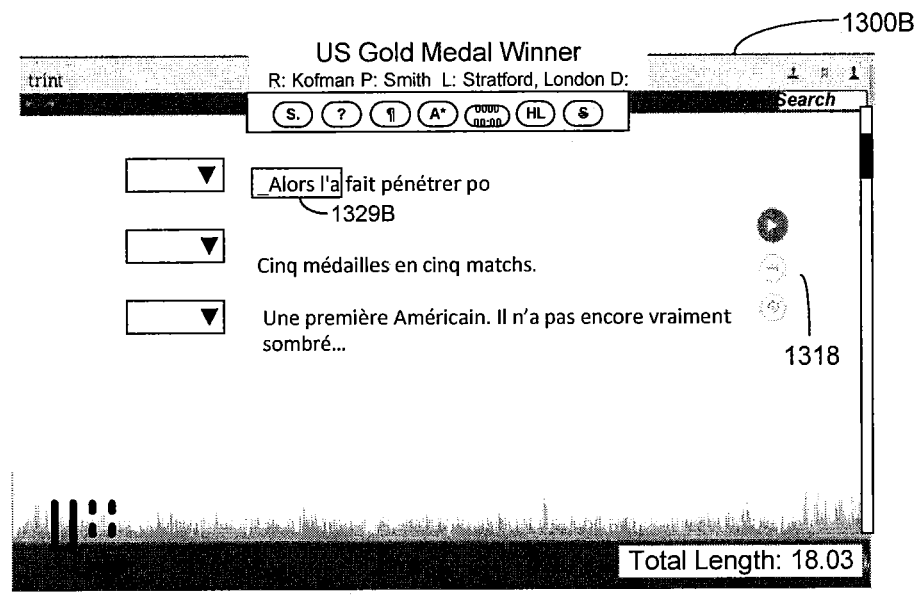
FIG. 19B illustrates the translated language UI of FIG. 13B, changed to enclose a pair of words in an edit box, in accordance with aspects of the present application.

In addition to word level editing, the primary edit box 1329A can also be used to edit text blocks of multiple words. In an example embodiment, a block of text can be selected by a predetermined user input, for example, in response to a user focusing a word with the navigation pointer 1301, performing a single click and immediately dragging the navigation pointer 1301 over additional words to highlight a block, following which a double click will place the selected text in the primary edit box 1329A. In this regard, FIG. 19A shows an example in which the adjacent words "has has" have been selected in the transcribed language UI 1300A. FIG. 19B illustrates the words "Alors l'a" have been selected in the translated language UI 1300B as a text block for editing and appear in the secondary text edit box 1329B. During audio playback, where the user is editing the transcribed language text via transcribed language UI 1300A, the user may determine that, in fact, the word "has" was only haltingly spoken once and misinterpreted as the same word twice. Accordingly, the user decides to replace the double occurrence with a single occurrence of "has". In another example, where a user sees the typo "has has" in the English language text, the user may simply wish to only edit the translated language text in the translated language UI 1300B from "_Alors l'a fait pénétrer po" to "Ainsi l'a-t-il plongé."

As previously discussed, the user device 108 may be configured to automatically send any sensed changes in the transcribed language text to the translated media editing system 102. In some example embodiments, the user device 108 may allow a user to flag transcribed text that corresponds to the translated text to which edits have been applied. In other example embodiments, where a change has been made to translated text and the person generating the changes had access to the audio file, the system may not translate the portions of the transcribed text that corresponds to the already edited translated text.

Figure 20A:
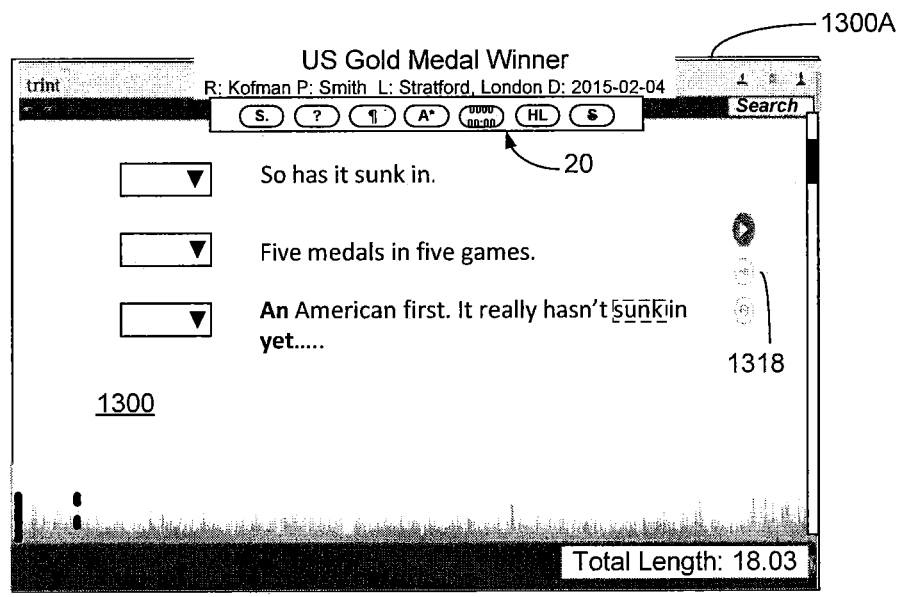
FIG. 20A illustrates the transcribed language UI of FIG. 19A with a toolbar, changed responsive to an edit, in accordance with aspects of the present application.
Figure 20B:
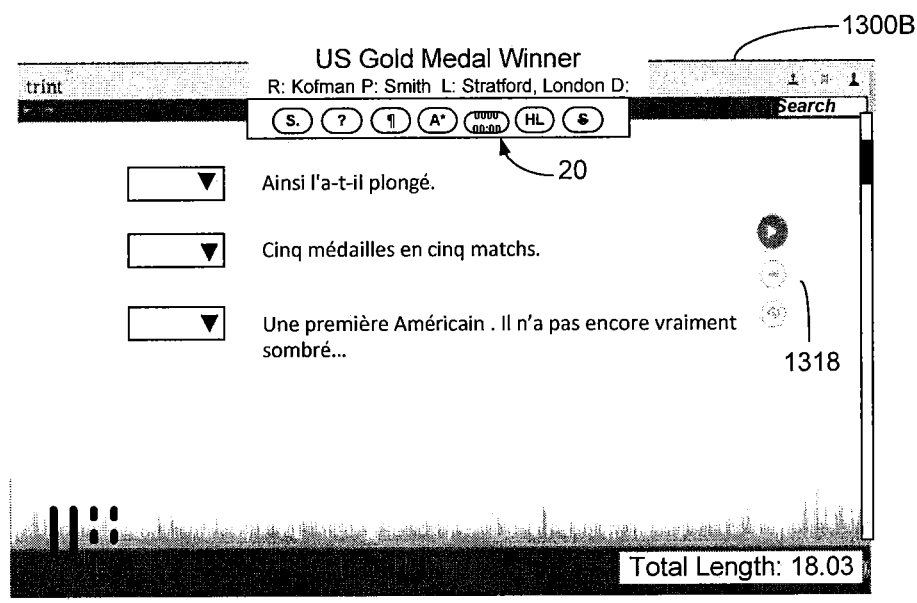
FIG. 20B illustrates the translated language UI of FIG. 19B, changed responsive to an edit, in accordance with aspects of the present application.

FIG. 20A shows the transcribed language UI 1300A after editing to remove the duplicate word. FIG. 20B illustrates the translated language UI 1300B after editing to change the phrase.

Figure 21:
FIG. 21 illustrates a word object of the edit data of FIG. 7A, changed responsive to the edit resulting in FIG. 20A, in accordance with aspects of the present application.

FIG. 21 illustrates the first "has" word object 707E-2 and the second "has" word object 707E-3 of the edit data 228 of FIG. 7A, before the editing. FIG. 21 also illustrates the first French sentence object 707F-1 before editing. The change resulting from the editing is illustrated, in FIG. 21, as an updated first "has" word object 707E-2U and an updated first French sentence object 707F-1U. As can be seen, the deletion of the second "has" using the primary edit box 1329A results in the two "has" word objects 707E-2 and 707E-3 being replaced with a single updated "has" word object 707E-2U in the edit data 228 stored at the translated media editing system 102.

In the translated language transcript shown in FIG. 21, the deletion of the word "has" in the transcribed language has led to the translated media editing system 102 sending the full sentence to the translation system 104A, which returned a sentence with a different structure not analogous with simply removing a word. Had word-level timing data been generated for the translated transcript, the translated media editing system 102 may have been required to regenerate the edit data 228 to account for the change in words in the sentence. The translated media editing system 102 may, for example, be adapted to detect words on the basis of space characters. In view of the deletion of an English word object, in the edit data 228 stored regarding the transcribed language transcript, the editor module 212 may be configured to recalculate the "duration" resulting from the edit, which, in the illustrated embodiment, involves adding the durations of the two original "has" objects 707E-2, 707E-3 together to arrive at a new duration of 560 ms. However, since the translated language transcript operates on a sentence to sentence level, so long as the total duration of the sentence does not change, there is no need to alter the sentence-level timing data in regards to the translated language text. The confidence attribute has also been updated to 1 in the updated "has" object 707E-2U and the updated first French sentence object 707F-1U. In the transcribed language transcript of FIG. 20A, the displayed word "has" is shown without a low-confidence indicator.

Figure 22A:
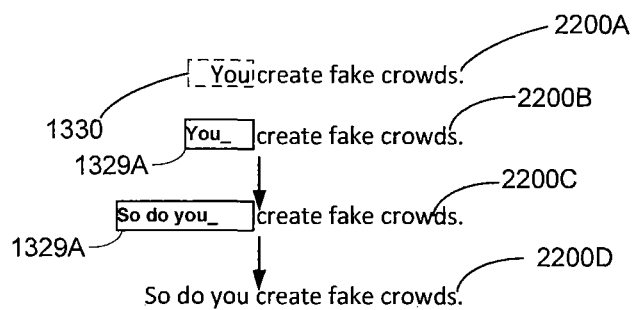
FIG. 22A illustrates successive views of editing of a sentence presented on the transcribed language UI of FIG. 13A, in accordance with aspects of the present application.
Figure 22B:
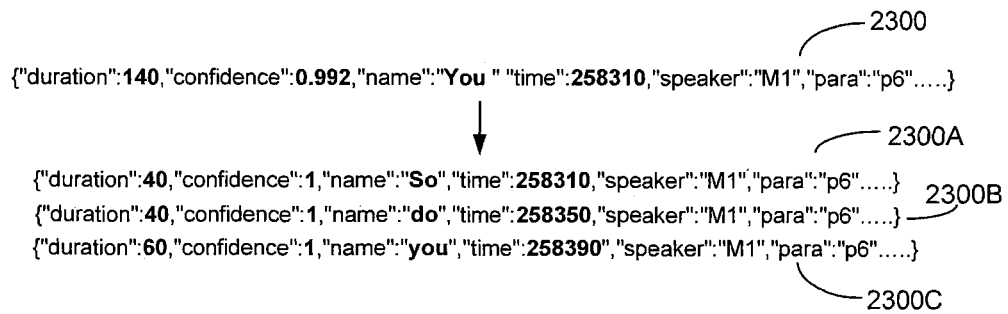
FIG. 22B illustrates a word object of the sentence of FIG. 22A, before and after the editing, in accordance with aspects of the present application.

The above edit process illustrates an example of multiple word objects being combined into a single word object. In some examples, the system also supports the use of the primary edit box 1329A to take one or more word objects and perform a conversion into a higher number of word objects. In this regard, FIGS. 22A and 22B provide an example in which a "You" word object 2300 associated with the word "You" in a transcribed or translated sentence is replaced with a "So" replacement word object 2300A, a "do" replacement word object 2300B and a "you" replacement word object 2300C. FIG. 22A illustrates successive views: a first view 2200A; a second view 2200B; a third view 2200C; and a fourth view 2200D of a sentence. The first view 2200A shows the sentence as originally presented, "You create fake crowds." Upon synchronized audio playback with movement of the primary audio tracking indicator 1330, the user realizes that the speaker, in fact, said, "So do you . . . " rather than just the single word "You" and, according, the user selects the word "You" for editing within the primary edit box 1329A (see the second view 2200B). The user replaces the word "You" with a phrase, "So do you" (see the third view 2200C), thereby resulting in a post-edited sentence, "So do you create fake crowds." (see the fourth view 2200D). The word object 2300 corresponds to the content of edit data 228 that is associated with the word "You" in the first view 2200A, which is replaced, by editing, with the "So" word object 2300A, the "do" word object 2300B and the "you" word object 2300C, which word objects correspond to an initial portion of a sentence presented in the fourth view 2200D.

As can be seen in FIG. 22B, in an example embodiment, the translated media editing system 102 may be configured to assign timing attributes to the replacement word objects 2300A, 2300B, 2300C to maintain synchronized word-level timing data. Although different timing algorithms can be used, in the illustrated embodiment, the timing values are calculated on a pro-rata basis by splitting the original duration (140 ms) among the three replacement words passed on the number of letters in each of the replacement words, resulting in a duration attribute of 40 ms for the two-letter words, "So" and "do," and a 60 ms duration for three-letter word, "you". As can be seen in FIG. 22B, the "time attribute" for the "So" replacement word object 2300A is set to the original time attribute (258310 ms), with 40 ms as the duration specified in the "So" replacement word object 2300A. The 40 ms duration of the "So" replacement word object 2300A is added to the original time attribute to determine a time attribute (258350 ms) for the "do" word object 2300B. The 40 ms duration of the "do" replacement word object 2300B is added to the time attribute of the "do" replacement word object 2300B to determine a time attribute (258390 ms) for the "you" word object 2300C.

It will, thus, be appreciated that the user device 108 and the editor module 212 of the translated media editing system 102 are configured to collectively permit a user to perform corrections in which the number of transcribed words or translated words is decreased or increased, while still retaining word-level timing that is synchronized with audio playback.

The examples described hereinbefore have primarily been discussed in terms of edits made to the English transcribed text of the transcribed language UI 1300A. It should be clear that the examples are equally applicable to the translated text of the translated language UI 1300B.

Figure 23:
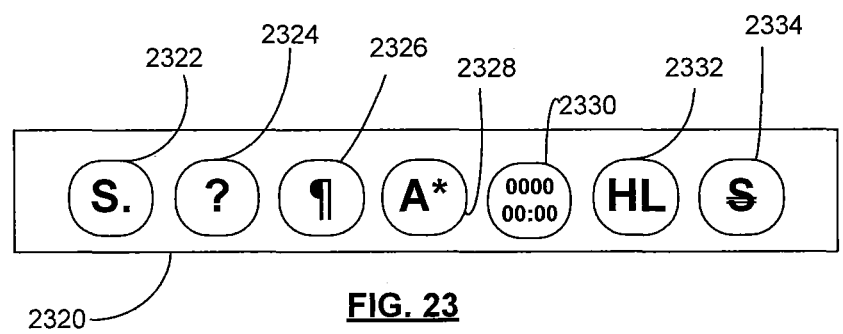
FIG. 23 illustrates an enlarged version of the toolbar in the transcribed language UI of FIG. 20A.

Referring, again, to the transcribed language UI 1300A illustrated in FIG. 20A, in example embodiments, the transcribed language UI 1300A includes a toolbar 2320. The toolbar 2320 is shown as being available to the transcribed language UI 1300A and the translated language UI 1300B. It is recognized that it may be preferable that only one UI have the toolbar 2320. The toolbar 2320 includes a plurality of selectable tool items that support various UI and editing functions. As can be seen from the enlarged version of the toolbar 2320, shown in FIG. 23, the selectable tool items include: an "S." selectable tool item 2322; a "?" selectable tool item 2324; a "¶" selectable tool item 2326; a "0000/00:00" selectable tool item 2330; an "HL" selectable tool item 2332; and an " S " selectable tool item 2334. Of course, the number and functionality of the selectable tool items can be different in other example embodiments. The symbols denoting the various selectable tool items can be configured to reflect a standardized representation of functions discussed hereinafter in various languages, to correlate to the transcript language above which the symbols are placed.

Figure 24:
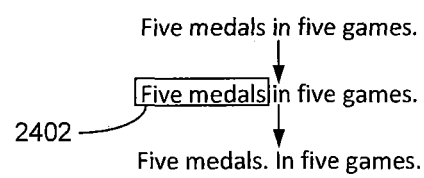
FIG. 24 illustrates successive views of editing of a sentence presented on the transcribed language UI of FIG. 13A, in accordance with aspects of the present application.
Figure 25:
FIG. 25 illustrates English word objects of the sentence of FIG. 24, before and after the editing and French word objects related to the sentence of FIG. 24, before and after the editing, in accordance with aspects of the present application.

The functionality of the "S." selectable tool item 2322, which may be called a "sentence format" tool, will now be described with reference to FIGS. 24 and 25. FIG. 24 illustrates three subsequent representations of the text "Five medals in five games." In the illustrated embodiment, the user may have determined, based on audio playback, that the speaker appears to have spoken the phrase "Five medals in five games" as two sentences. The user performs a predetermined action to add a highlight box 2402 to the words of the first sentence, namely "Five medals" (for example, using a combination of movements of the navigation pointer 1301 and single clicking), as shown in the second line of FIG. 24. User selection of the sentence format "S." selectable tool item 2322 (for example through a double click of the "S." selectable tool item 2322) causes the words in the highlight box 2402 to be automatically re-presented as an independent sentence and the first letter of the immediately following word to be capitalized to indicate the start of a new sentence, as shown in the third line of FIG. 24. Making the words in the highlight box 2402 into a sentence includes capitalizing the first letter of the first word (if it is not already a capital) and adding a period after the last word in the highlight box 2402. FIG. 25 illustrates the "medals" word object 707E-8 and the "in" word object 707E-9 in the edit data 228. FIG. 25 also illustrates an updated "medals." word object 707E-8U and an updated "In" word object 707E-9U arrived at responsive to the sentence format "S." selectable tool item 2322 having been used. As can be seen in the updated "medals." word object 707E-8U, the word "medals" has been replaced with "medals." (e.g., a period has been added). As can be seen in the updated "In" word object 707E-9U, the word "in" has been replaced with "In" (e.g., the word has been capitalized). In FIG. 25, ramifications of changing the transcribed language text are shown propagated to the translated language text. The phrase "Five medals in five games," translates into the second French sentence object 707F-2, with "Cinq médailles en cinq matchs." presented as a single sentence. When turned into two sentences, subsequent to the corresponding translation would generate two sentence objects, namely a first portion updated second French sentence object 707F-2U1, with text, "Cinq médailles." and a second portion updated second French sentence object 707F-2U2, with text, "Dans cinq jeux." Thus, there is a change in the manner in which the translated language text words are stored corresponding to a change in the manner in which the transcribed language text words are stored.

As previously discussed, in some example embodiments, the translated media editing system 102 sends portions of transcribed language text to the translation system 104A for translation. In instances where the changes to the transcribed language transcript do not change the words, as described in conjunction with discussion of FIGS. 24 and 25, the translated media editing system 102 may be configured to send unchanged portions before and after the edited transcribed language text in addition to the edited transcribed language text in order to provide the translation system 104A with context. For example, where the translated language timing data is based on sentence-level timing, the system can be configured to send the preceding and subsequent sentence to the non-word text changed portion of the transcript.

Accordingly, in at least some applications the sentence format "S." selectable tool item 2322 provides a convenient means by which transcribed text can be quickly placed into correct sentence structure by a reviewer.

Figure 26:
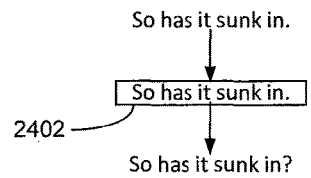
FIG. 26 illustrates successive views of editing of a sentence presented on the transcribed language UI of FIG. 13A, in accordance with aspects of the present application.

The functionality of the "?" selectable tool item 2324, which is a question format tool, will now be described with reference to FIGS. 26 and 27. FIG. 26 illustrates three subsequent representations of the text "So has it sunk in." In the illustrated embodiment, the user determines, based on audio playback and/or the illustrated text, that the phrase "So has it sunk in." is a question. The user performs a predetermined action to highlight the words of the phrase in the highlight box 2402 (for example, using a combination of movements of the navigation pointer 1301 and single clicking), as shown in the second line of FIG. 26. User selection of the question format "?" selectable tool item 2324 (for example, through a double click of the question format "?" selectable tool item 2324) causes the words in the highlight box 2402 to be automatically re-presented as a question, as shown in the third line of FIG. 26. Updating the phrase involves: (1) capitalizing the first word in the phrase, if it is not already capitalized; and (2) adding a question mark to the final word in the phrase and deleting any other punctuation that may be present after the final word, such as a period.

Figure 27:
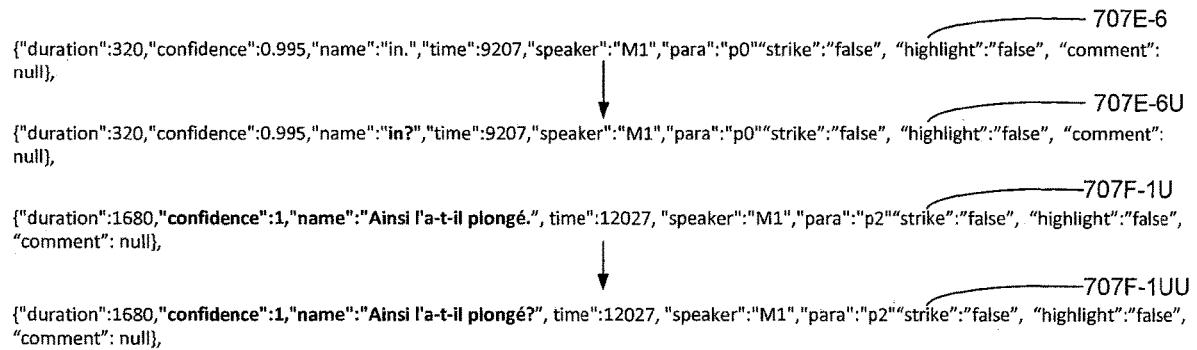
FIG. 27 illustrates the word objects related to the sentence of FIG. 26 for a word both before and after the editing, in accordance with aspects of the present application.

FIG. 27 illustrates the "in." word object 707E-6 in the edit data 228 before editing. FIG. 27 also illustrates an "in?" word object 707E-6U after the question format "?" selectable tool item 2324 has been applied. As can be seen by comparing the "in." word object 707E-6 and the "in?" word object 707E-6U, the phrase punctuated with a period has been replaced with phrase punctuated with a question-mark.

In FIG. 27, the ramifications of changing the transcribed language text in FIG. 26 are shown propagated to the translated language text. The updated first French sentence object 707F-1U, familiar from FIG. 21, reads "Ainsi l'a-t-il plongé." After the question format "?" selectable tool item 2324 has been applied, a twice update first French sentence object 707F-1UU reads "Ainsi l'a-t-il plongé?"

As previously discussed, in some example embodiments, the translated media editing system 102 sends portions of the transcribed language text to the translation system 104A for translation. In instances where the changes to the transcribed language transcript do not change the words of the transcribed language transcript, as described in view of FIGS. 24, 25, 26 and 27, the translated media editing system 102 may be configured to send unchanged portions of the transcribed language text, located before and after the edited transcribed language text, in addition to the edited transcribed language text, to provide the translation system 104A with context. For example, where the translated language timing data is based on sentence-level timing, the translated media editing system 102 can be configured to send the sentence preceding the non-word text changed portion of the transcript and the sentence subsequent to the non-word text changed portion of the transcript.

In other embodiments, the translated media editing system 102 can be configured to assign a score to a translated language text sentence, where the score is related to the amount of words determined to be in the sentence, the duration of the sentence, etc. In the event that the translated media editing system 102 detects that the score falls below a threshold level, for example, where the sentence is a short sentence, only comprised of one or two words, the translated media editing system 102 may be configured to send the short sentence and a further sentence as a single sentence to the translation system 104A, thereby providing additional context.

Accordingly, in at least some applications, the question format "?" selectable tool item 2324 provides a convenient means by which transcribed text can be quickly edited by a reviewer to correctly identify questions. Moreover, in at least some applications the question format "?" selectable tool item 2324 provides a convenient means by which transcribed language text translations can be quickly edited by a reviewer to correctly identify questions to provide context to the translation system 104A.

Figure 28:
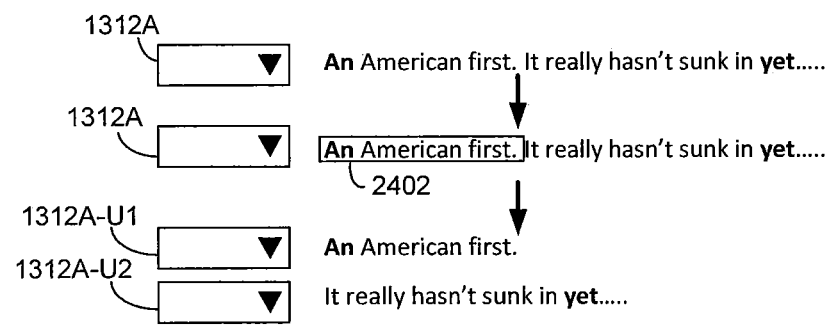
FIG. 28 illustrates successive views of editing of a sentence presented on the transcribed language UI of FIG. 13A, in accordance with aspects of the present application.
Figure 29:
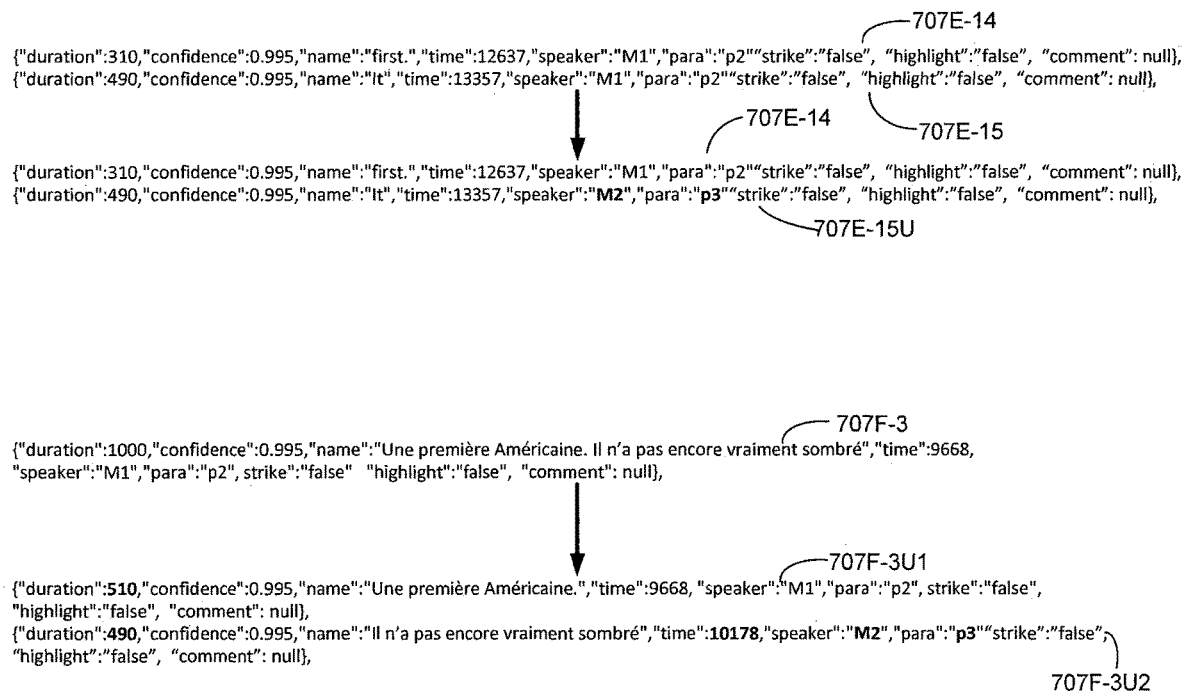
FIG. 29 illustrates English word objects related to the sentence of FIG. 28 for a word both before and after the editing and French word objects related to the sentence of FIG. 28 for a word both before and after the editing, in accordance with aspects of the present application.

The functionality of the "¶" selectable tool item 2326, which is a paragraph format tool, will now be described with reference to FIGS. 28 and 29. As noted above, in example embodiments, each paragraph of text may be associated, in the transcribed language UI 1300A, with its own speaker ID box 1312A that can be used to provide an identity of the speaker of the paragraph. FIG. 28 illustrates three subsequent representations of the text (which text may be transcribed or translated) "An American first. It really hasn't sunk in yet . . . " In the illustrated embodiment, the user may determine, based on audio playback, that the phrases "An American first." and "It really hasn't sunk in yet . . . " are actually spoken by different people and, accordingly, should be in different paragraphs each having its respective speaker ID box 1312A. The user performs a predetermined action to highlight the words that should be put into an independent paragraph with the highlight box 2402, as shown in the second line of FIG. 28. User selection of the paragraph format "¶" selectable tool item 2326 (for example through a double click of the "¶" item) causes the words in the highlight box 2402 ("An American First.") and the remaining words in the original paragraph ("It really hasn't sunk in yet . . . ") to be automatically re-formatted and presented as two separate paragraphs, each paragraph having its own associated speaker ID box 1312A-U1, 1312A-U2, as shown in the third line of FIG. 28.

In example embodiments where the translated media editing system 102 defines timing data in reference to paragraph start times, as discussed above, changes to the paragraph timing in the transcribed text can be imported to the translated data by translated media editing system 102. In one example embodiment, the translated media editing system 102 simply determines new paragraph timing in reference to the paragraph data stored in the transcribed transcript and, as such, changes to the transcribed transcript elicit automatic changes in the translated transcript. In other embodiments, the translated media editing system 102 determines that there has been a change to the number of paragraphs, determines the new sentences that start the paragraphs and corresponds the sentences that start the paragraphs in the transcribed text to the paragraphs of the translated text. In this embodiment, the translated media editing system 102 determines that all sentence objects between the sentences that start paragraphs are presumed to belong to the paragraph of the immediately preceding sentence that started a paragraph.

As noted above, the English word objects 707E in edit data 228 each have a paragraph:value attribute pairing, which is updated by the translated media editing system 102 to track changes in paragraph numbering. In this regard, FIG. 29 illustrates a "first." word object 707E-14 and an "It" word object 707E-15 before the "¶" sentence format tool 26 is applied. FIG. 29 also illustrates an updated "It" word object 707E-15U after the paragraph format "¶" selectable tool item 2326 has been applied. As can be seen by comparing the "It" word object 707E-15 to the updated "It" word object 707E-15U, it can be noted that the paragraph attribute has been incremented from "para":"p2" to "para":"p3" to track that "An American first." is in a paragraph that is separate from the paragraph that includes "It really hasn't sunk it yet . . . ". The translated media editing system 102 similarly updates all subsequent paragraph attributes throughout the edit data 228 to accommodate the insertion of an additional paragraph. The speaker attribute may also be updated in some embodiments, as shown in FIG. 29 as a difference between the "It" word object 707E-15 and the updated "It" word object 707E-15U.

Changes to the paragraph numbers in a transcribed language transcript may also result in changes to the translated language transcript. The changes to the translated language transcript as a result of the changes shown in FIG. 28 are reflected in FIG. 29, wherein a translated language using paragraph-level timing is shown. In the third French sentence object 707F-3, representative of a translation of the first line of FIG. 28, there is only one paragraph and, as such, the timing data only reflected one duration and one start time. A first portion of the third French sentence object 707F-3U1 and a second portion of the third French sentence object 707F-3U2 are representative of a translation of the third and fourth lines of FIG. 28 each have a distinct time and distinct duration. The timing data may have been generated as described above. Any word-level timing data for the translated language text words derived from the initial timing data would similarly have to be updated. Moreover, had the translated language transcript text changed in response to changes outlined in FIG. 28, the respective confidence of transcription would similarly have to be updated to the new timing level.

Accordingly, in at least some applications the paragraph format "¶" selectable tool item 2326 provides a convenient means by which a block of transcribed text can quickly be broken into paragraphs to account for speaker transitions that were not detected.

Figure 30:
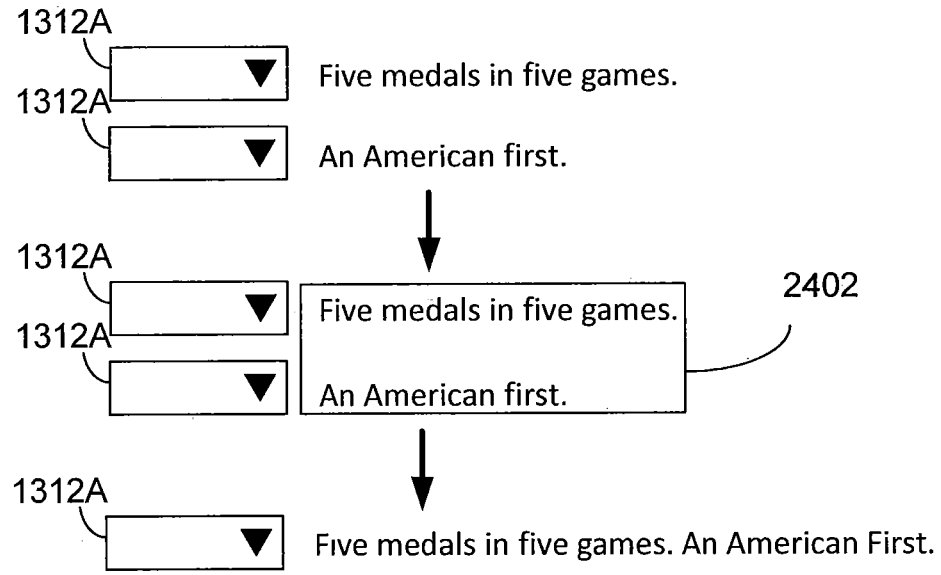
FIG. 30 illustrates successive views of editing of a pair of sentences presented on the transcribed language UI of FIG. 13A, in accordance with aspects of the present application.

In addition to separating a block of text into separate paragraphs, the paragraph format "¶" selectable tool item 2326 can also be used in some embodiments to merge separate paragraphs into a single paragraph. In this regard, FIG. 30 illustrates an example in which two separate paragraphs are merged into single paragraph. In particular, FIG. 30 illustrates three subsequent representations of the text "Five medals in five games." "An American first." In the upper representation of FIG. 30, the phrases "Five medals in five games." and "An American first." are each represented as separate paragraphs having their own Speaker ID box 1312A based on a false determination, by the S2T conversion system 104, that the phrases were spoken by different speakers. The user/reviewer determines, based on audio playback, that two phrases are actually spoken by the same person and, accordingly, can be merged into one paragraph having one speaker ID box 1312A. The user performs a predetermined action to highlight the block of words that should be put into a common paragraph with the highlight box 2402, as shown in the middle of FIG. 30. User selection of the paragraph format "¶" selectable tool item 2326 (for example through a double click of the paragraph format "¶" selectable tool item 2326) causes the words in the highlight box 2402 ("Five medals in five games.") and ("An American First.") to be automatically re-formatted and presented as a single paragraph, having one associated speaker ID box 1312A, as shown in the bottom portion of FIG. 30.

The changes outlined in FIG. 30 could, equally, be applied to the translated language UI 1300B, wherein only the translated language transcript is changed or, if the changes are made in the transcribed language UI 1300A, the changes could be reflected in the transcribed language transcript as well. Changes to the timing data can be implemented in a fashion similar to the methods described above where the number of paragraphs is increased.

The corresponding edit data 228 is also updated by translated media editing system 102. In particular, the "speaker":value and "para":value attribute:value pairings for the word objects associated with each of the words "An American First." are updated from "speaker":"M1" to "speaker":"M2" and from "para":"p2" to "para":"p1" to correspond with the "speaker and "para" pairings associated with the words "Five medals in five games." Additionally, the values associated with the "para" attribute for paragraphs in the edit data 228 may be updated to reflect the removal of a paragraph from the transcribed data.

In some embodiments, changes to the non-text word in the transcribed language transcript do not automatically trigger transcribed text words being sent to the translation system 104A. For example, in FIG. 30, the translated media editing system 102 may simply update the paragraph timing values of the translated language transcript in response to the user input of changing paragraph timing where the system is configured to store sentence-level timing data for the translated text transcript.

Accordingly, in at least some applications, the paragraph format "¶" selectable tool item 2326 provides a convenient means by which a block of transcribed text that is broken into separate paragraphs can be combined to correct false speaker transitions detected by the S2T conversion system 104.

Figure 31:
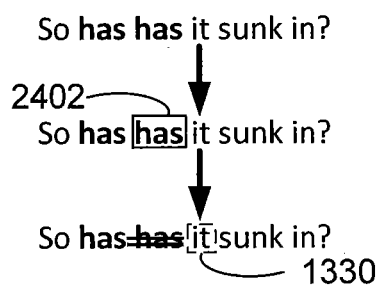
FIG. 31 illustrates successive views of editing of a sentence presented on the transcribed language UI of FIG. 13A, in accordance with aspects of the present application.
Figure 32:
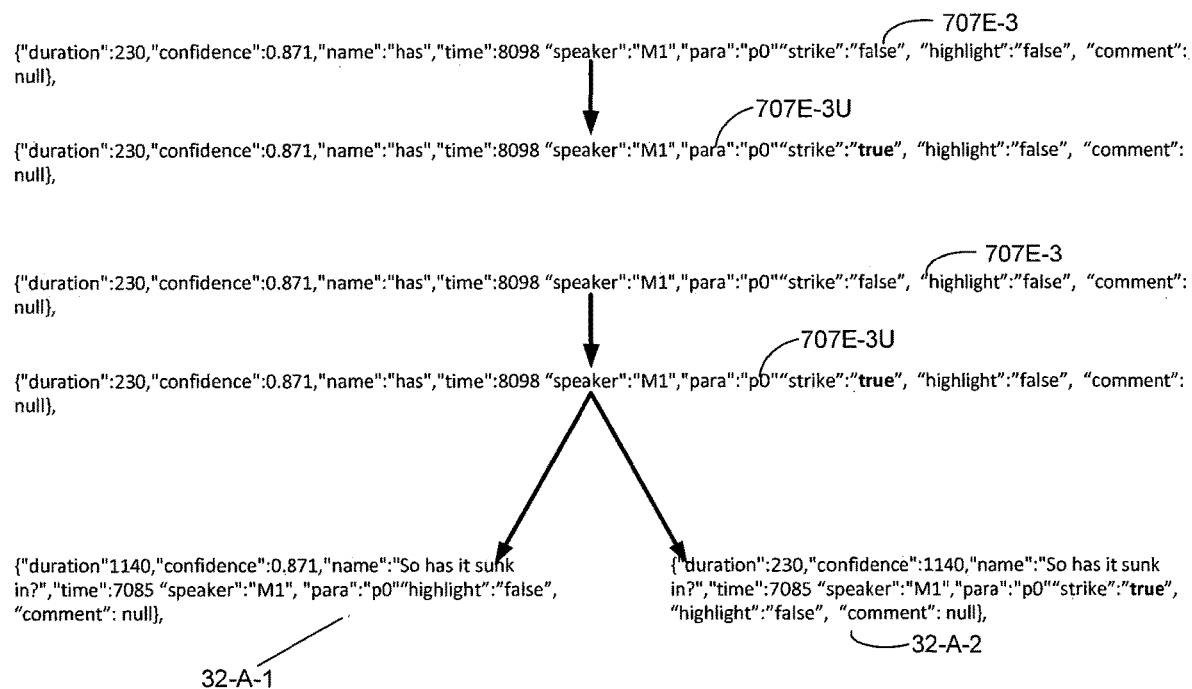
FIG. 32 illustrates English word objects related to the sentence of FIG. 31 for a word both before and after the editing, in accordance with aspects of the present application.

The functionality of the "S" selectable tool item 2334, which is a strikeout tool, will now be described with reference to FIGS. 31 and 32. FIG. 31 illustrates three subsequent representations of the text "So has has it sunk in?" An example was provided, hereinbefore, in which the second occurrence of "has" was physically deleted. However, in the present example, the reviewer determines, based on audio playback the "has" was actually verbally repeated, but wants to strike-out the second "has" as redundant, while, at the same time, preserving the integrity of the transcript and the correct audio timing. Accordingly, the user performs a predetermined action to highlight the text that is to be struck out (which is "has" in the present example but could be multiple words in some examples) in the highlight box 2402 (for example using a combination of navigation pointer 1301 movements and single clicking), as shown in the second line of FIG. 31. User selection of the strikeout "S" selectable tool item 2334 (for example through a double click of the strikeout "S" selectable tool item 2334) causes the word(s) in the highlight box 2402 to be automatically re-presented as struck-out as shown in the third line of FIG. 31. FIG. 32 illustrates the second "has" word object 707E-3 in the edit data 228. FIG. 32 also illustrates an updated second "has" word object 707E-3U after the strikeout "S" selectable tool item 2334 has been applied. As can be seen by comparing the second "has" word object 707E-3 and the updated second "has" word object 707E-3U, the "strike" attribute has been changed from "false" to "true".

In example embodiments, during audio playback the user device 108 is configured, by instructions received from the translated media editing system 102, to skip over the audio associated with any words that have an associated "strike": "true" attribute:value pairing. For example, during audio play back, the audio commencing at time 8098 ms will be skipped for a duration of 0.230 seconds. Similarly, at the same time, the audio indicator 1330 will skip the struck-out word "has".

In some embodiments, transcribed language text words which are struck out will not be sent to the translation system 104A to be translated. Instead of storing the strike attribute as a "true" value or a "false" value, the translated media editing system 102 may assign the timing data with respect to a repeated word, which was struck-out, with the instance of the word that was not struck out and send only send the non-struck-out instance of the word for translation. For example, in FIG. 32, the translated media editing system 102 may store the transcribed language text in word level objects, including both instances of "has". Upon the user entering the strike through function with respect to the second "has," the translated media editing system 102 may be configured to simply consolidate all word objects into a first sentence object 32-A-1 and send the first sentence object 32-A-1 to the translation system 104A without indicating that there is a strikethrough. Alternatively, the translated media editing system 102 may preserve the information that there is a strikethrough present in the sentence object as shown in a second sentence object 32-A-2 by maintaining a "strike" value of "true," to indicate that there was a strikethrough in the text from which the translation originated.

In another example embodiment, not shown, the translated media editing system 102 may separately send the struck-out word for translation. The transcribed language text word that is struck out may automatically be assigned a corresponding indicator that it was struck out, such as a small flag, highlighting, bolding, bracketing, commenting, etc.

Figure 33:
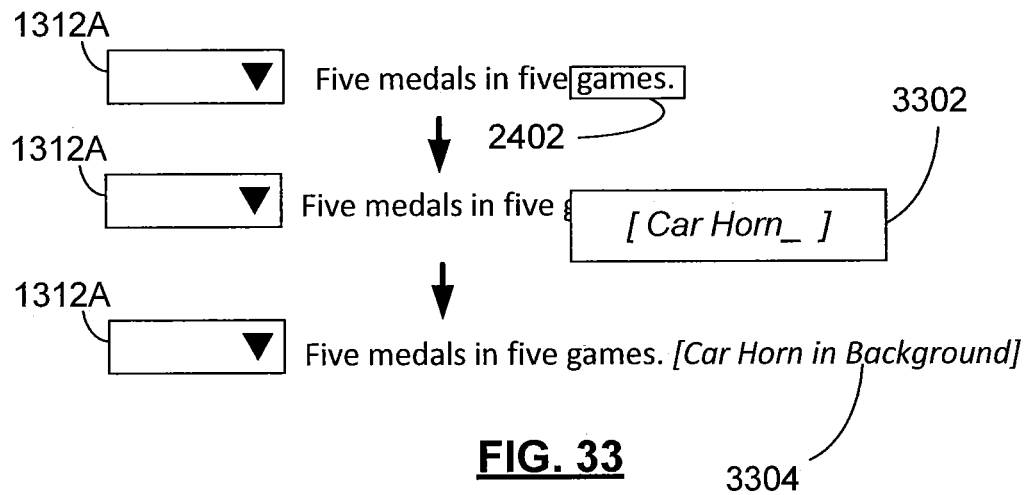
FIG. 33 illustrates successive views of editing of a sentence presented on the transcribed language UI of FIG. 13A, in accordance with aspects of the present application.

The functionality of the "A*" selectable tool item 2328, which is a comment tool, will now be described with reference to FIG. 33. FIG. 33 illustrates three subsequent representations of the text "Five medals in five games." In the first representation, the word "games." is presented in the highlight box 2402 in response to a predetermined user action. User selection of the comment "A*" selectable tool item 2328 (for example through a double click) causes an text edit box 3302 to appear at or near the previously highlighted word, thereby allowing the user to add a text comment, as shown in the second representation in FIG. 33. Once the user is done entering the comment, a predetermined user action (for example pressing "enter") causes user-entered text to appear as a comment 3304 adjacent the originally highlighted word. In the illustrated example, the comment 3304 "[Car Horn In Background]" appears in-line with the text, after the word "games" in the third representation in FIG. 33. The comment is marked to distinguish it from the transcript text—in the illustrated example, square brackets and italics are used to distinguish the comment. Furthermore, the annotated text may be skipped by the audio indicator 1330 during audio playback. As noted above, each word object 707E includes a "comment":"string" value pairing; when a comment is added to a word using the comment "A*" selectable tool item 2328, the pairing is updated in the edit data 228, by the translated media editing system 102. In the illustrated example, it can be expected that the pairing for the word object 707E associated with "games" will be changed from "comment":null to "comment":"Car Horn In Background".

The Comment "A*" selectable tool item 2328 provides a convenient mechanism by which a transcript reviewer can add background notes to transcribed text in a manner that does not interfere with audio playback timing and allows the comment to be easily visually distinguished from the transcript text.

In some example embodiments, the comments themselves are sent to the translation system 104A for translation. The comments are associated with the word units, which correspond to the location of the timing data in the transcribed language transcript. For example, if a "car horn" comment is added to the "games" word, as shown in FIG. 33, and the translated transcript relies on sentence-level timing data, the translated comment is associated with the sentence object of the full sentence. In the event that the translated transcript generates word-level timing data, the translated media editing system 102 may be configured to seek out the comment timing data from the transcribed language transcript and select the translated language text word that most closely resembles the original timing data of the comment and attach the comment to the selected translated language text word.

In some embodiments, the translated media editing system 102 may be configured to immediately send comment attribute values to the translation system 104A. In other example embodiments, the translated media editing system 102 may send comments to be translated once further changes to the transcribed language transcript have been made.

Figure 34A:
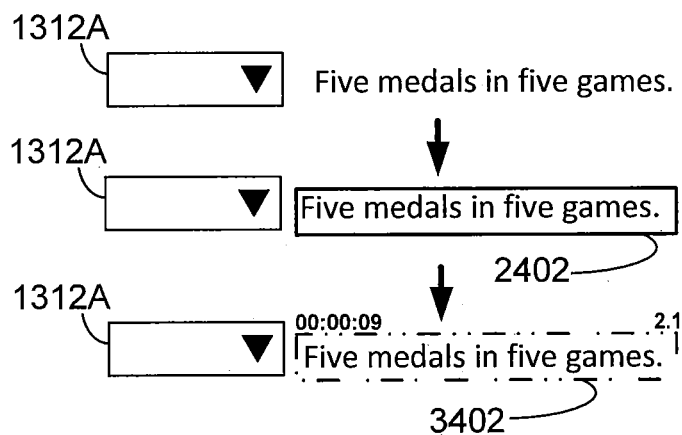
FIG. 34A illustrates successive views of editing of a sentence presented on the transcribed language UI of FIG. 13A, in accordance with aspects of the present application.
Figure 34B:
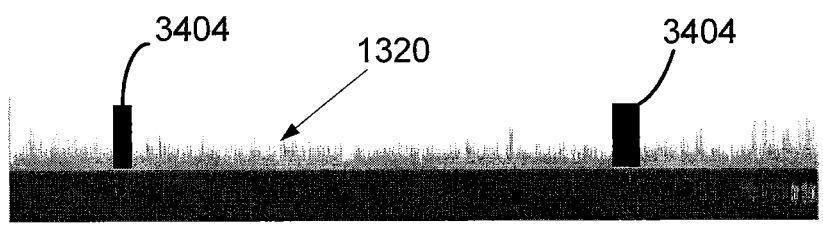
FIG. 34B illustrates an audio waveform related to the sentence of FIG. 34A with overlay highlight indicators, in accordance with aspects of the present application.

The functionality of "HL" selectable tool item 2332, which is a persistent highlight tool, will now be described with reference to FIG. 34. FIG. 34 illustrates three subsequent representations of the phrase "Five medals in five games." In the first representation, the phrase is presented as originally transcribed. In the second representation the phrase is presented in the highlight box 2402 in response to a predetermined user action. User selection of the persistent highlight "HL" selectable tool item 2332 (for example through a double click) causes the text in the highlight box 2402 to be permanently highlighted in the transcript with a persistent highlight marker 3402, as shown in the third representation in FIG. 34. Additionally, a "start time" is presented in association with the highlighted text as well as a "duration", thereby enabling a user to easily determine at what point in time the selected phrase appears in the transcript and the duration of the phrase. In the illustrated example of FIG. 34, the start time of 00:00:09 is displayed (which is the time:value attribute for the first word in the highlighted phrase) and the duration is 2.1 s, which is the sum of all the durations of all of the words in the highlighted phrase. As noted above, each word object 707E includes a "highlight":true/false value pairing; when a string of words are highlighted using the persistent highlight "HL" selectable tool item 2332, the pairing is updated to "highlight": "true" for each of the words in the string and the word objects 707E may be updated in the edit data 228, by the translated media editing system 102, so that the next time the transcript is retrieved, the persistent highlight information is again presented in the transcribed language UI 1300A. As noted hereinbefore, in example embodiments, the audio waveform 1320 representing the entire transcription is presented on the transcribed language UI 1300A. As represented in FIG. 34B, in some example embodiments, the user device 108 is configured to overlay highlight indicators 3404 on the audio waveform 1320 that correlate to the relative location and length of sections of the transcript that are highlighted with the persistent highlight markers 3402. Accordingly, the highlight indicators 3404 provide a visual indication to a user/reviewer of where highlighted portions of the transcript are, even when those exact portions are not immediately displayed in the viewable region of the transcribed language UI 1300A. In some example embodiments, a user can jump to a highlighted region (e.g., cause that region to be displayed in the viable region of the transcribed language UI 1300A) by clicking, or otherwise selecting, the corresponding highlight indicator 3404.

In some embodiments, the highlight indicators 3404 and the persistent highlight marker 3402 are maintained in the translated language transcript in a fashion similar to the depictions in FIGS. 33 and 34. In one example embodiment, where the translated language transcript relies on sentence-level timing, where at least one word in a sentence in a transcribed language transcript is highlighted, the translated media editing system 102 may be configured to highlight the corresponding sentence object in the translated language transcript. In another example embodiment, the translated language transcript may simply have a visual indicator that there is highlighting, such as a flag or other visual market, to allow the user to use highlighting within the translated language transcript without becoming confused.

The persistent highlight "HL" selectable tool item 2332 provides a convenient mechanism by which a transcript reviewer can quickly highlight a phrase of interest for future reference and be provided with timing information for the phrase.

Figure 35:
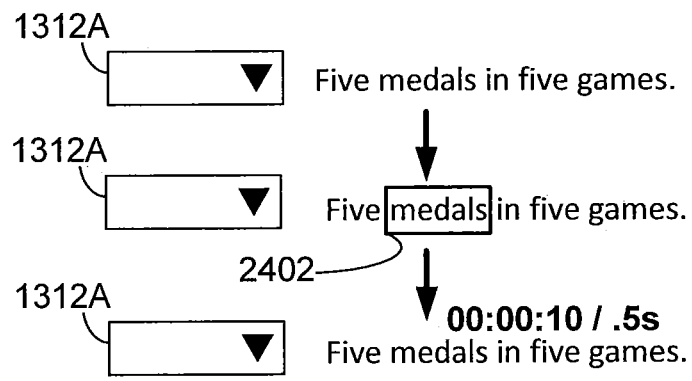
FIG. 35 illustrates successive views of a sentence presented on the transcribed language UI of FIG. 13A, in accordance with aspects of the present application.

The functionality of the "0000/00:00" selectable tool item 2330, which is a visual word timestamp tool, will now be described with reference to FIG. 35. FIG. 35 illustrates three subsequent representations of the phrase "Five medals in five games." In the first representation, the phrase is presented as originally transcribed. In the second representation the phrase is presented with the word "medals" in the highlight box 2402 in response to a predetermined user action. User selection of the visual word timestamp "0000/ 00:00" selectable tool item 2330 (for example through a double click) then causes the word in the highlight box 2402 to be time stamped as shown in the third representation in FIG. 35. The time stamp can take a number of different forms—in the illustrated example, the word start time (00:00:10) and duration (0.5 s), as identified in the "medals" English word object 707E-8, are displayed adjacent to, or in-line with, the word "medals." In one example embodiment, the fact that a word has been "time stamped" is recorded by including a "timestamp":"true" attribute:value pairing in the corresponding word object 707E that is stored by the translated media editing system 102. In another example embodiment, a specified string is used in the "comment":"string" pairing to mark a word as time-stamped. Alternative selection methods can be used for selecting a word to time-stamp; for example, during audio playback, selecting the visual word timestamp "0000/00:00" selectable tool item 2330 may cause the word currently focused by the audio start indicator 1328 to be visually time stamped. The visual word timestamp "0000/00:00" selectable tool item 2330 may, in at least some examples, provide a convenient mechanism by which a transcript reviewer can quickly determine and visually record a particular word timing for present and future reference.

In some embodiments, the timestamp comments or visual markers, which have been described in relation to FIG. 35, are maintained in the translated language transcript. In one example embodiment, where the translated language transcript relies on sentence-level timing, and where at least one word in a sentence in a transcribed language transcript is timestamped, the translated media editing system 102 may be configured to timestamp the corresponding sentence object in the translated language transcript. In another example embodiment, the translated language transcript may simply have a visual indicator that there has been timestamping, such as a flag or other visual marker, to allow the user to use the timestamp function within the translated language transcript without creating confusion.

Figure 36:
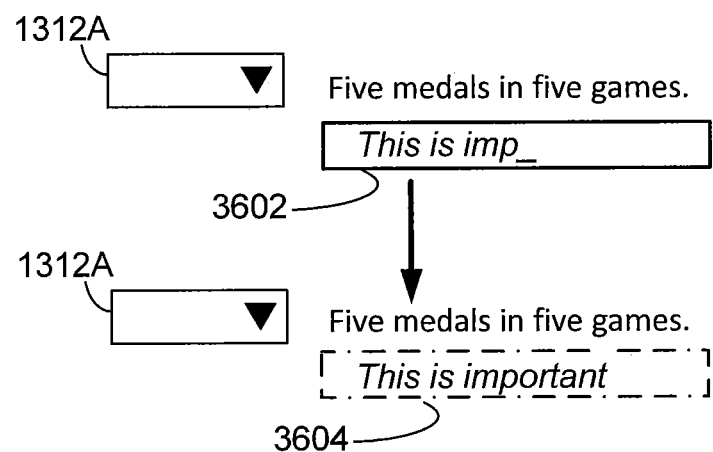
FIG. 36 illustrates successive views of a sentence presented on the transcribed language UI of FIG. 13A, in accordance with aspects of the present application.

In addition to, or as an alternative to, the in-line comments discussed above, in at least some example embodiments, the system is configured to allow comments to be inserted after paragraphs. In this regard, FIG. 36 illustrates two subsequent representations of the phrase "Five medals in five games." Referring to the first representation, upon detecting a predetermined user action, the user device 108 is configured to display a comment addition box 3602 and position a text input cursor in the comment addition box 3602. In the illustrated embodiment, the predetermined user action may, for example, be the positioning of a navigation pointer in the region of the screen immediately under the paragraph for a predetermined duration, or may be a screen touch in the same region. Once the comment addition box 3602 is presented, the user/reviewer can enter and save a desired paragraph comment 3604, which will subsequently be presented in association with the paragraph in a format that visually distinguishes the content of the comment 3604 from the transcribed text, as shown in the second representation of FIG. 36. The comment text is not played as part of audio playback of the transcribed text. In one example embodiment, the fact that a paragraph has been associated with a paragraph comment is recorded by including a "paracomment":"string" attribute:value pairing in the "games." English word object 707E-11, such that the comment can be stored by the translated media editing system 102 and reproduced in subsequent transcript views. In the illustrated embodiment, the attribute:value pairing "paracomment": "This is important" may be included in the "games" English word object 707E-11.

In some example embodiments, the comments to be inserted after paragraphs may be translated by the translated media editing system 102 into the translated language transcript similar to the means used to translate in-text comments, described hereinbefore. For example, in some instances, the comments themselves are sent to the translation system 104A for translation. In other example embodiments, the transcribed language comments may simply be copied to the corresponding translated language text and displayed in a margin, or otherwise, to notify the editor as to the presence of comments in a different language.

In some embodiments, the comments are associated with the word units, which correspond to the location of the timing data in the transcribed language transcript. For example, if the "This is important" comment 3604 is added to a paragraph, as shown in FIG. 36, and the translated transcript relies on sentence-level timing data, a translated version of the comment 3604 may be associated with the first sentence object of the paragraph sentence. In another example embodiment, the paragraph may be associated with the last sentence object in a paragraph. In the event that the translated transcript generates word-level timing data, the translated media editing system 102 may be configured to assign the paracomment to the first or last word in the paragraph.

As can be seen in FIG. 13, in some example embodiments, the transcribed language UI 1300A includes a search field(s) 1360, which can be used to quickly find specified text in the viewed transcribed language and translated language transcripts. Additionally, the transcribed language UI 1300A includes an "undo" button 1342 and a "redo" button 1344, which may be designed to undo or redo all edits to one or both of the transcribed language or translated language transcripts.

As noted above, the transcript paragraphs displayed in the transcribed language UI 1300A are each associated with a speaker transition and the speaker ID boxes 1312A are provided next to each of the transcript paragraphs to identify the speaker. In at least some example embodiments, the speaker ID boxes 1312A are automatically populated based on the value assigned to the "speaker" attribute for each of the English word objects 707E associated with the content of a paragraph. Moreover, the speaker ID boxes 1312A may be arranged such that changing one of the speaker ID boxes 1312A in either the transcribed language UI 1300A or the translated language UI 1300B changes the corresponding respective speaker ID box 1312A. The speaker ID boxes 1312A may be configured to allow for only the transcribed language editor to have the ability to change their values. For example, in FIG. 13A, based on attributes of the English word objects 707E listed in FIG. 7A, the speaker box 1312A associated with "So has has it sunk in." would be populated with "M1" (i.e., "male speaker number 1"), the speaker box 1312A associated with "Five medals in five games." would be populated with "M2" (i.e., male speaker 2), and the speaker box 1312A associated with "An Armenian first. It really hasn't sunk in yet . . . " would be populated with "M1". As will be appreciated from FIG. 7A, each of the speaker values are assigned a text string in the "speakers" object 704, which can be used to automatically populate the speaker ID boxes 1312A—for example, in the speakers object 704, the speaker "M1" can be designated as {"M1": {"name":"Jeff K."} . . . }. Where a value has been populated for one transcript, the same values may be populated in the corresponding location for any translated transcript as the identity of the speaker is not affected by language changes.

Figure 37:
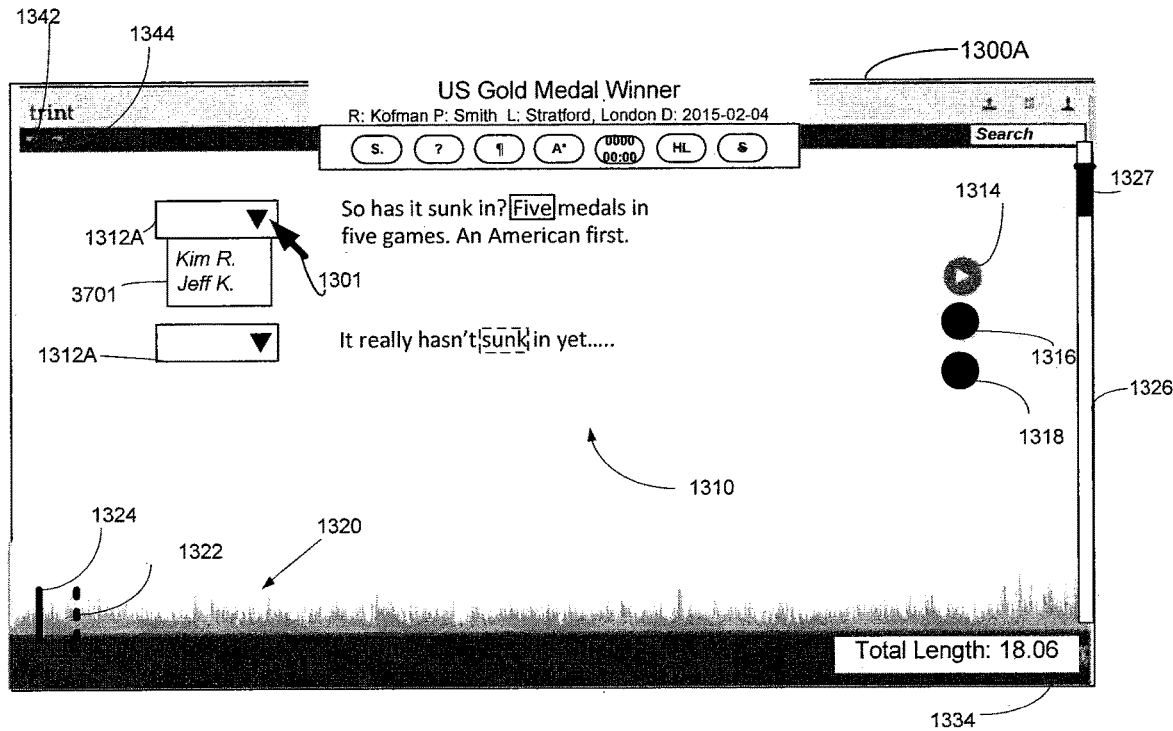
FIG. 37 illustrates the transcribed language UI of FIG. 13A including a drop down list of user selectable speaker names in accordance with aspects of the present application.

In the illustrated example embodiment of FIG. 13A, the speaker ID boxes 1312A are not automatically populated, but are rather populated through user interaction with a drop down menu function. In this regard, FIG. 37 represents the transcribed language UI 1300A once a reviewer has, with the aid of audio playback, used the edit and paragraph formatting tools described above to correct transcription errors in the text shown in FIG. 13A and reformat the text into two paragraphs, with each paragraph associated with a different speaker. In the example of FIG. 37, the user device 108 has detected that a navigation tool such as the navigation pointer 1301 has been used to focus the speaker box 1312A that is associated with the paragraph "So has it sunk in? Five medals in five games. An American first." In response, the user device 108 causes a drop down list 3701 of selectable speaker names to appear.

Figure 38:
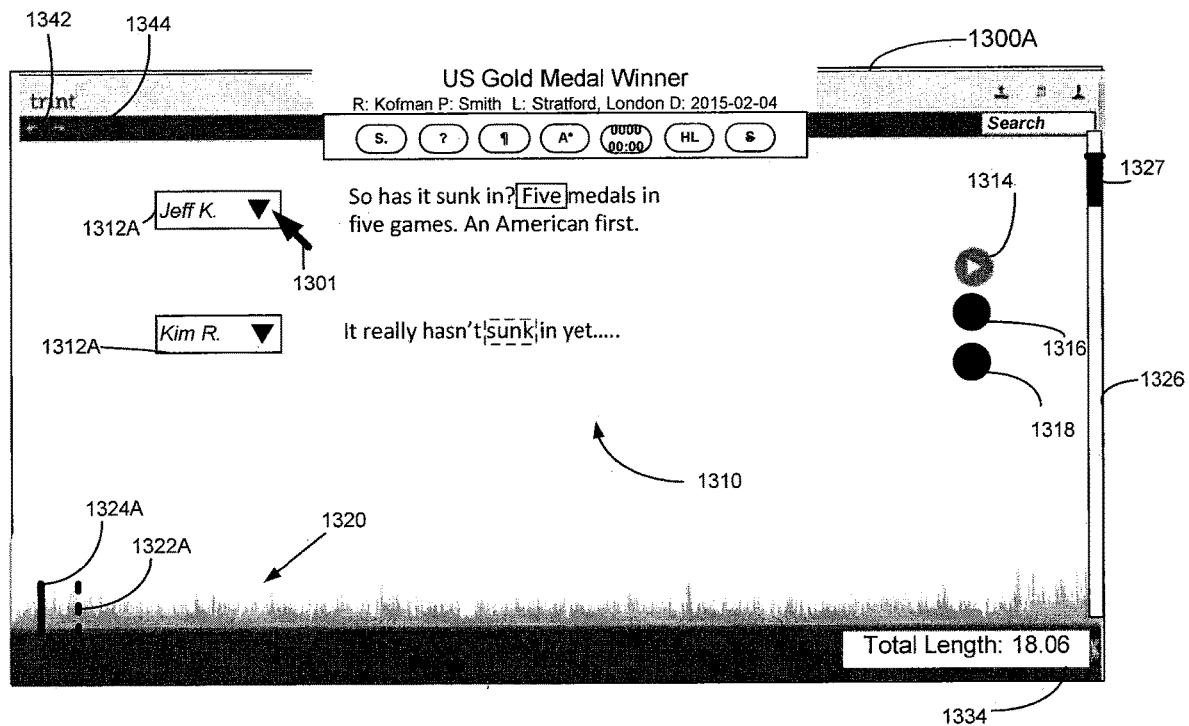
FIG. 38 illustrates the transcribed language UI of FIG. 37 after selection of speaker names in accordance with aspects of the present application.

In at least some example embodiments, the drop down list 3701 is pre-populated based on the metadata 229. As noted above in respect of FIG. 12, speaker metadata can be input through the metadata UI screen 1202 in at least some embodiments. Accordingly, in the illustrated example, the speaker name list 3701 includes "Kim R." and "Jeff K.", which have been previously entered through the metadata UI screen 1202. User selection of one of these names (for example through use of the navigation pointer 1301) will result in the selected speaker name being associated, in the speaker ID box 1312A, with a paragraph. In this regard, FIG. 38 displays the transcribed language UI 1300A in which the speaker ID boxes 1312A for the first and second paragraphs have been populated with "Jeff K." and "Kim R." respectively. In an example embodiment, the "speaker" object 704 of the edit data 228 (see FIG. 7A) is updated to correspond to the changes made in the transcribed language UI 1300A. For example, in the illustrated example, the speakers "M1" and "M2" in object 704 will be designated {"M1":{"nanne": "Jeff K."} . . . "M2":{"Kim R."}.

In some example embodiments, where the speaker ID boxes 1312A are not automatically populated, a flag may be included in the English word objects 707E associated with a paragraph word to indicate that the speaker ID box 1312A associated with the paragraph has been populated. For example, the English word objects 707E for the words in a paragraph that has a populated speaker ID box 1312A could include the attribute:value pairing "ID":true, and the words in a paragraph having a non-populated speaker ID box would include the attribute:value pairing "ID":false. In other example embodiments, information may be included in the metadata 229 that identifies which of the speaker ID boxes 1312A are populated. As previously discussed, the translated language transcript may store attribute:value pairings related to the speaker. The pairings may be copied from the transcribed language transcript, or the translated language transcript may have a reference to the transcribed language speaker ID box values, thereby allowing the translated media editing system 102 to access and act upon the values in the speaker ID boxes 1312A from the transcribed language transcript.

Accordingly, in example embodiments, the speaker ID boxes 1312A provide a convenient mechanism by which a reviewer can diarize transcript paragraphs by speaker as the reviewer listens to the audio playback of the transcript.

Another example translation UI 3900 that may be generated on the user device 108 under instructions from the user device 108 and the translated media editing system 102 will now be described with reference to FIG. 39. The translation UI 3900 includes a first UI element 3904 (shown on the left hand side of the translation UI 3900) and a second UI element 3906 (shown on the right hand side of the translation UI 3900). In example embodiments, the first UI element 3904 provides word-aligned audio playback and editing functionality that is substantially identical to that described above in respect of the transcribed language UI 1300A of FIG. 13A in combination with the translated language UI 1300B of FIG. 13B. The translation UI 3900 of FIG. 39 is configured to allow user-selected parts of the transcript text from first UI element 3904 to be copied over to the second UI element 3906, as illustrated by an arrow 3908. In one example embodiment, portions of the transcript text in the first UI element 3904 can be highlighted in response to a detected user input activity and then the highlighted portion copied, dragged and dropped into the second UI element 3906. Accordingly, the translation UI 3900 allows a user/reviewer to select and extract portions of the transcript text to create an extracted transcript.

In some example embodiments, once the user has selected the text to be extracted, the translated media editing system 102 automatically determines whether there are any translated language transcripts that relate to the selected text. In the event that translated language text words are available, the translated media editing system 102 may prompt the user as to whether any translations should be displayed, as shown by a French language button 3909FR and a German language button 3909DE. In other example embodiments, where no translated language transcript has been generated, the translated media editing system 102 may prompt the user to determine whether a translated language transcript is desired (not shown). Upon receiving confirmation that a translated language transcript is desired, the translated media editing system 102 may send the extracted text to the translation system 104A and, thereby, cause the generation of a translated language transcript 3910. In some embodiments, the extracted portion of audio can be sent only with a translated language transcript.

In example embodiments, word-aligned audio playback functionality is also provided for the second UI element 3906, such that the extracted transcript material can be audited and edited in a manner similar to that described above. When audio playback is initiated from the second UI element 3906, the playback indicator is displayed on the text in the second UI element 3906 and audio is only played back for the extracted text portions that have been copied to the second UI element 3906.

When portions of the transcribed language text are extracted and edited, the translated media editing system 102 can update a selected translated language transcript in a means consistent with those updating means described hereinbefore. In some example embodiments, the timing data of both the transcribed language and the translated language transcript 3910 will be calibrated to use the beginning of the extracted audio as a zero value for the transcript. In the event that the timing data is altered to have the beginning of the extracted audio as a reference, the timing data of the comments, timestamping, etc. are accordingly updated in the means described hereinbefore.

In at least some example embodiments, at least some editing functions (for example, paragraph and sentence editing, word editing and correction, speaker ID updates, etc.) performed on one side of the translation UI 3900 are automatically applied to the corresponding text (if any) that exits in the other side of the translation UI 3900—for example, edits performed on words in the first UI element 3904 are also applied to the corresponding words that have been copied to the second UI element 3906. In some example embodiments, words in transcript data in the first UI element 3904 that have been struck out are removed completely from the transcript text displayed in the second UI element 3906 and from the translated language transcript

3910. In some example embodiments, if selected by a user, only the selected translated transcript data in the translated language transcript 3910 is shown for editing along with the audio playback.

In example embodiments, the word objects and related data that correspond to the extracted transcript portions in the second UI element 3906 and the translated language transcript 3910 are stored as the extracted data 230 by the translated media editing system 102 (see FIG. 2). In some example embodiments, as previously discussed, data for the translated language transcript 3910 and the transcribed language transcript data are stored in the same file. The extracted data 230 may, for example, be a JSON file that includes a subset of the word objects of the corresponding edit data 223 from which the extracted data has been derived. In at least some example embodiments, the translated media editing system 102 is configured to also save the extracted audio component 222 (see FIG. 2) that includes a sub-set of audio data from the audio component 122 that corresponds to the extracted transcript data. Accordingly, in at least some example embodiments, the presently described translated media editing system 102 provides an environment in which an audio recording can be transcribed to text, then the audio and the transcribed text can be reviewed in an audio/text word aligned interface, and selected text can be extracted with the corresponding audio through a drag and drop function to provide a subset of the audio data and the corresponding transcript. In some example embodiments, the extracted information can then be made available to the original reviewer or to third parties, who then do not have to access the entire audio and transcript data.

Figure 40:
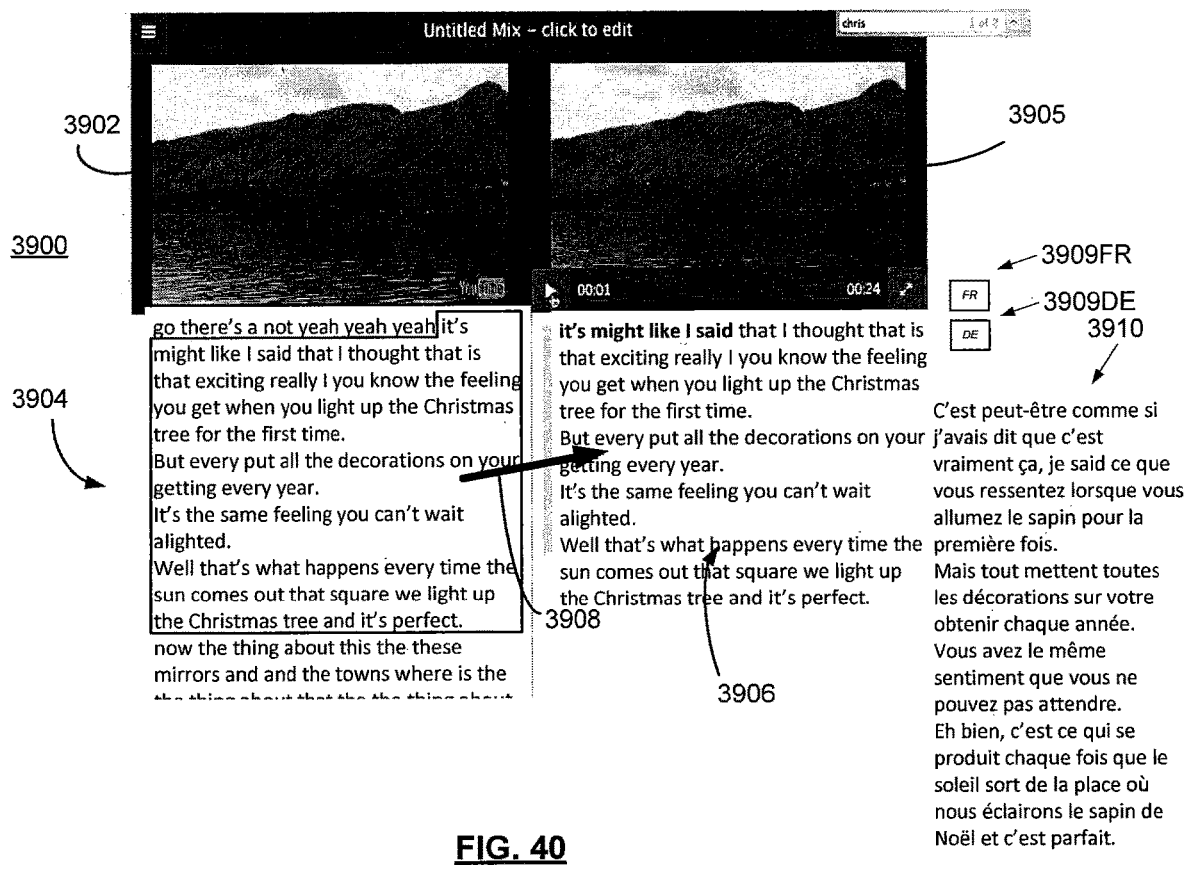
FIG. 40 illustrates the translation UI of FIG. 39 with additional video elements in accordance with aspects of the present application.

As noted hereinbefore, in some applications, the recorded data file 120 also includes the video component 124. In some example embodiments, the translated media editing system 102 and the user device 108 may be configured to also present video in alignment with the text and the audio that is being presented on the user device 108. In some example embodiments, the user will have the ability to determine which translated language transcripts to include in the recorded data file 120 and the translated media editing system 102 will prompt the user for an indication of the text that the user would like aligned with the audio. In some embodiments, only a selected translated transcript will be presented in conjunction with presentation of the video and/or audio. In this regard, FIG. 40 shows a further example of the translation UI 3900 that includes a first video element 3902 and a second video element 3905 that are configured to present the corresponding video information in alignment with audio playback and text display with the French language button 3909FR and the German language button 3909DE available for selecting the text language. In example embodiments, where selected transcript portions are copied from the first UI element 3904 to the second UI element 3906, the corresponding subset of the extracted video component 224 is included with the extracted audio component 222 in the extracted AN data 220. This type of presentation may be considered to have captions or subtitles. Notably, it is contemplated that sentence-level timing or paragraph-level timing might be more appropriate than word-level timing when working with translated content or with subtitles or captions.

In some examples, at least some of the functionality of the translated media editing system 102 may be implemented at the user device 108, particularly if the user device 108 is configured with a resident transcript editor application.

In some example embodiments, the translated media editing system 102 may be configured to maintain an augmented dictionary database that identifies words that enter the current news cycle but which might not, otherwise, be present in normal dictionary databases, such as place names and peoples' names, for example. The database could be maintained, for example, by tracking corrected data received at the translated media editing system 102 from the user device 108 and/or from information scraped from on-line media sources. The augmented dictionary database could be provided to the S2T conversion system 104 to provide improved transcription and/or the augmented dictionary database could be used to assist text correction at the user device 108. The augmented dictionary database may include words not just in the transcribed language, but also words in a selected amount of translated languages.

Figure 41:
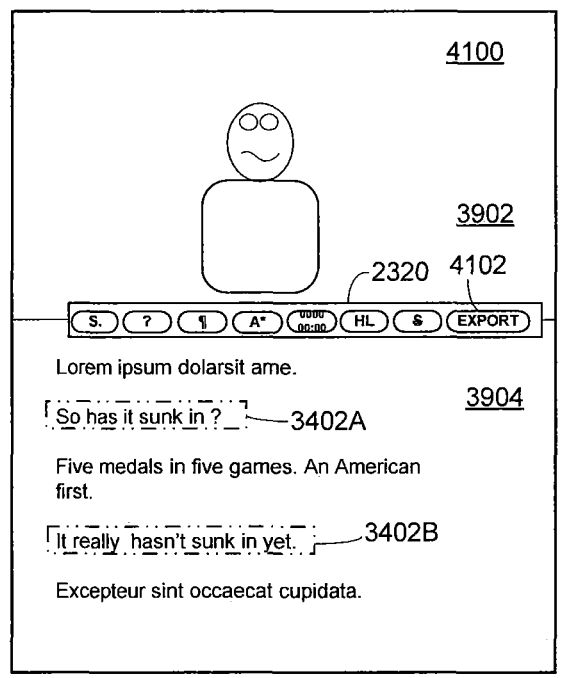
FIG. 41 illustrates a portion of the translation UI of FIG. 40 with an export button in accordance with aspects of the present application.

FIG. 41 illustrates a portion 4100 of the translation UI 3900 of FIG. 40. In the portion 4100 illustrated in FIG. 41, the toolbar 2320 includes an export button 4102. Additionally, the portion 4100 illustrated in FIG. 41 includes the first video element 3902 in conjunction with the first UI element 3904. The first UI element 3904 includes some text associated with a first persistent highlight marker 3402A and some other text associated with a second persistent highlight marker 3402B.

FIG. 42 illustrates portions of video exported using the portion 4100 of FIG. 41. In particular, FIG. 42 illustrates a first portion 4202A of video exported based on the text highlighted using the first persistent highlight marker 3402A. Furthermore, FIG. 42 illustrates a second portion 4202B of video exported based on the text highlighted using the second persistent highlight marker 3402B. Notably, the exported video may include the first portion 4202A of video and the second portion 4202B of video stitched together into a single video. Alternatively, each of the first portion 4202A of video and the second portion 4202B of video may be exported distinctly.

The present disclosure provides certain example algorithms and calculations for implementing examples of the disclosed methods and systems. However, the present disclosure is not bound by any particular algorithm or calculation.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A media generating and editing system comprising:
an interface system for receiving instructions and data;
electronic storage storing a media file that includes audio data;
a first language data structure that includes:
  a plurality of first language text words transcribed from audio words included in the audio data; and
  first language timing data paired with corresponding individual first language text words among the plurality of first language text words, the first language timing data indicating a location in the audio data from which the corresponding individual first language text word has been transcribed;
a second language data structure that includes a plurality of second language text words translated from the first language text words;
a processing system in communication with the interface and the electronic storage and configured by computer code to:
  generate second language timing data relating the second language text words to the audio words included in the audio data;
  store, in the second language data structure, the second language timing data in conjunction with the plurality of second language text words;
  enable audio playback of the audio data at a user device; and
  enable an editing interface that:
    presents at least the plurality of second language text words on a display screen at the user device;
    provides a visual marker that indicates at least the plurality of second language text words on the display screen in time alignment with the audio playback of audio data; and
    stores amendments to specific second language text words among the plurality of second language text words in the second language data structure in response to inputs received at the user device.

2. The system of claim 1 wherein the processing system is further configured to:
present at least the plurality of the first language text words on the display screen at the user device; and
amend the second language timing data based on amendments made to specific first language text words among the plurality of first language text words to, thereby, preserve time alignment between the second language text words and the audio data.

3. The system of claim 1 wherein the processing system is configured to amend the second language timing data based on amendments made to specific second language text words among the plurality of second language text words to, thereby, preserve time alignment between the second language text words and the first language text words.

4. The system of claim 1 wherein the second language text data comprises more than one file containing unique language text words.

5. The system of claim 1 wherein the processing system is configured to:
present at least the plurality of first language text words and the plurality of second language text words on the display screen at the user device;
provide a visual marker that indicates at least the plurality of first language text words and the plurality of second language text words on the display screen in time alignment with the audio playback of audio data; and
amend the second language data structure in response to input, received at the user device, to amend specific first language text words among the plurality of first language text words, thereby generating amended first language text words.

6. The system of claim 5 wherein amending the second language data structure further comprises:
transmitting the amended first language text words to a translation service;
receiving updated second language text words from the translation service;
generating updated second language timing data relating the updated second language text words to the audio words included in the audio data; and
storing the updated second language timing data.

7. The system of claim 6, wherein the processing system is configured to generate the updated second language timing data by:
transmitting, to the translation service, portions of the amended first language text words;
receiving, from the translation service, portions of updated second language text words corresponding to the portions of the amended first language text words; and
generating the updated second language timing data for the portions of updated second language text words corresponding to the first language timing data of corresponding portions among the portions of the amended first language text words.

8. The system of claim 6, wherein the processing system is configured to generate the updated second language timing data by:
processing the first language text words to identify a first set of points of interest;
processing the second language text words to identify a second set points of interest corresponding to the first language text words points of interest; and
assigning the first language timing data corresponding to the first set of points of interest to the second language timing data corresponding to the second set points of interest.

9. The system of claim 8, wherein the first set of points of interest and the second set of points of interest comprise punctuation marks.

10. The system of claim 1 wherein the media file includes video data that is in time alignment with the audio data, wherein the processing system is configured to:
receive, from the user device, a selection of one or more of the first language text words or the second language text words, thereby generating selected text words; and
create an extracted audiovisual media file that selectively includes:

one or more portions of the audio data corresponding to the selected text words; and
portions of the video data that are in time alignment with the one or more portions of the audio data.

11. The system of claim 10 wherein the processing system is configured to embed the selected text words as video information into the video data in time alignment with the corresponding audio data portions.

12. The system of claim 10 wherein the selected text words include discrete portions of text words that are separated in time and the processing system is configured to, when creating the extracted audiovisual media file, stitch together the portions of audio data and portions of video data that correspond to the discrete portions of text words.

13. The system of claim 10 wherein the processing system is configured to create the extracted audiovisual media file in response to a predetermined user input received at the user device.

14. The system of claim 10 wherein the processing system is configured to provide the audio data and the video data from the extracted audiovisual media file for review at the user device.

15. The system of claim 11 wherein the processing system is configured to provide the audio data and the video data from the extracted audiovisual media file to a third party server upon receiving a predetermined instruction from the user device.

16. The system of claim 1 wherein the interface system includes a network connection through which the user device communicates with the processing system.

17. The system of claim 16 wherein the processing system is configured to create the second language data structure by:
receiving the first language data structure through the network connection;
transmitting the media file, through the network connection, to a translation service;
receive, from the translation service, a raw second language data structure through the network connection;
reformat the raw second language data structure to a format optimized for the editing interface, thereby generating reformatted raw second language data structure; and
save the reformatted raw second language data structure as the raw second language data structure file.

18. The system of claim 17 wherein the processing system is configured to transcode the first language data structure to a predetermined text format optimized for the translation service prior to transmitting the first language data structure to the translation service.

19. The system of claim 18 wherein the processing system is configured to:
determine a first language data structure quality of the received first language data structure; and
provide an indication, to the user device, that the first language data structure quality falls below a threshold.

20. The system of claim 1 wherein the first language data structure includes a plurality of attributes paired with each text word among the plurality of first language text words, the editing interface being enabled to update the attributes in dependence on inputs received at the user device.

21. The system of claim 1 wherein:
the first language data structure includes a plurality of first language attributes paired with each text word among the plurality of first language text words,
the second language data structure includes a plurality of second language attributes paired with word units, and the editing interface is enabled to update the first language attributes and the second language attributes in dependence on inputs received at the user device.

22. The system of claim 20 wherein the second language attributes include a confidence of transcription value indicating a likelihood that a first language text word, based on which a given second language text word within the word unit has been translated, has been correctly transcribed.

23. The system of claim 22 where the editing interface is enabled to display, on the display screen, an indication of the confidence of transcription value in association with the given second language text word.

24. The system of claim 22 wherein the editing interface is enabled to update, to a maximum value, the confidence of transcription value for the given second language text word responsive to editing of the given second language text word.

25. The system of claim 22 wherein the first language attributes include a speaker attribute that identifies an individual speaker.

26. The system of claim 1 wherein the user interface is enabled to:
present an audio waveform on the display screen that visually represents volume levels in the audio data over time; and
display a marker on the waveform that is time aligned with audio playback of the audio data.

27. A method for providing transcript data comprising:
storing a first language transcript data file that includes:
a plurality of first language text words transcribed from audio words included in audio data, and
first language timing data paired with corresponding individual first language text words among the plurality of first language text words, the first language timing data indicating a location in the audio data from which the corresponding individual first language text word has been transcribed;
storing a second language transcript data file that includes:
a plurality of second language text words translated from the first transcript data file; and
second language timing data paired with corresponding individual second language text words among the plurality of second language text words, the second language timing data indicating a location in the audio data from which the corresponding individual second language text word has been translated;
providing the audio data for playback at a user device;
providing the first language transcript data file for display on a display screen at the user device;
providing the second language transcript data file text words for display on the display screen at the user device;
causing a visual marker to be displayed on the display screen to indicate the first language transcript data file text words and the second language transcript data file text words on the display screen in time alignment with the audio playback of the corresponding audio words at the user device; and
amending the text words in at least one of the first transcript data file and the second transcript data file in response to inputs received at the user device.

28. The method of claim 27 comprising amending the second transcript data file text words and the correspondingly paired second language timing data based on amendments made to the first language transcript data file text words to preserve time alignment between the second language transcript data file text words and the corresponding audio words.

29. The method of claim 27 comprising amending the second transcript data file text words and the correspondingly paired second language timing data based on amendments made to the second language transcript data file text words to preserve time alignment between the second language transcript data file text words and the corresponding audio words.

30. The method of claim 27 wherein the media file includes video data that is in time alignment with the audio data, the method comprising:
   receiving, from the user device, an indication of a selection of one or more text words from at least one of the first language text words and the second language text words; and
   creating an extracted audiovisual media file that selectively includes:
      one or more portions of the audio data that include the audio words corresponding to the selected text words and portions of the video data that are in time alignment with the one or more portions of the audio data.

31. The method of claim 29 comprising embedding the selected text words as video information into the video data in time alignment with the corresponding audio data portions.

32. The method of claim 29 comprising creating the extracted audiovisual media file in response to a predetermined user input received at the user device.

* * * * *